United States Patent
Lu et al.

(10) Patent No.: US 12,382,203 B2
(45) Date of Patent: Aug. 5, 2025

(54) OPTICAL COMMUNICATION APPARATUS AND OPTICAL COMMUNICATION METHOD

(71) Applicant: HUAWEI TECHNOLOGIES CO., LTD., Shenzhen (CN)

(72) Inventors: Xiaofeng Lu, Shenzhen (CN); Yuanda Huang, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 249 days.

(21) Appl. No.: 18/331,345

(22) Filed: Jun. 8, 2023

(65) Prior Publication Data

US 2023/0319449 A1 Oct. 5, 2023

Related U.S. Application Data

(63) Continuation of application No. PCT/CN2021/116069, filed on Sep. 1, 2021.

(30) Foreign Application Priority Data

Dec. 16, 2020 (CN) .......................... 202011488421.5

(51) Int. Cl.
*H04Q 11/00* (2006.01)
(52) U.S. Cl.
CPC . *H04Q 11/0067* (2013.01); *H04Q 2011/0083* (2013.01); *H04Q 2011/0088* (2013.01)

(58) Field of Classification Search
None
See application file for complete search history.

(56) References Cited

U.S. PATENT DOCUMENTS

| | | | |
|---|---|---|---|
| 6,965,622 B1 | 11/2005 | Cho et al. | |
| 2008/0267627 A1* | 10/2008 | Effenberger | H04J 14/0282 398/72 |
| 2016/0226618 A1* | 8/2016 | Lee | H04B 10/572 |
| 2017/0285373 A1 | 10/2017 | Zhang et al. | |
| 2018/0302183 A1* | 10/2018 | Liu | H04J 14/0282 |

\* cited by examiner

*Primary Examiner* — David W Lambert
(74) *Attorney, Agent, or Firm* — Maier & Maier, PLLC

(57) ABSTRACT

An optical communication apparatus may include a frequency locking module and a signal light generation module. The frequency locking module is configured to: generate a target wavelength control signal based on an optical frequency difference indication signal and send the target wavelength control signal to the signal light generation module. The frequency locking module is further configured to generate a target electrical modulation signal based on a target optical frequency difference, a target electrical frequency difference, and to-be-transmitted bit information that are determined by using the optical frequency difference indication signal. The signal light generation module is configured to: generate third signal light based on the target wavelength control signal and the target electrical modulation signal and send the third signal light to a second optical communication apparatus.

20 Claims, 22 Drawing Sheets

OPTICAL COMMUNICATION APPARATUS AND OPTICAL COMMUNICATION METHOD

CROSS-REFERENCE TO RELATED APPLICATIONS

This application is a continuation of International Application No. PCT/CN2021/116069, filed on Sep. 1, 2021, which claims priority to Chinese Patent Application No. 202011488421.5, filed on Dec. 16, 2020. The disclosures of the aforementioned applications are hereby incorporated by reference in their entireties.

TECHNICAL FIELD

The embodiments relate to the field of optical communication, an optical communication apparatus and an optical communication method.

BACKGROUND

With continuous development of optical communication technologies, as an implementation technology of an optical access network (OAN), a passive optical network (PON) is widely used in various optical communication scenarios. FIG. 1 is a schematic diagram of a structure of a PON system. The PON system uses a multipoint-to-point network structure. As shown in FIG. 1, a PON may include an optical line terminal (OLT) configured to provide a network side interface, one or more optical network units (ONU) (for example, an ONU 1 and an ONU n shown in FIG. 1) configured to provide a user side interface, and one or more optical distribution networks (ODN) that are between the OLT and the ONU and that are configured to distribute an optical signal. In an actual application, the ODN includes a passive optical splitter for optical power distribution, a feeder fiber connected between the passive optical splitter and the OLT, and a distribution fiber connected between the passive optical splitter and the ONU. During downlink data transmission, the ODN transmits downlink data of the OLT to each ONU through the optical splitter. Similarly, during uplink data transmission, the ODN aggregates uplink data of the ONUs and transmits the data to the OLT.

To avoid problems such as a delay and a jitter caused by the use of a time division (TD) technology, people begin to consider applying other multiplexing technologies in a PON, for example, a multi-electron carrier technology. With reference to FIG. 1, uplink transmission is used as an example. The OLT allocates a frequency resource (namely, an electrical carrier, for example, the OLT configures an electrical carrier with a frequency of f1 for the ONU 1 and configures an electrical carrier with a frequency of fn for the ONU n) to each ONU in real time. Each ONU generates, based on a dedicated electrical carrier of the ONU, an uplink optical signal with a fixed wavelength (where the wavelength may be configured by the OLT), and sends the uplink optical signal to the OLT through the ODN. For example, the ONU 1 generates uplink signal light with a wavelength of λ1 (where a frequency of an electrical carrier corresponding to the uplink signal light is f1) and sends the uplink signal light to the OLT. The ONU n generates uplink signal light with a wavelength of λn (where a frequency of an electrical carrier of the uplink signal light is fn) and sends the uplink signal light to the OLT. Because different ONUs allocated with electrical carriers of different frequencies and different optical signal wavelengths, a dedicated communication link may be established between the OLT device and each ONU, so that a delay and a jitter of transmission between the OLT and the ONU can be effectively reduced.

However, light sources used by different ONUs may have a problem of inconsistency (for example, different ambient temperatures or junction temperatures). This causes a frequency offset of an optical carrier or signal light output by a light source of the ONU, or even causes a frequency drift of an electrical carrier of the signal light, and finally causes interference when a plurality of uplink optical signals may be multiplexed at an OLT end, resulting in poor quality of optical communication. A common solution is to reserve a large spacing between optical carrier wavelengths of each transmitter. However, in consideration of a large number of ONUs in a PON scenario, which may be more than 32 ONUs, and due to random device installation, this solution can hardly be implemented. In addition, wavelength locking is also a widely discussed solution. In the conventional technology, for example, a solution of implementing wavelength locking of an optical carrier by using a light source implemented based on a principle of locking by injecting an optical wavelength into a semiconductor laser, a solution of implementing wavelength locking of an optical carrier by using an Etalon filter, or the like, has been proposed. However, these solutions have problems such as high implementation costs and poor structural stability. Therefore, in a multi-subcarrier transmission scenario, how to reduce interference that exists when a plurality of optical signals may be multiplexed and that is caused by a frequency offset of signal light in a multi-subcarrier transmission process has become one of problems to be urgently resolved.

SUMMARY

To resolve the foregoing problem, the embodiments may provide an optical communication apparatus and an optical communication method, to effectively reduce interference that exists when a plurality of optical signals are multiplexed and that is caused by a frequency offset of signal light in a multi-subcarrier transmission process, so that quality of optical communication can be improved.

According to a first aspect, an embodiment may provide a first optical communication apparatus. The first optical communication apparatus includes a frequency locking module and a signal light generation module. The frequency locking module is configured to: generate a target wavelength control signal based on an optical frequency difference indication signal, and send the target wavelength control signal to the signal light generation module, where the optical frequency difference indication signal indicates a degree of difference between an optical carrier frequency of external reference light and an optical carrier frequency of first signal light sent by the signal light generation module to a second optical communication apparatus. The frequency locking module is further configured to: generate a target electrical modulation signal based on a target optical frequency difference, a target electrical frequency difference, and to-be-transmitted bit information, and send the target electrical modulation signal to the signal light generation module, where the target optical frequency difference is determined by using the optical frequency difference indication signal, the target optical frequency difference is a difference between the frequency of the external reference light and the optical carrier frequency of the first signal light, and the target electrical frequency difference is a difference between a measured electrical carrier frequency of second signal light sent by the signal light generation module to the second optical communication apparatus and a target electrical carrier frequency. The signal light generation module is configured to: generate third signal light based on the target wavelength control signal and the target electrical modulation signal and send the third signal light to the second optical communication apparatus. The first signal light, the second signal light, and the third signal light are signal light output by the first optical communication apparatus at different moments. In the foregoing implementation, in an aspect, the frequency locking module 21 in the first optical communication apparatus may generate a target wavelength control signal based on an optical frequency difference indication signal, so that the signal light generation module 22 may adjust, based on the target wavelength control signal, a wavelength of an optical carrier generated by the signal light generation module, and an optical carrier frequency of signal light subsequently output by the signal light generation module 22 may be closer to or equal to the frequency of the external reference light, thereby implementing locking of an optical carrier frequency. In another aspect, the frequency locking module 21 may further generate the target electrical modulation signal based on the target optical frequency difference, the target electrical frequency difference, and the to-be-transmitted information, and a frequency of an electrical carrier used for the target electrical modulation signal can be closer to or equal to a preconfigured target electrical carrier frequency, so that locking of an electrical carrier frequency can be implemented. Therefore, the first optical communication apparatus 20 is applied to a multi-subcarrier transmission scenario, to reduce or eliminate interference that exists when a plurality of optical signals are multiplexed and that is caused by a frequency offset of signal light, so that quality of optical communication can be improved.

With reference to the first aspect, in an implementation, the first optical communication apparatus further includes an optical frequency difference detection module. The optical frequency difference detection module is configured to: obtain an optical frequency difference indication signal formed by the external reference light and detection light corresponding to the first signal light and send the optical frequency difference indication signal to the frequency locking module. The optical frequency difference indication signal is a target beat frequency signal formed by the external reference light and the detection light corresponding to the first signal light, and the detection light corresponding to the first signal light is obtained by splitting an optical carrier or signal light generated by a light source in the signal light generation module when the signal light generation module outputs the first signal light. The optical frequency difference detection module is implemented by using a beat frequency detection structure, so that the optical frequency difference detection module has a simple structure and is easy to implement, and structural complexity and costs of the optical frequency difference detection module can be reduced. This improves structural stability of the first optical communication apparatus and reduces costs of the first optical communication apparatus.

With reference to the first aspect, in an implementation, the optical frequency difference detection module includes a first optical splitting module, a second optical splitting module, a first photoelectric detection module, a second photoelectric detection module, and a first electrical coupling module. The first optical splitting module is configured to: split the external reference light into first detection light and second detection light, send the first detection light to the first photoelectric detection module, and send the second detection light to the second photoelectric detection module. The first detection light is a component of the external reference light in a first polarization direction, the second detection light is a component of the external reference light in a second polarization direction, the first polarization direction is a preset polarization direction of the first optical splitting module, and the second polarization direction is orthogonal to the first polarization direction. The second optical splitting module is configured to: split the detection light corresponding to the first signal light into third detection light and fourth detection light, send the third detection light to the first photoelectric detection module, and send the fourth detection light to the second photoelectric detection module. The third detection light is a component of the detection light corresponding to the first signal light in a third polarization direction, the fourth detection light is a component of the detection light corresponding to the first signal light in a fourth polarization direction, the third polarization direction is a preset polarization direction of the second optical splitting module, and the fourth polarization direction is orthogonal to the third polarization direction. The first photoelectric detection module is configured to: obtain a first beat voltage signal formed by the first detection light and the third detection light and send the first beat voltage signal to the first electrical coupling module. The second photoelectric detection module is configured to: obtain a second beat voltage signal formed by the second detection light and the fourth detection light and send the second beat voltage signal to the first electrical coupling module. The first electrical coupling module is configured to: couple the first beat voltage signal and the second beat voltage signal to obtain the optical frequency difference indication signal and send the optical frequency difference indication signal to the frequency locking module. The optical frequency difference detection module is implemented by using optical splitting modules, photoelectric detection modules, and electrical coupling modules that are common and have low costs, so that costs of the first optical communication apparatus can be reduced. In addition, because device features of the optical splitting modules, the photoelectric detection modules, and the electrical coupling modules are stable, stable performance of the optical frequency difference detection module can be ensured, so that performance of the first optical communication apparatus is stable.

With reference to the first aspect, in an implementation, the first optical splitting module and the second optical splitting module are polarization rotator splitters, the first polarization direction is the same as the third polarization direction, the first detection light and the second detection light have a same polarization direction, and the third detection light and the fourth detection light have a same polarization direction.

With reference to the first aspect, in an implementation, optical power of the third detection light is the same as optical power of the fourth detection light.

With reference to the first aspect, in an implementation, the first photoelectric detection module includes a first photoelectric detector, the second photoelectric detection module includes a second photoelectric detector, and the first photoelectric detector, the second photoelectric detector, the first optical splitting module, and the second optical splitting module are integrated on a first photonic chip. The first photoelectric detector, the second photoelectric detector, the first optical splitting module, and the second optical splitting module are integrated on one photonic chip, so that integration and stability of the optical frequency difference detection module can be improved.

With reference to the first aspect, in an implementation, the first optical communication apparatus further includes an optical frequency difference detection module, the optical frequency difference detection module includes a microring module, and a difference between a resonance frequency of the microring module and a frequency of the external reference light is less than or equal to a first preset difference. The optical frequency difference detection module is configured to: obtain an optical frequency difference indication signal based on fifth detection light and sixth detection light and send the optical frequency difference indication signal to the frequency locking module. The optical frequency difference indication signal is a first optical power indication signal of the fifth detection light and a second optical power indication signal of the sixth detection light. Detection light corresponding to the first signal light is split to obtain the fifth detection light and seventh detection light. The sixth detection light is obtained by splitting light that is output when the microring module inputs the seventh detection light. The detection light corresponding to the first signal light is obtained by splitting an optical carrier or signal light generated by a light source in the signal light generation module when the signal light generation module outputs the first signal light. The optical frequency difference detection module 27 is implemented by using a microring structure, which can expand a detection range of an optical frequency difference and reduce a bandwidth requirement of the entire optical frequency difference detection module 27. This improves stability and effectiveness of detection of the optical frequency difference indication signal.

With reference to the first aspect, in an implementation, the optical frequency difference detection module further includes a first optical coupling module, a second optical coupling module, a third photoelectric detection module, and a fourth photoelectric detection module. The first optical coupling module is configured to: split the detection light corresponding to the first signal light to obtain the fifth detection light and the seventh detection light, transmit the fifth detection light to the third photoelectric detection module, and transmit the seventh detection light to the microring module. The third photoelectric detection module is configured to: obtain the first optical power indication signal of the fifth detection light and transmit the first optical power indication signal to the frequency locking module. The microring module is configured to: perform microring filtering on the seventh detection light and transmit the seventh detection light obtained by performing the microring filtering to the second optical coupling module. The second optical coupling module is configured to: split the seventh detection light obtained by performing the microring filtering to obtain the sixth detection light and transmit the sixth detection light to the fourth photoelectric detection module. The fourth photoelectric detection module is configured to: obtain the second optical power indication signal corresponding to the sixth detection light and transmit the second optical power indication signal to the frequency locking module.

With reference to the first aspect, in an implementation, the optical frequency difference detection module further includes a fifth photoelectric detection module and a sixth photoelectric detection module. The second optical coupling module is further configured to: split the external reference light to obtain eighth detection light and ninth detection light, transmit the ninth detection light to the microring module, and transmit the eighth detection light to the fifth photoelectric detection module. The fifth photoelectric detection module is configured to: obtain a third optical power indication signal corresponding to the eighth detection light and transmit the third optical power indication signal to the frequency locking module. The microring module is further configured to: perform microring filtering on the ninth detection light and transmit the ninth detection light obtained by performing the microring filtering to the first optical coupling module. The first optical coupling module is configured to: split the ninth detection light obtained by performing the microring filtering to obtain tenth detection light and send the tenth detection light to the sixth photoelectric detection module. The sixth photoelectric detection module is configured to: obtain a fourth optical power indication signal corresponding to the tenth detection light and send the fourth optical power indication signal to the frequency locking module.

With reference to the first aspect, in an implementation, the third photoelectric detection module includes a third photoelectric detector, the fourth photoelectric detection module includes a fourth photoelectric detector, the fifth photoelectric detection module includes a fifth photoelectric detector, the sixth photoelectric detection module includes a sixth photoelectric detector, and the third photoelectric detector, the fourth photoelectric detector, the fifth photoelectric detector, the sixth photoelectric detector, the first optical coupling module, the second optical coupling module, and the microring module are integrated on a second photonic chip. The third photoelectric detector, the fourth photoelectric detector, the fifth photoelectric detector, the sixth photoelectric detector, the first optical coupling module, the second optical coupling module, and the microring module are integrated on a same photonic chip, so that integration of the optical frequency difference detection module can be improved.

With reference to the first aspect, in an implementation, the frequency locking module may be configured to: calculate a first measured ratio of the fourth optical power indication signal to the third optical power indication signal; and if it is determined that a difference between the first measured ratio and a first preset ratio is greater than or equal to a second preset difference, or it is determined that the first measured ratio is not equal to the first preset ratio, adjust a drive signal of the microring module, and send the adjusted drive signal to the microring module. The adjusted drive signal is used by the microring module to adjust the resonance frequency.

With reference to the first aspect, in an implementation, the frequency locking module may be further configured to: if it is determined that the difference between the first measured ratio and the first preset ratio is less than the first preset difference, or it is determined that the first measured ratio is equal to the first preset ratio, stop adjusting the drive signal of the microring module.

With reference to the first aspect, in an implementation, the microring module includes a first microring resonant cavity, a second microring resonant cavity, a first waveguide, a second waveguide, a third optical splitting module, and a fourth optical splitting module. The resonance frequency of the microring module is equal to a resonance frequency of the first microring resonant cavity and a resonance frequency of the second microring resonant cavity. The first microring resonant cavity and the second microring resonant cavity are single-side coupled microring resonant cavities. The third optical splitting module and the fourth optical splitting module are optically connected by the first waveguide and the second waveguide, the first waveguide is close to the first microring resonant cavity, the second waveguide is close to the second microring resonant cavity, the third optical splitting module is further optically connected to the first optical coupling module, and the fourth optical splitting module is further optically connected to the second optical coupling module.

With reference to the first aspect, in an implementation, the microring module includes a third microring resonant cavity, a third waveguide, a fourth waveguide, a fifth optical splitting module, and a sixth optical splitting module. The resonance frequency of the microring module is equal to a resonance frequency of the third microring resonant cavity. The third microring resonant cavity is a double-side coupled microring resonant cavity. The fifth optical splitting module and the sixth optical splitting module are optically connected by the third waveguide and the fourth waveguide, the third waveguide and the fourth waveguide each are close to one side of the third microring resonant cavity, the fifth optical splitting module is further optically connected to the first optical coupling module, and the sixth optical splitting module is further optically connected to the second optical coupling module. The microring module is implemented by using a double-side coupled microring structure, so that a quantity of microring resonant cavities used by the microring module can be reduced, and integration and reliability of the microring module can be improved.

With reference to the first aspect, in an implementation, the frequency locking module is configured to: determine the target optical frequency difference based on the target beat frequency signal; and then determine the target wavelength control signal based on the target optical frequency difference, a first preset adjustment coefficient, and a wavelength control signal that is last output by the frequency locking module to the signal light generation module.

With reference to the first aspect, in an implementation, the frequency locking module may be configured to: sample the target beat frequency signal at a first moment to obtain a target sampling signal corresponding to the target beat frequency signal; filter the target sampling signal and a sampling signal corresponding to a beat frequency signal received by the frequency locking module within a first preset time period, to obtain a to-be-converted signal, where an end moment of the first preset time period is the first moment; perform digital Fourier transform on the to-be-converted signal to obtain spectrum information corresponding to the first preset time period; and obtain a frequency peak corresponding to the target sampling signal in the spectrum information, and determine the frequency peak as the target optical frequency difference.

With reference to the first aspect, in an implementation, the frequency locking module is configured to determine the target optical frequency difference based on the first optical power indication signal and the second optical power indication signal; and is further configured to determine the target wavelength control signal based on the target optical frequency difference, a first preset adjustment coefficient, and a wavelength control signal that is last output by the frequency locking module to the signal light generation module.

With reference to the first aspect, in an implementation, the frequency locking module may be configured to: calculate a second measured ratio of the second optical power indication signal to the first optical power indication signal; and determine, from a preset optical power ratio-optical frequency difference correspondence set of the microring module based on the second measured ratio, an optical frequency difference corresponding to the second measured ratio, and determine the optical frequency difference corresponding to the second measured ratio as the target optical frequency difference. The preset optical power ratio-optical frequency difference correspondence set includes one or more different measured ratios and an optical frequency difference corresponding to each measured ratio.

With reference to the first aspect, in an implementation, the frequency locking module may be configured to: calculate a second measured ratio of the second optical power indication signal to the first optical power indication signal; and if it is determined that a difference between the second measured ratio and a second preset ratio is greater than or equal to a third preset difference, or it is determined that the second measured ratio is not equal to the second preset ratio, determine a preset voltage signal as the target wavelength control signal.

With reference to the first aspect, in an implementation, the frequency locking module may be further configured to: if it is determined that the difference between the second measured ratio and the second preset ratio is less than the third preset difference, or it is determined that the second measured ratio is equal to the second preset ratio, stop generating and sending the target wavelength control signal.

With reference to the first aspect, in an implementation, the frequency locking module may be further configured to: determine a target carrier frequency based on the target electrical carrier frequency, the target electrical frequency difference, and the target optical frequency difference; generate a target electrical carrier, where a frequency of the target electrical carrier is equal to the target carrier frequency; and load the to-be-transmitted bit information onto the target electrical carrier to obtain the target electrical modulation signal.

With reference to the first aspect, in an implementation, the target carrier frequency satisfies the following formula:

$$f_m = f_c + \alpha \times \Delta f_d + \beta \times \Delta f_g, \text{ where}$$

$f_m$ is the target carrier frequency, $f_c$ is the target electrical carrier frequency, $\alpha$ is a second preset adjustment coefficient, $\beta$ is a third preset adjustment coefficient, a is greater than or equal to 0, $\beta$ is greater than or equal to 0, $\Delta f_d$ is the target electrical frequency difference, and $\Delta f_g$ is the target optical frequency difference.

With reference to the first aspect, in an implementation, the target electrical carrier frequency is included in a network control signal received by the frequency locking module, and the measured electrical carrier frequency of the second signal light is included in a network status signal received by the frequency locking module.

With reference to the first aspect, in an implementation, the signal light generation module further includes: a light source driver module, an optical signal modulation module, and a seventh optical splitting module. The light source driver module is configured to: receive the target wavelength control signal, generate a first target drive signal based on the target wavelength control signal, and send the first target drive signal to the light source. The light source is configured to: generate an initial optical carrier corresponding to the third signal light based on the first target drive signal and send the initial optical carrier corresponding to the third signal light to the seventh optical splitting module. The seventh optical splitting module is configured to: split the initial optical carrier corresponding to the third signal light to obtain an optical carrier of the third signal light and detection light corresponding to the third signal light and send the optical carrier of the third signal light to the optical signal modulation module. The optical signal modulation module is configured to generate and output the third signal light based on the target electrical modulation signal and the optical carrier of the third signal light.

With reference to the first aspect, in an implementation, the optical signal modulation module may be an electro-absorption modulator (EAM), a Mach-Zehnder modulator (MZM), a microring modulator, or the like that is implemented by using various materials or structures.

With reference to the first aspect, in an implementation, when the optical signal modulation module is a microring modulator, the optical signal modulation module and the microring module may be a same functional module.

With reference to the first aspect, in an implementation, the signal light generation module further includes: a light source driver module and an eighth optical splitting module. The light source driver module is configured to: receive the target wavelength control signal and the target electrical modulation signal, generate a second target drive signal based on the target wavelength control signal and the target electrical modulation signal, and send the second target drive signal to the light source. The light source is configured to: generate, based on the second target drive signal, initial signal light corresponding to the third signal light, and send the initial signal light corresponding to the third signal light to the eighth optical splitting module. The eighth optical splitting module is configured to split the initial signal light corresponding to the third signal light to obtain the third signal light and detection light corresponding to the third signal light.

With reference to the first aspect, in an implementation, the first optical communication apparatus further includes a temperature detection module, a temperature signal processing module, a second electrical coupling module, and a temperature control execution module. The temperature detection module is configured to: obtain a temperature indication signal of the light source and send the temperature indication signal to the temperature signal processing module and the frequency locking module. The temperature signal processing module is configured to: generate a first temperature control signal based on the temperature indication signal and a preset temperature and send the first temperature control signal to the second electrical coupling module. The frequency locking module is configured to: generate a temperature control feedback signal based on the temperature indication signal and the preset temperature and send the temperature control feedback signal to the second electrical coupling module. The second electrical coupling module is further configured to: couple the first temperature control signal and the temperature control feedback signal to obtain a second temperature control signal and send the second temperature control signal to the temperature control execution module. The temperature control execution module is configured to perform temperature control on the light source based on the second temperature control signal, so that a difference between a temperature of the light source and the preset temperature is less than or equal to a fourth preset difference, and the preset temperature is determined by using the frequency of the external reference light. An external control signal (that is, the temperature control feedback signal) generated by the frequency locking module and the first temperature control signal generated by the temperature signal processing module are jointly used for temperature control, so that precision and stability of temperature control can be improved, and precision of locking of an optical carrier frequency can be further improved.

With reference to the first aspect, in an implementation, the first optical communication apparatus further includes a temperature control execution module. The frequency locking module is configured to determine, from a preset temperature-wavelength correspondence set corresponding to the light source based on the target optical frequency difference, a target temperature difference corresponding to the target optical frequency difference. The target temperature difference is a difference between a preset temperature and a temperature of the light source at a moment when the signal light generation module outputs the first signal light, and the preset temperature is determined by using the frequency of the external reference light. The frequency locking module is further configured to: generate a third temperature control signal based on the target temperature difference and send the third temperature control signal to the temperature control execution module. The temperature control execution module is configured to perform temperature control on the light source based on the third temperature control signal, so that the difference between the temperature of the light source and the preset temperature is less than or equal to a fourth preset difference. The frequency locking module directly generates the third temperature control signal based on the target optical frequency difference, and the temperature control execution module further controls the temperature of the light source based on the third temperature control signal. This simplifies a structure of a temperature control module and can reduce costs and structural complexity of the first optical communication apparatus.

With reference to the first aspect, in an implementation, the first optical communication apparatus further includes a first optical interface and a ninth optical splitting module. The first optical interface is separately optically connected to the frequency locking module and the optical frequency difference detection module by the ninth optical splitting module. The first optical interface is configured to: receive, through the ninth optical splitting module, the first signal light, the second signal light, or the third signal light output by the signal light generation module, and send the first signal light, the second signal light, or the third signal light to the second optical communication apparatus. The first optical interface is further configured to: receive the external reference light and transmit the external reference light to the optical frequency difference detection module through the ninth optical splitting module. One optical splitting module enables the first optical interface to implement bidirectional optical transmission, which can simplify complexity of an optical interface of the first optical communication apparatus and can improve system integration and application flexibility of the first optical communication apparatus.

With reference to the first aspect, in an implementation, the first optical interface is optically connected to a target fiber, and the first optical communication apparatus sends the first signal light, the second signal light, or the third signal light to the second optical communication apparatus through the target fiber, and receives the external reference light from the second optical communication apparatus through the target fiber.

With reference to the first aspect, in an implementation, the first optical communication apparatus and the second optical communication apparatus are optical communication apparatuses in an optical network of a multipoint-to-point or multipoint-to-multipoint structure.

With reference to the first aspect, in an implementation, a difference between an optical carrier frequency of the third signal light and the frequency of the external reference light is less than a difference between the optical carrier frequency of the first signal light and the frequency of the external reference light, and a difference between an electrical carrier frequency of the third signal light and the target electrical carrier frequency is less than a difference between an electrical carrier frequency of the first signal light and the target electrical carrier frequency.

According to a second aspect, an embodiment may provide a second optical communication apparatus. The second optical communication apparatus includes a signal light processing module and a reference light source module. The signal light processing module is configured to: receive second signal light from a first optical communication apparatus, determine a measured electrical carrier frequency of the second signal light, and send the measured electrical carrier frequency of the second signal light and a target electrical carrier frequency to the first optical communication apparatus. The signal light processing module is further configured to: generate a reference optical drive signal and send the reference optical drive signal to the reference light source module. The reference light source module is configured to: generate external reference light based on the reference optical drive signal and send the external reference light to the first optical communication apparatus. The measured electrical carrier frequency of the second signal light, the target electrical carrier frequency, and the external reference light are used by the first optical communication apparatus to generate third signal light and send the third signal light to the second optical communication apparatus.

The second optical communication apparatus provides, to the first optical communication apparatus, the measured electrical carrier frequency of the second signal light, the target electrical carrier frequency, and the external reference light, so that an optical carrier frequency of signal light that can be generated and output by the first optical communication apparatus is closer to a frequency of the external reference light, and the electrical carrier frequency is closer to the configured target electrical carrier frequency. In this way, an electrical carrier frequency and an optical carrier frequency of signal light output by the first optical communication apparatus can be stable, and interference that exists when a plurality of optical signals are multiplexed and that is caused by a frequency offset of signal light can be effectively reduced, so that quality of optical communication can be improved.

With reference to the second aspect, in an implementation, the second optical communication apparatus further includes a second optical interface and a tenth optical splitting module. The second optical interface is optically connected to the signal light processing module and the reference light source module by the tenth optical splitting module. The second optical interface is configured to: receive, through the tenth optical splitting module, the external reference light output by the reference light source module and send the external reference light to the first optical communication apparatus. The second optical interface is further configured to: receive the second signal light or the third signal light and transmit the second signal light or the third signal light to the signal light processing module through a sixth optical splitting module.

Bidirectional transmission of signal light is implemented by using the tenth optical splitting module and the second optical interface, which can reduce complexity of an optical interface of the second optical communication apparatus and can improve integration of the second optical communication apparatus.

With reference to the second aspect, in an implementation, the second optical interface is optically connected to a target fiber, and the second optical communication apparatus sends the external reference light to the first optical communication apparatus through the target fiber, and receives the second signal light or the third signal light from the first optical communication apparatus through the target fiber.

According to a third aspect, an embodiment may provide an optical communication method. The method is applicable to the foregoing first optical communication apparatus. The first optical communication apparatus generates a target wavelength control signal based on an optical frequency difference indication signal, where the optical frequency difference indication signal indicates a degree of difference between an optical carrier frequency of external reference light and an optical carrier frequency of first signal light sent by the first optical communication apparatus to a second optical communication apparatus; generates a target electrical modulation signal based on a target optical frequency difference, a target electrical frequency difference, and to-be-transmitted bit information, where the target optical frequency difference is determined by using the optical frequency difference indication signal, the target optical frequency difference is a difference between the frequency of the external reference light and the optical carrier frequency of the first signal light, and the target electrical frequency difference is a difference between a target electrical carrier frequency and a measured electrical carrier frequency of second signal light sent by the first optical communication apparatus to the second optical communication apparatus; and generates third signal light based on the target wavelength control signal and the target electrical modulation signal, and sends the third signal light to the second optical communication apparatus. The first signal light, the second signal light, and the third signal light are signal light output by the first optical communication apparatus at different moments.

With reference to the third aspect, in an implementation, the first optical communication apparatus may further obtain an optical frequency difference indication signal formed by the external reference light and detection light corresponding to the first signal light. The optical frequency difference indication signal is a target beat frequency signal formed by the external reference light and the detection light corresponding to the first signal light, and the detection light corresponding to the first signal light is obtained by splitting an optical carrier or signal light generated by a light source in the first optical communication apparatus when the first optical communication apparatus outputs the first signal light.

With reference to the third aspect, in an implementation, the first optical communication apparatus may further split the external reference light into first detection light and second detection light, where the first detection light is a component of the external reference light in a first polarization direction, the second detection light is a component of the external reference light in a second polarization direction, and the second polarization direction is orthogonal to the first polarization direction; then, split the detection light corresponding to the first signal light into third detection light and fourth detection light, where the third detection light is a component of the detection light corresponding to the first signal light in a third polarization direction, the fourth detection light is a component of the detection light corresponding to the first signal light in a fourth polarization direction, the third polarization direction is a preset polarization direction of a second optical splitting module, and the fourth polarization direction is orthogonal to the third polarization direction; and obtain a first beat voltage signal formed by the first detection light and the third detection light and a second beat voltage signal formed by the second detection light and the fourth detection light, and couple the first beat voltage signal and the second beat voltage signal to obtain the optical frequency difference indication signal.

With reference to the third aspect, in an implementation, the first polarization direction is the same as the third polarization direction, the first detection light and the second detection light have a same polarization direction, and the third detection light and the fourth detection light have a same polarization direction.

With reference to the third aspect, in an implementation, optical power of the third detection light is the same as optical power of the fourth detection light.

With reference to the third aspect, in an implementation, the first optical communication apparatus may further obtain an optical frequency difference indication signal based on fifth detection light and sixth detection light, where the optical frequency difference indication signal is a first optical power indication signal of the fifth detection light and a second optical power indication signal of the sixth detection light; and split the detection light corresponding to the first signal light to obtain the fifth detection light and seventh detection light, where the sixth detection light is obtained by splitting the seventh detection light by performing microring filtering, and the detection light corresponding to the first signal light is obtained by splitting an optical carrier or signal light generated by the light source of the first optical communication apparatus when the first optical communication apparatus outputs the first signal light.

With reference to the third aspect, in an implementation, the first optical communication apparatus may further split the detection light corresponding to the first signal light to obtain the fifth detection light and seventh detection light, and obtain a first optical power indication signal of the fifth detection light; and perform microring filtering on the seventh detection light, split the seventh detection light obtained by performing the microring filtering to obtain the sixth detection light, and obtain a second optical power indication signal corresponding to the sixth detection light.

With reference to the third aspect, in an implementation, the first optical communication apparatus may further split the external reference light to obtain eighth detection light and ninth detection light, and obtain a third optical power indication signal of the eighth detection light; perform microring filtering on the ninth detection light to obtain filtered ninth signal light; and split the ninth detection light obtained by performing the microring filtering to obtain tenth detection light, and obtain a fourth optical power indication signal corresponding to the tenth detection light.

With reference to the third aspect, in an implementation, the first optical communication apparatus may further calculate a first measured ratio of the fourth optical power indication signal to the third optical power indication signal. If it is determined that a difference between the first measured ratio and a first preset ratio is greater than or equal to a second preset difference, or it is determined that the first measured ratio is not equal to the first preset ratio, the first optical communication apparatus adjusts a resonance frequency of a microring module in the first optical communication apparatus, so that the resonance frequency of the microring module is close to or equal to the frequency of the external reference light.

With reference to the third aspect, in an implementation, if it is determined that the difference between the first measured ratio and the first preset ratio is less than a first preset difference, or it is determined that the first measured ratio is equal to the first preset ratio, the first optical communication apparatus stops adjusting the resonance frequency of the microring module.

With reference to the third aspect, in an implementation, the first optical communication apparatus may further determine the target optical frequency difference based on the target beat frequency signal; and determine the target wavelength control signal based on the target optical frequency difference, a first preset adjustment coefficient, and a wavelength control signal that is last generated by the first optical communication apparatus.

With reference to the third aspect, in an implementation, the first optical communication apparatus may further sample the target beat frequency signal at a first moment to obtain a target sampling signal corresponding to the target beat frequency signal; filter the target sampling signal and a sampling signal corresponding to a beat frequency signal received by the first optical communication apparatus within a first preset time period, to obtain a to-be-converted signal, where an end moment of the first preset time period is the first moment; perform digital Fourier transform on the to-be-converted signal to obtain spectrum information corresponding to the first preset time period; and obtain a frequency peak corresponding to the target sampling signal in the spectrum information, and determine the frequency peak as the target optical frequency difference.

With reference to the third aspect, in an implementation, the first optical communication apparatus may further determine the target optical frequency difference based on the first optical power indication signal and the second optical power indication signal; and determine the target wavelength control signal based on the target optical frequency difference, a first preset adjustment coefficient, and a wavelength control signal that is last generated by the first optical communication apparatus.

With reference to the third aspect, in an implementation, the first optical communication apparatus may further calculate a second measured ratio of the second optical power indication signal to the first optical power indication signal; and determine, from a preset optical power ratio-optical frequency difference correspondence set of the microring module based on the second measured ratio, an optical frequency difference corresponding to the second measured ratio, and determine the optical frequency difference corresponding to the second measured ratio as the target optical frequency difference, where the preset optical power ratio-optical frequency difference correspondence set includes one or more different measured ratios and an optical frequency difference corresponding to each measured ratio.

With reference to the third aspect, in an implementation, the first optical communication apparatus may further calculate a second measured ratio of the second optical power indication signal to the first optical power indication signal; and if it is determined that a difference between the second measured ratio and a second preset ratio is greater than or equal to a third preset difference, or it is determined that the second measured ratio is not equal to the second preset ratio, determine a preset voltage signal as the target wavelength control signal.

With reference to the third aspect, in an implementation, if it is determined that the difference between the second measured ratio and the second preset ratio is less than the third preset difference, or it is determined that the second measured ratio is equal to the second preset ratio, the first optical communication apparatus stops generating and sending the target wavelength control signal.

With reference to the third aspect, in an implementation, the first optical communication apparatus may determine a target carrier frequency based on the target electrical carrier frequency, the target electrical frequency difference, and the target optical frequency difference; and generate a target electrical carrier, where a frequency of the target electrical carrier is equal to the target carrier frequency; and load the to-be-transmitted bit information onto the target electrical carrier to obtain the target electrical modulation signal.

With reference to the third aspect, in an implementation, the target carrier frequency satisfies the following formula:

$$f_m = f_c + \alpha \times \Delta f_d + \beta \times \Delta f_g, \text{ where}$$

$f_m$ is the target carrier frequency, $f_c$ is the target electrical carrier frequency, a is a second preset adjustment coefficient, β is a third preset adjustment coefficient, a is greater than or equal to 0, β is greater than or equal to 0, $\Delta f_d$ is the target electrical frequency difference, and $\Delta f_g$ is the target optical frequency difference.

With reference to the third aspect, in an implementation, the target electrical carrier frequency is included in a network control signal received by the first optical communication apparatus, and the measured electrical carrier frequency of the second signal light is included in a network status signal received by the first optical communication apparatus.

With reference to the third aspect, in an implementation, the first optical communication apparatus may further generate a first target drive signal based on the target wavelength control signal, and generate, based on the first target drive signal, an initial optical carrier corresponding to the third signal light; split the initial optical carrier corresponding to the third signal light to obtain an optical carrier of the third signal light and detection light corresponding to the third signal light; and generate and output the third signal light based on the target electrical modulation signal and the optical carrier of the third signal light.

With reference to the third aspect, in an implementation, the first optical communication apparatus may further generate a second target drive signal based on the target wavelength control signal and the target electrical modulation signal, and generate, based on the second target drive signal, initial signal light corresponding to the third signal light; and split the initial signal light corresponding to the third signal light to obtain the third signal light and detection light corresponding to the third signal light.

With reference to the third aspect, in an implementation, the first optical communication apparatus may further obtain a temperature indication signal of the light source, and generate a first temperature control signal and a temperature control feedback signal based on the temperature indication signal and a preset temperature; couple the first temperature control signal and the temperature control feedback signal to obtain a second temperature control signal; and perform temperature control on the light source based on the second temperature control signal, so that a difference between a temperature of the light source and the preset temperature is less than or equal to a fourth preset difference. The preset temperature is determined by using the frequency of the external reference light.

With reference to the third aspect, in an implementation, the first optical communication apparatus may further determine, from a preset temperature-wavelength correspondence set corresponding to the light source based on the target optical frequency difference, a target temperature difference corresponding to the target optical frequency difference, where the target temperature difference is a difference between a preset temperature and a temperature of the light source at a moment when the first optical communication apparatus outputs the first signal light, and the preset temperature is determined by using the frequency of the external reference light; and generate a third temperature control signal based on the target temperature difference, and perform temperature control on the light source based on the third temperature control signal, so that a difference between the temperature of the light source and the preset temperature is less than or equal to a fourth preset difference.

With reference to the third aspect, in some implementations, the first optical communication apparatus sends the first signal light, the second signal light, or the third signal light to the second optical communication apparatus through a target fiber and receives the external reference light from the second optical communication apparatus through the target fiber.

With reference to the third aspect, in an implementation, the first optical communication apparatus and the second optical communication apparatus are optical communication apparatuses in an optical network of a multipoint-to-point or multipoint-to-multipoint structure.

With reference to the third aspect, in an implementation, a difference between an optical carrier frequency of the third signal light and the frequency of the external reference light is less than a difference between the optical carrier frequency of the first signal light and the frequency of the external reference light, and a difference between an electrical carrier frequency of the third signal light and the target electrical carrier frequency is less than a difference between an electrical carrier frequency of the first signal light and the target electrical carrier frequency.

According to a fourth aspect, an embodiment may provide an optical communication method. The optical communication method is applicable to the foregoing second optical communication apparatus. The second optical communication apparatus may receive second signal light from a first optical communication apparatus, and determine a measured electrical carrier frequency of the second signal light; send the measured electrical carrier frequency of the second signal light and a target electrical carrier frequency to the first optical communication apparatus; and generate and send external reference light to the first optical communication apparatus, where the measured electrical carrier frequency of the second signal light, the target electrical carrier frequency, and the external reference light are used by the first optical communication apparatus to generate third signal light and send the third signal light to the second optical communication apparatus.

With reference to the fourth aspect, in an implementation, the first optical communication apparatus and the second optical communication apparatus are optical communication apparatuses in an optical network of a multipoint-to-point or multipoint-to-multipoint structure.

With reference to the fourth aspect, in an implementation, a difference between an optical carrier frequency of the third signal light and a frequency of the external reference light is less than a difference between an optical carrier frequency of the second signal light and the frequency of the external reference light, and a difference between an electrical carrier frequency of the third signal light and the target electrical carrier frequency is less than a difference between an electrical carrier frequency of the second signal light and the target electrical carrier frequency.

According to a fifth aspect, an embodiment may further provide an optical communication system. The optical communication system may include at least one first optical communication apparatus provided in the first aspect and the second optical communication apparatus provided in the second aspect.

In a multi-subcarrier transmission scenario, the first optical communication apparatus in the embodiments may accurately control an optical carrier frequency and an electrical carrier frequency corresponding to signal light generated by the first optical communication apparatus, so that an optical carrier frequency of the signal light output by the first optical communication apparatus can be locked to a frequency of external reference light, and the electrical carrier frequency of the signal light output by the first optical communication apparatus can be locked to a preconfigured target electrical carrier frequency. In this way, a problem that beat frequency interference that exists when a plurality of optical signals may be multiplexed and that is caused by a frequency offset of signal light in a multi-subcarrier transmission process can be effectively resolved, so that quality of optical signal transmission of two optical communication apparatuses can be improved.

DETAILED DESCRIPTION OF THE EMBODIMENTS

The following describes the embodiments with reference to the accompanying drawings.

Figure 1:
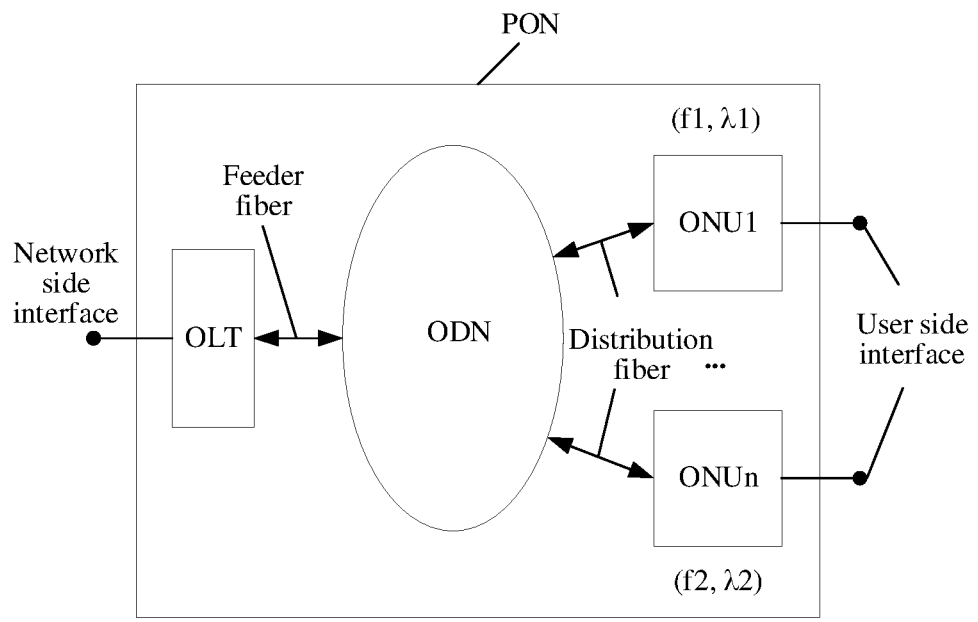
FIG. 1 is a schematic diagram of a structure of a PON system according to an embodiment.

In the conventional technology, to avoid problems such as a delay and a jitter caused by the use of a time division (TD) technology, people begin to consider applying other multiplexing technologies in a PON, for example, a multi-electron carrier technology (which may also be referred to as a multi-subcarrier transmission technology). As shown in FIG. 1, uplink transmission is used as an example. The OLT allocates a frequency resource (that is, an electrical carrier. For example, the OLT configures an electrical carrier with a frequency of f1 for the ONU 1 and configures an electrical carrier with a frequency of fn for the ONU n) to each ONU in real time. It should be noted herein that, if an ONU also provides a user port function, for example, the ONU provides an Ethernet user port or a plain old telephone service plain old telephone service, POTS) user port, the ONU may also be referred to as an optical network terminal (ONT). For ease of understanding, the ONU is used as an example for description below. Each ONU generates an uplink optical signal with a fixed wavelength and sends the uplink optical signal to the OLT through the ODN. For example, the ONU 1 generates uplink signal light with a wavelength of λ1 (a frequency of an electrical carrier corresponding to the signal light is f1) and sends the uplink signal light to the OLT. The ONU n generates uplink signal light with a wavelength of λn (a frequency of an electrical carrier corresponding to the signal light is fn) and sends the uplink signal light to the OLT. Because different ONUs may be allocated with electrical carriers of different frequencies and different wavelengths (that is, different frequencies), a dedicated communication link may be established between the OLT device and each ONU, so that a delay and a jitter of transmission between the OLT and the ONU can be effectively reduced. However, light sources used by different ONUs may have a problem of inconsistency (for example, different ambient temperatures or junction temperatures), which causes a frequency offset of an optical carrier or signal light output by a light source of the ONU, and causes a frequency drift of an electrical carrier of the uplink signal light, and finally causes interference when a plurality of uplink optical signals are multiplexed at an OLT end, affecting quality of optical communication. A common solution is to reserve a large spacing between optical carrier wavelengths of each transmitter. However, in consideration of a large number of ONUs in a PON scenario, which may be more than 32 ONUs, and random device installation, this solution is almost impossible to implement. In addition, wavelength locking is also a widely discussed solution. In the conventional technology, for example, a solution of implementing wavelength locking of an optical carrier by using a light source implemented based on a principle of locking by injecting an optical wavelength into a semiconductor laser, a solution of implementing wavelength locking of an optical carrier by using an Etalon filter, or the like, has been proposed. However, these solutions have problems such as high implementation costs and poor structural stability.

Therefore, a problem that needs to be resolved is that in a multi-subcarrier transmission scenario, how to simply and efficiently reduce interference that exists when a plurality of optical signals are multiplexed and that is caused by a frequency offset of signal light.

Embodiment 1

To resolve the foregoing problem, an embodiment may provide a first optical communication apparatus 20 and a second optical communication apparatus 10. In the structure of the PON system shown in FIG. 1, the first optical communication apparatus 20 may be the ONU or an integrated functional module (for example, a transmitter optical subassembly (TOSA)) in the ONU, and the second optical communication apparatus may be an OLT that establishes an optical communication link with the ONU. In this embodiment, a scenario in which the first optical communication apparatus 20 in the PON system shown in FIG. 1 performs uplink transmission once to the second optical communication apparatus 10 is used as an example to describe in detail the structures and functional implementation of the first optical communication apparatus and the second optical communication apparatus separately.

Figure 2:
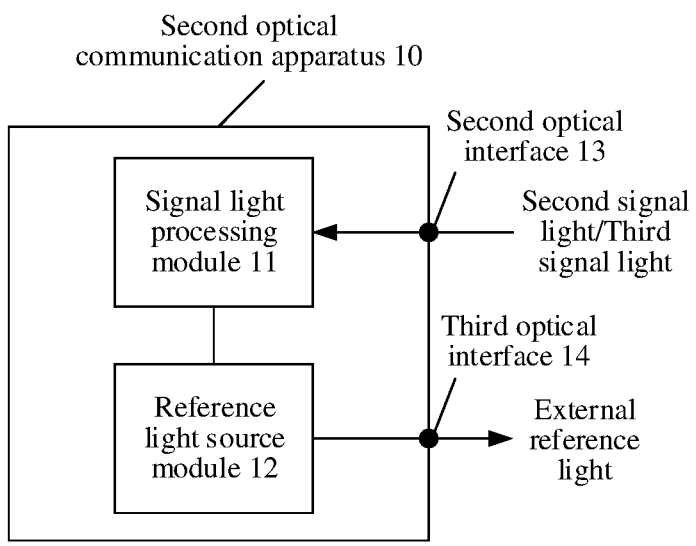
FIG. 2 is a schematic diagram of a structure of a second optical communication apparatus according to an embodiment.
Figure 3:
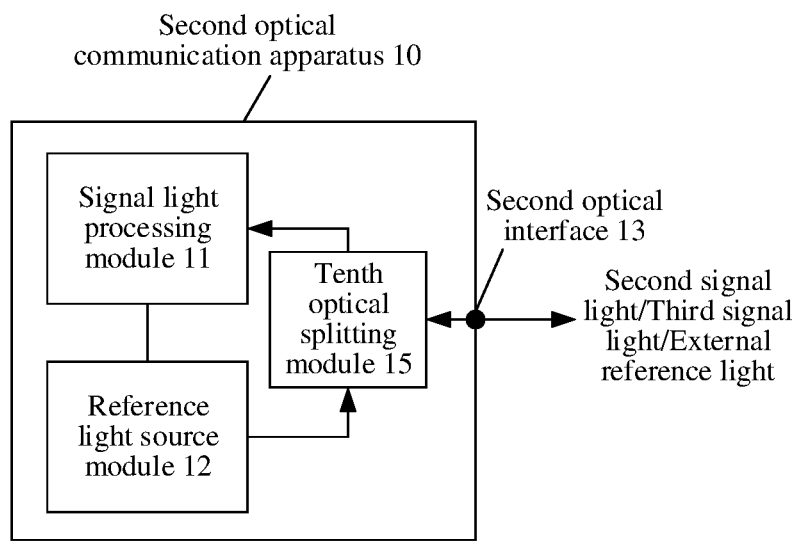
FIG. 3 is another schematic diagram of a structure of a second optical communication apparatus according to an embodiment.

With reference to FIG. 2 and FIG. 3, a structure and a function of the second optical communication apparatus 10 provided in the embodiments are described below in detail.

FIG. 2 is a schematic diagram of a structure of a second optical communication apparatus according to an embodiment. As shown in FIG. 2, the second optical communication apparatus 10 may include a first signal light processing module 11 (for ease of differentiation, the first signal light processing module 11 is used instead for description below), a reference light source module 12, a second optical interface 13, and a third optical interface 14. The first signal light processing module 11 is optically connected to the second optical interface 13 and is electrically connected to the reference light source module 12. The reference light source module 12 is further optically connected to the third optical interface 14.

During actual operation, the first signal light processing module 11 may receive second signal light from the first optical communication apparatus 20, determine an electrical carrier frequency of the second signal light (for ease of differentiation, a measured frequency is used instead for description below), and send a measured electrical carrier frequency of the second signal light to the first optical communication apparatus 20. The first signal light processing module 11 may further determine, according to a preset frequency resource configuration algorithm, a target electrical carrier frequency corresponding to the first optical communication apparatus 20 and send the target electrical carrier frequency to the first optical communication apparatus 20. The target electrical carrier frequency is a spectrum resource configured by the second optical communication apparatus 10 for the first optical communication apparatus 20. The first signal light processing module 11 may further generate a reference optical drive signal and send the reference optical drive signal to the reference light source module 12. After receiving the foregoing reference optical drive signal, the reference light source module 12 may generate external reference light with a preset wavelength and send the external reference light to the first optical communication apparatus 20 through the foregoing third optical interface. The measured electrical carrier frequency of the second signal light, the target electrical carrier frequency, and the external reference light may be used by the first optical communication apparatus 20 to subsequently generate and send third signal light to the second optical communication apparatus 10. A difference between an electrical carrier frequency of the third signal light and the target electrical carrier frequency is less than or equal to a difference between the electrical carrier frequency of the second signal light and the target electrical carrier frequency, and a difference between an optical carrier frequency of the third signal light and a frequency of the external reference light is less than or equal to a difference between an optical carrier frequency of the second signal light and the frequency of the external reference light.

Optionally, in a process in which the second optical communication apparatus sends the target electrical carrier frequency and the measured electrical carrier frequency of the second signal light to the first optical communication apparatus, the second optical communication apparatus 10 may send the target electrical carrier frequency to the first optical communication apparatus 20 by using a network control signal. The second optical communication apparatus may also send the measured electrical carrier frequency of the second signal light to the first optical communication apparatus 20 by using a network status signal. For example, after determining the target electrical carrier frequency, the second optical communication apparatus 10 may include the target electrical carrier frequency in the network control signal, and then perform optical modulation on the network control signal to obtain downlink signal light (for ease of differentiation, fourth signal light is used instead for description below). Next, the second optical communication apparatus 10 may send the fourth signal light to the first optical communication apparatus 20 through the second optical interface 13 or the third optical interface 14 (additionally, the fourth signal light may be sent to the first optical communication apparatus 20 through another optical interface that exists on the second optical communication apparatus 10 and that can perform optical communication with the first optical communication apparatus 20, which is not limited herein), to implement a function of sending the target electrical carrier frequency to the first optical communication apparatus 20. Similarly, the second optical communication apparatus 10 may send, by using fifth signal light, the network status signal that carries the measured electrical carrier frequency of the second signal light to the first optical communication apparatus 20 in a same manner. It may be understood herein that, when the target electrical carrier frequency remains in a preset time period, the first signal light processing module 11 does not need to repeatedly send the target electrical carrier frequency to the first optical communication apparatus 20. The fourth signal light and the fifth signal light may be same signal light or may be different signal light. This is not limited.

Optionally, FIG. 3 is another schematic diagram of a structure of a second optical communication apparatus according to an embodiment. As shown in FIG. 3, the second optical communication apparatus 10 may further include a tenth optical splitting module 15. The second optical interface 13 and the third optical interface 14 may be a same optical interface (for ease of understanding, for the optical interface, the second optical interface 13 is still used instead for description). The tenth optical splitting module 15 is optically connected to the second optical interface 13, the first signal light processing module 11, and the reference light source module 12. During actual application, when receiving the second signal light from the second optical interface 13, the tenth optical splitting module 15 may transmit the second signal light to the first signal light processing module 11. In addition, after receiving the external reference light from the reference light source module 12, the tenth optical splitting module 15 may transmit the external reference light to the second optical interface 13, to send the external reference light to the first optical communication apparatus 20 through the second optical interface 13. In other words, a main function of the foregoing tenth optical splitting module 15 is to separately establish independent optical paths between the second optical interface 13 and the first signal light processing module 11 and between the second optical interface 13 and the reference light source module 12, so that signal light (including subsequent first signal light, second signal light, and third signal light) transmitted between the first signal light processing module 11 and the second optical interface 13 is isolated from the external reference light transmitted between the reference light source module 12 and the second optical interface 13. It should be noted that the foregoing tenth optical splitting module 15 may be a directional coupler with a waveguide, a discrete optical splitter, a spatial optics-based optical splitting assembly, or the like, which is not limited herein. For ease of understanding and description, a scenario in which the second optical interface 13 and the third optical interface 14 are a same optical interface is used as an example for description below. Bidirectional transmission of signal light is implemented by using the tenth optical splitting module 15 and the second optical interface, which can reduce complexity of an optical interface of the second optical communication apparatus 10 and can improve integration of the second optical communication apparatus 10.

Optionally, during implementation, the first signal light processing module 11 may be implemented by using a receiver optical subassembly (ROSA) and an optical digital signal processor (oDSP) in the OLT, and the reference light source module 12 may be implemented by using a relatively independent light source module in the OLT.

The second optical communication apparatus 10 provides, to the first optical communication apparatus 20, the measured electrical carrier frequency of the second signal light, the target electrical carrier frequency, and the external reference light, so that an optical carrier frequency of signal light that can be generated and output by the first optical communication apparatus 20 is closer to a frequency of the external reference light, and the electrical carrier frequency is closer to the configured target electrical carrier frequency. In this way, an electrical carrier frequency and an optical carrier frequency of signal light output by the first optical communication apparatus 20 can be stable, and interference that exists when a plurality of optical signals are multiplexed and that is caused by a frequency offset of signal light can be effectively reduced, so that quality of optical communication is improved.

Figure 4:
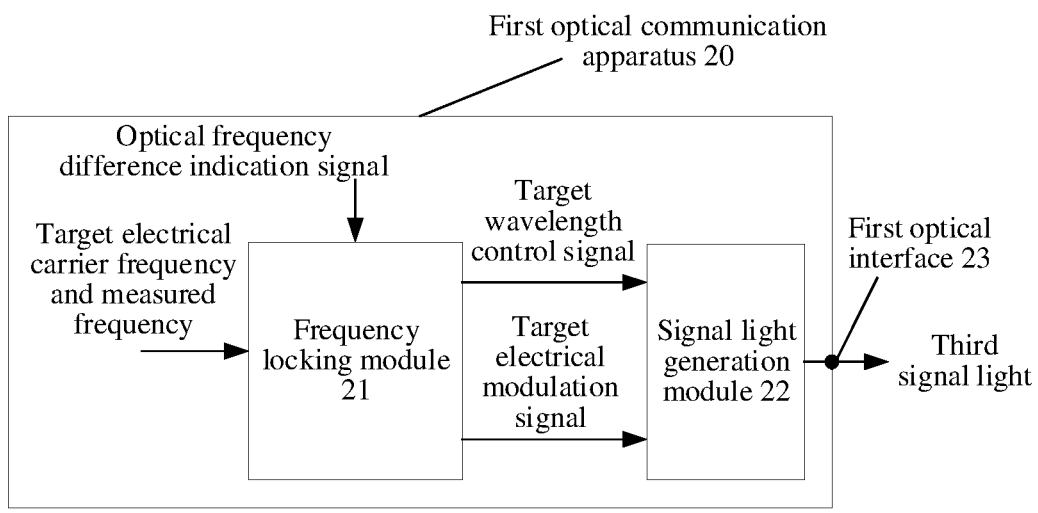
FIG. 4 is a schematic diagram of a structure of a first optical communication apparatus according to an embodiment.
Figure 24A:
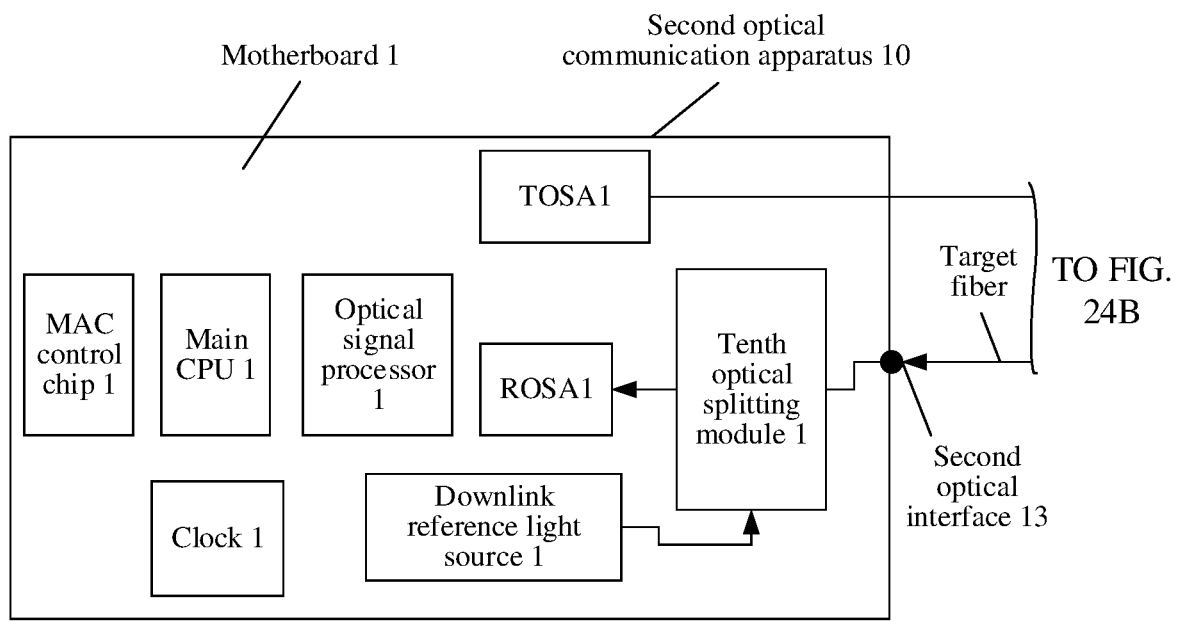
FIG. 24A and FIG. 24B are a schematic diagram of a structure of an optical communication system according to an embodiment.
Figure 24B:
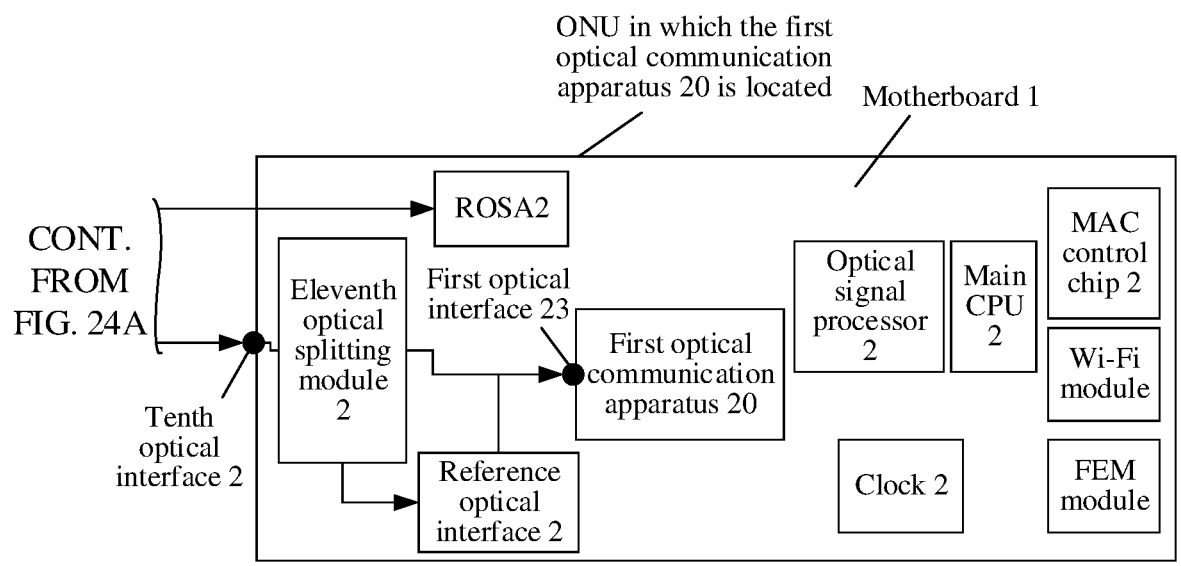

With reference to FIG. 4 and FIG. 24A and FIG. 24B, a structure and a function of the first optical communication apparatus 20 provided in the embodiments are described below in detail.

FIG. 4 is a schematic diagram of a structure of a first optical communication apparatus according to an embodiment. As shown in FIG. 4, the first optical communication apparatus 20 may include a frequency locking module 21, a signal light generation module 22, and a first optical interface 23. The frequency locking module 21 is electrically connected to the signal light generation module 22, and the signal light generation module 22 is optically connected to the first optical interface 23.

During actual operation, the frequency locking module 21 may be configured to generate a wavelength control signal based on an obtained optical frequency difference indication signal (for ease of differentiation, the target wavelength control signal is described in the following) and send the target wavelength control signal to the signal light generation module 22. The optical frequency difference indication signal indicates a degree of difference between a frequency of external reference light and an optical carrier frequency of first signal light sent by the signal light generation module 22 to the second optical communication apparatus. The target wavelength control signal may be subsequently used by the signal light generation module 22 to adjust a frequency of an optical carrier or signal light generated by a light source included in the signal light generation module 22 and output third signal light. It should be noted herein that, a moment at which the first optical communication apparatus 20 sends a second signal light may be earlier than a moment at which the first optical communication apparatus 20 sends the first signal light, or the two moments may be the same moment (that is, the second signal light is the first signal light). The moment at which the first optical communication apparatus 20 sends the first signal light is earlier a moment at which the first optical communication apparatus 20 sends the third signal light. In the embodiments, light loaded with no bit information is collectively referred to as an optical carrier, and an optical carrier loaded with bit information is collectively referred to as signal light.

In addition, the frequency locking module 21 may be further configured to determine a target optical frequency difference based on an obtained measured electrical carrier frequency of the second signal light and a target electrical carrier frequency. A target electrical frequency difference is a difference between the measured electrical carrier frequency corresponding to the second signal light and a preset target electrical carrier frequency. Next, the frequency locking module 21 may generate a target electrical modulation signal based on the target electrical frequency difference, the target optical frequency difference, and the to-be-transmitted bit information, and send the target electrical modulation signal to the signal light generation module 22. The target optical frequency difference may be determined by using the frequency locking module 21 based on the optical frequency difference indication signal, and the target optical frequency difference is a difference between a frequency of the external reference light and an optical carrier frequency of the first signal light sent by the signal light generation module 22 to the second optical communication apparatus 10 or an optical carrier frequency used for the first signal light. The signal light generation module 22 may be configured to generate third signal light based on the target wavelength control signal and the target electrical modulation signal and send the third signal light to the second optical communication apparatus 10 through the first optical interface 23. A difference between the optical carrier frequency of the third signal light and the frequency of the external reference light is less than the difference between the optical carrier frequency of the first signal light and the frequency of the external reference light. In addition, a difference between an electrical carrier frequency used by the third signal light and the target electrical carrier frequency is less than a difference between an electrical carrier frequency of the first signal light and the target electrical carrier frequency.

In the foregoing implementation, in an aspect, the frequency locking module 21 in the first optical communication apparatus may generate a target wavelength control signal based on an optical frequency difference indication signal, so that the signal light generation module 22 may adjust, based on the target wavelength control signal, a wavelength of an optical carrier generated by the signal light generation module, and an optical carrier frequency of signal light subsequently output by the signal light generation module 22 may be closer to or equal to the frequency of the external reference light, thereby implementing locking of an optical carrier frequency. In another aspect, the frequency locking module 21 may further generate the target electrical modulation signal based on the target optical frequency difference, the target electrical frequency difference, and the to-be-transmitted bit information, and a frequency of an electrical carrier used for the target electrical modulation signal can be closer to or equal to a preconfigured target electrical carrier frequency, so that locking of an electrical carrier frequency can be implemented. Therefore, the first optical communication apparatus 20 is applied to a multi-subcarrier transmission scenario, to reduce or eliminate interference that exists when a plurality of optical signals are multiplexed and that is caused by a frequency offset of a light source, so that quality of optical communication is improved.

Figure 5:
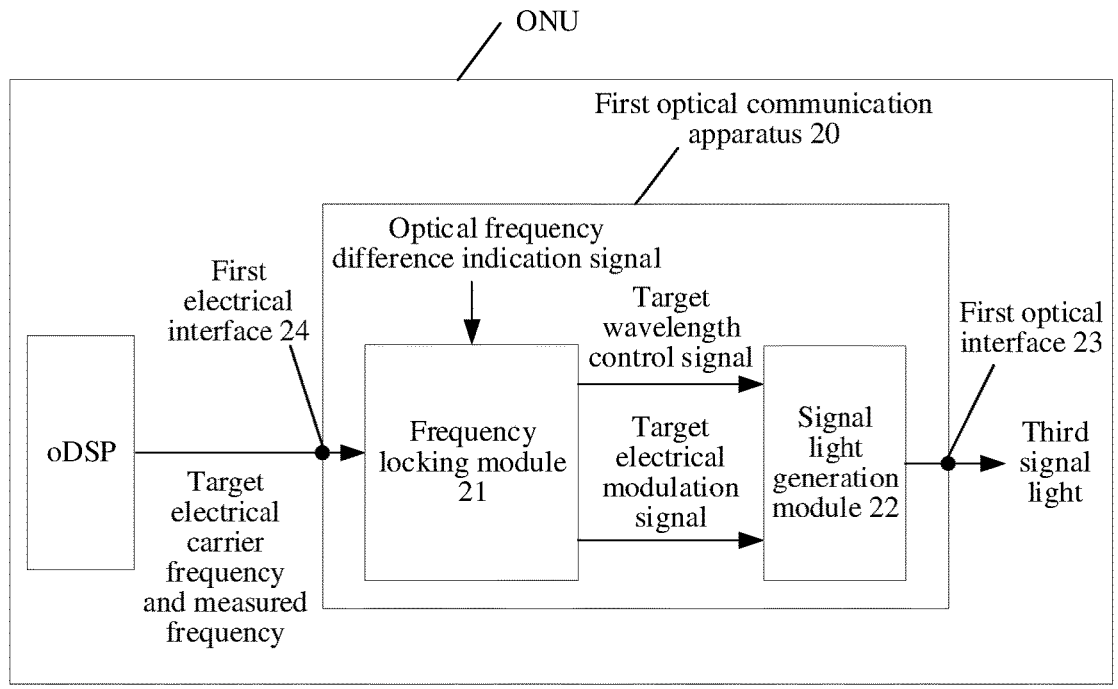
FIG. 5 is a schematic diagram of a structure of an ONU in which a first optical communication apparatus is located according to an embodiment.

In an implementation, when the first optical communication apparatus 20 is an integrated functional module in the ONU, FIG. 5 is a schematic diagram of a structure of an ONU in which a first optical communication apparatus is located according to an embodiment. As shown in FIG. 5, the first optical communication apparatus 20 further includes an electrical interface (for ease of differentiation, a first electrical interface 24 is used instead for description below). The first electrical interface 24 is electrically connected to the frequency locking module 21 and an optical digital signal processor (oDSP) in the ONU in which the first optical communication apparatus 20 is located. During actual operation, after receiving fourth signal light or fifth signal light from the second optical communication apparatus 10, the ONU in which the first optical communication apparatus 20 is located may extract a network control signal from the fourth signal light by using the oDSP and extract a network status signal from the fifth signal light. Next, the oDSP may transmit the network control signal and the network status signal to the frequency locking module 21 through the first electrical interface 24. In addition, the oDSP may further determine bit information (that is, a to-be-transmitted bit signal) of current uplink transmission and transmit the to-be-transmitted bit information to the frequency locking module 21 through the first electrical interface 24. Optionally, the oDSP may be electrically connected to the frequency locking module 21 by a bus. In other words, the first electrical interface 24 may be a bus interface. Further, it may be understood herein that, in this implementation, the first optical interface 23 may establish an optical connection with the second optical communication apparatus 10 through an optical interface on the ONU in which the first optical communication apparatus is located, to implement sending or receiving of signal light.

Figure 6:
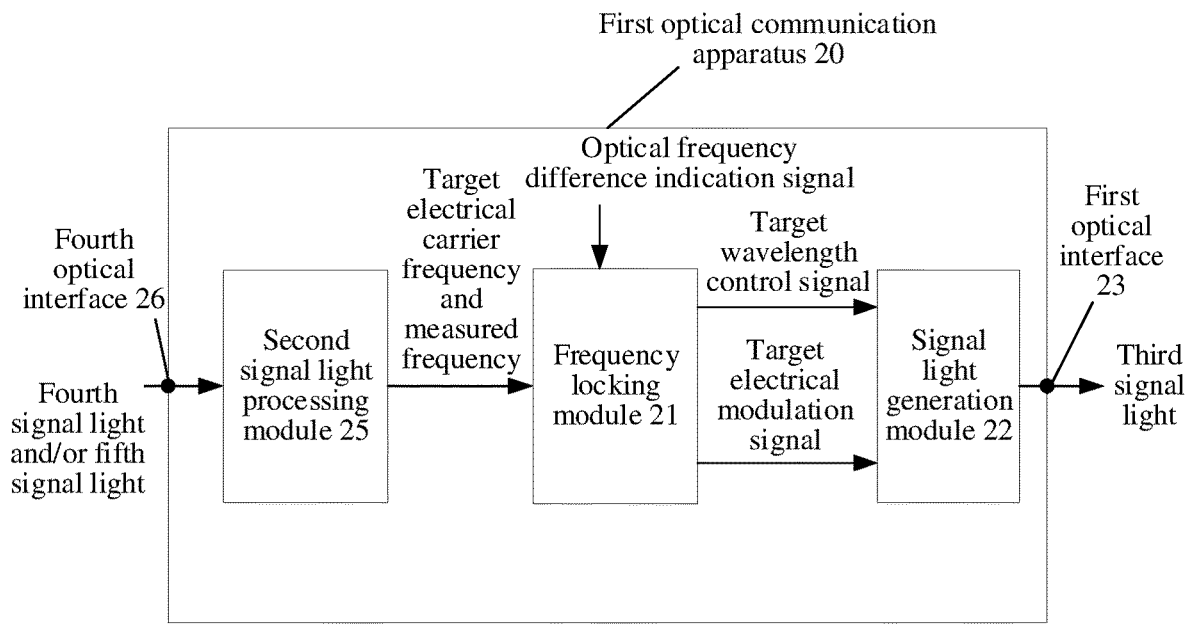
FIG. 6 is another schematic diagram of a structure of a first optical communication apparatus according to an embodiment.

In another implementation, FIG. 6 is another schematic diagram of a structure of a first optical communication apparatus according to an embodiment. When the first optical communication apparatus 20 is the ONU, as shown in FIG. 6, the first optical communication apparatus 20 may further include a signal light processing module 25 (for ease of differentiation, a second signal light processing module 25 is used instead for description below) and a fourth optical interface 26. The fourth optical interface 26 is optically connected to the second signal light processing module 25. The fourth optical interface 26 is further optically connected to the second optical interface 13 of the second optical communication apparatus 10. The second signal light processing module 25 is electrically connected to the frequency locking module 21. During actual operation, the fourth optical interface 26 is configured to: receive the fourth signal light and the fifth signal light from the second optical communication apparatus 10 and transmit the fourth signal light and the fifth signal light to the second signal light processing module 25. The second signal light processing module 25 may perform operations such as optical demodulation and electrical demodulation on the fourth signal light and the fifth signal light, to obtain the network control signal and the network status signal from the second optical communication apparatus 10. Next, the second signal light processing module 25 may extract the measured electrical carrier frequency of the second signal light and the target electrical carrier frequency from the network control signal and the network status signal and transmit the target electrical carrier frequency and the measured electrical carrier frequency of the second signal light to the frequency locking module 21 through the first electrical interface 24. Optionally, the second signal light processing module 25 may be electrically connected to the frequency locking module 21 by a bus. In this case, the first electrical interface 24 is a bus interface.

For ease of description, other structures and functions of the first optical communication apparatus 20 are further explained and described by using a scenario in which the first optical communication apparatus 20 is an integrated functional module in the ONU as an example. The implementations of various structures and functions of the first optical communication apparatus 20 described subsequently are also applicable to a scenario in which the first optical communication apparatus 20 is the ONU, and details are not described herein again.

Figure 7:
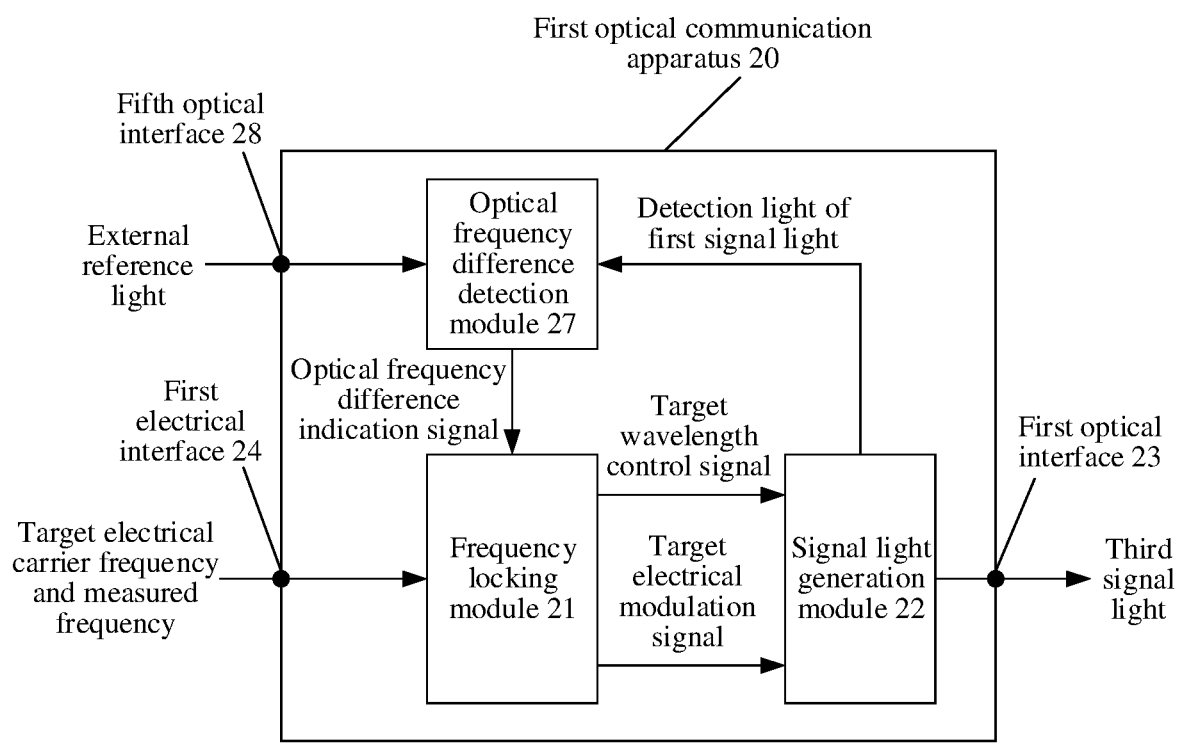
FIG. 7 is another schematic diagram of a structure of a first optical communication apparatus according to an embodiment.

Further, FIG. 7 is another schematic diagram of a structure of a first optical communication apparatus according to an embodiment. As shown in FIG. 7, the first optical communication apparatus 20 may further include an optical frequency difference detection module 27 and another optical interface (for ease of differentiation, a fifth optical interface 28 is used instead for description below). The optical frequency difference detection module 27 is optically connected to the fifth optical interface 28 and the signal light generation module 22, and the optical frequency difference detection module 27 is further electrically connected to the frequency locking module 21. The fifth optical interface 28 may further be optically connected to the second optical interface 13 on the second optical communication apparatus 10. The fifth optical interface 28 may be configured to: receive external reference light from the second optical communication apparatus 10 and send the external reference light to the optical frequency difference detection module 27. The optical frequency difference detection module 27 may be configured to: detect the optical frequency difference indication signal and send the optical frequency difference indication signal to the frequency locking module 21. It should be noted that, during actual application, the optical frequency difference detection module 27 may be a module included in the first optical communication apparatus 20 shown in FIG. 7 or may be a module that is independent of the first optical communication apparatus 20 and establishes an electrical connection with the first optical communication apparatus 20. This is not limited. It may be understood that, when the optical frequency difference detection module 27 is not included in the first optical communication apparatus, the first optical communication apparatus may not include the fifth optical interface 28. For ease of description, a structure and a function of the first optical communication apparatus 20 are further described below by using an implementation in which the optical frequency difference detection module 27 is included in the first optical communication apparatus 20 as an example.

Figure 8:
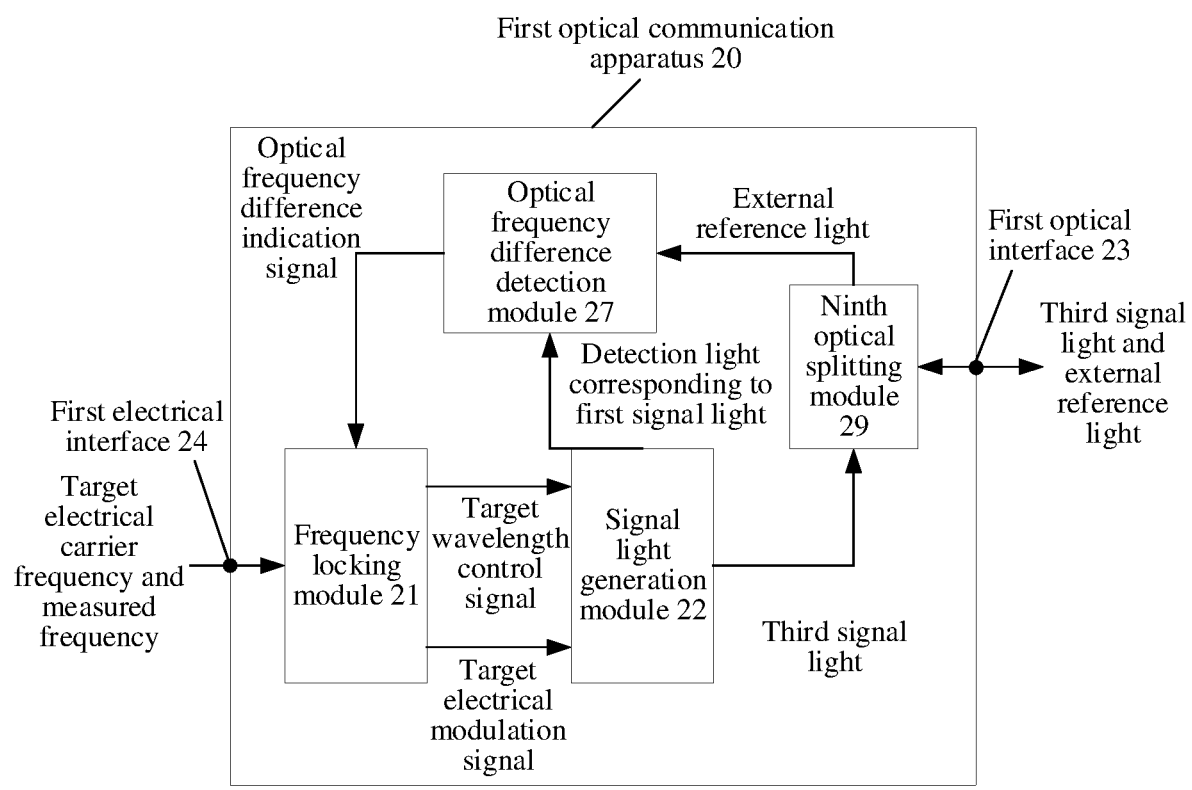
FIG. 8 is another schematic diagram of a structure of a first optical communication apparatus according to an embodiment.

Optionally, the first optical interface 23 and the fifth optical interface 28 may be a same optical interface (for ease of understanding, only the first optical interface 23 is used for description below). For example, FIG. 8 is another schematic diagram of a structure of a first optical communication apparatus according to an embodiment. As shown in FIG. 8, the first optical communication apparatus 20 may further include a ninth optical splitting module 29. The ninth optical splitting module 29 is optically connected to the optical frequency difference detection module 27, the signal light generation module 22, and the first optical interface 23. After receiving external reference light, the first optical interface 23 may input the external reference light into the ninth optical splitting module 29. The ninth optical splitting module 29 may transmit the external reference light to the optical frequency difference detection module 27. In addition, the ninth optical splitting module 29 may receive third signal light from the signal light generation module 22 (also, the first signal light and the second signal light may be received by the ninth optical splitting module 29 from the signal light generation module 22), and output the third signal light to the second optical communication apparatus 10 through the first optical interface 23. In other words, a main function of the ninth optical splitting module 29 is to establish independent optical paths between the first optical interface 23 and the optical frequency difference detection module 27 and between the first optical interface 23 and the signal light generation module 22, so that the external reference light transmitted between the optical frequency difference detection module 27 and the first optical interface 23 and the signal light (including the first signal light, the second signal light, and the third signal light) transmitted between the signal light generation module 22 and the first optical interface 23 are isolated from each other. It should be noted that, the foregoing ninth optical splitting module 29 may be a directional coupler with a waveguide, a discrete optical splitter, a spatial optics-based optical splitting assembly, or the like, which is not limited herein. For ease of description, an example in which the first optical interface 23 and the fifth optical interface 28 are a same optical interface is used below to further explain and describe a structure and a function of the first optical communication apparatus 20.

One optical splitting module enables the first optical interface 23 to implement bidirectional optical transmission, which can simplify complexity of an optical interface of the first optical communication apparatus 20 and improve system integration and application flexibility of the first optical communication apparatus 20.

Further, this embodiment may further provide a plurality of implementations of the optical frequency difference detection module 27. The plurality of implementations may be separately described below.

An implementation 1 of the optical frequency difference detection module 27 is as follows:

The optical frequency difference detection module 27 may be configured to: obtain an optical frequency difference indication signal formed by the external reference light and detection light of the first signal light and send the optical frequency difference indication signal to the frequency locking module 21. The optical frequency difference indication signal is a beat frequency signal formed by the external reference light and the detection light of the first signal light (for ease of differentiation, the target beat frequency signal is used instead for description below). The beat frequency signal is a signal obtained by superimposing two initial signals with similar frequencies. A change from a high amplitude to a low amplitude of the signal is one beat. A quantity of beats in a unit time is a beat frequency of the signal, and the beat frequency of the signal is a frequency difference between the two initial signals. The detection light corresponding to the first signal light is obtained by splitting signal light or an optical carrier generated by the light source included in the signal light generation module 22 when the signal light generation module 22 outputs the first signal light. It should be noted herein that, in a scenario in which the signal light generation module 22 uses a direct modulation mode, light output by the light source included in the signal light generation module 22 is signal light. It should be noted herein that, in a scenario in which the signal light generation module 22 uses an external modulation mode, light output by the light source included in the signal light generation module 22 is an optical carrier.

The optical frequency difference detection module is implemented by using a beat frequency detection structure, so that the optical frequency difference detection module has a simple structure and is easy to implement, and structural complexity and costs of the optical frequency difference detection module can be reduced, so that structural stability of the first optical communication apparatus is improved and costs of the first optical communication apparatus are reduced.

Figure 9:
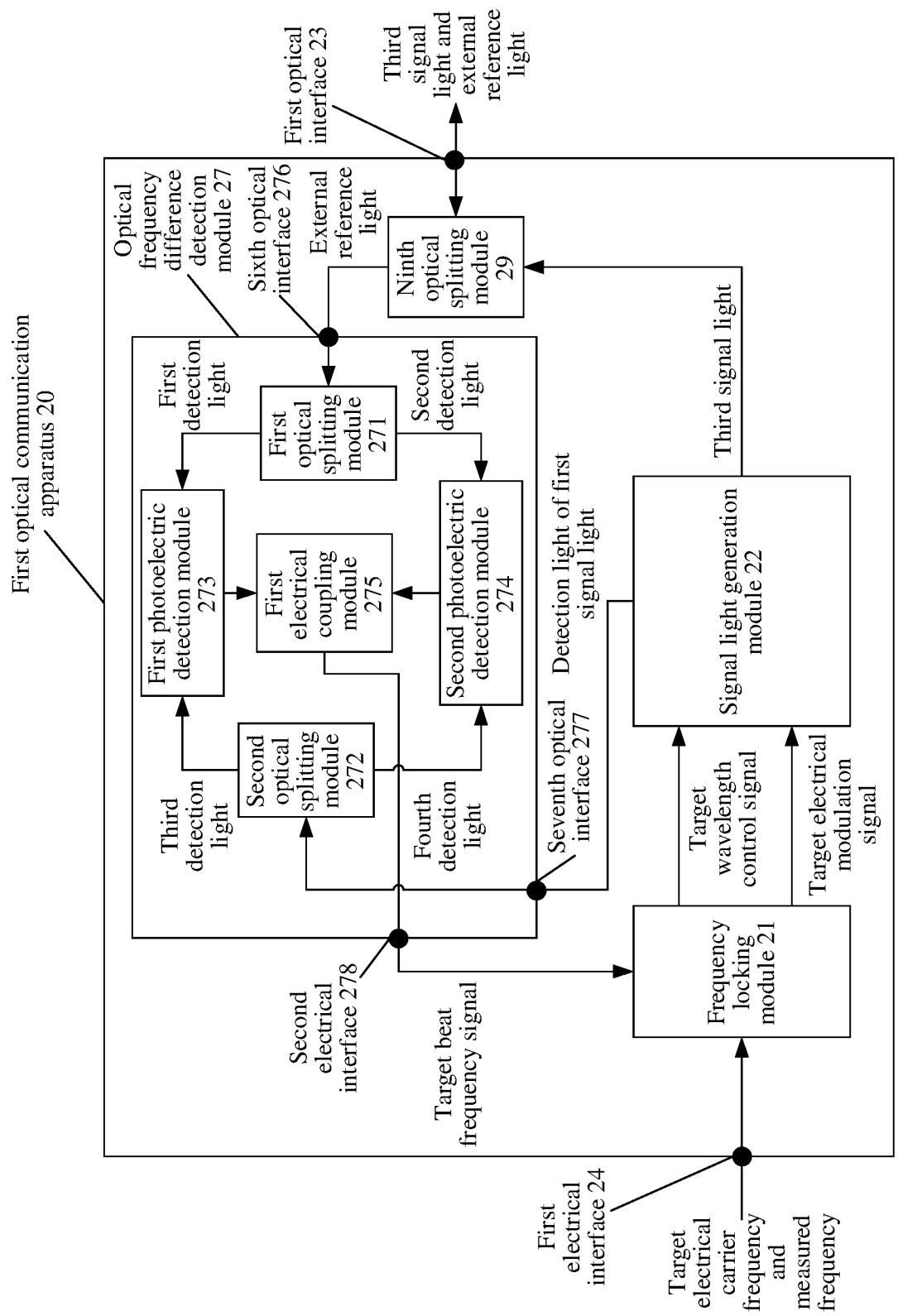
FIG. 9 is another schematic diagram of a structure of a first optical communication apparatus according to an embodiment.

FIG. 9 is another schematic diagram of a structure of a first optical communication apparatus according to an embodiment. As shown in FIG. 9, the optical frequency difference detection module 27 may include a first optical splitting module 271, a second optical splitting module 272, a first photoelectric detection module 273, a second photoelectric detection module 274, a first electrical coupling module 275, a sixth optical interface 276, a seventh optical interface 277, and a second electrical interface 278. The first optical splitting module 271 is optically connected to the ninth optical splitting module 29 by the sixth optical interface 276, and the first optical splitting module 271 is optically connected to the first photoelectric detection module 273 and the second photoelectric detection module 274. The second optical splitting module 272 is optically connected to the signal light generation module 22 by the seventh optical interface 277 and is further optically connected to the first photoelectric detection module 273 and the second photoelectric detection module 274. The first electrical coupling module 275 is electrically connected to both the first photoelectric detection module 273 and the second photoelectric detection module 274 and is further electrically connected to the frequency locking module 21 by the second electrical interface 278.

During actual operation, the first optical splitting module 271 receives external reference light from the ninth optical splitting module 29 through the sixth optical interface 276, splits the external reference light into first detection light and second detection light, sends the first detection light to the first photoelectric detection module 273, and sends the second detection light to the second photoelectric detection module 274. The first detection light is a component of the external reference light in a first polarization direction, and the second detection light is a component of the external reference light in a second polarization direction. The first polarization direction is a preset polarization direction of the first optical splitting module 271, and the second polarization direction is a polarization direction orthogonal to the first polarization direction. The second optical splitting module 272 receives the detection light corresponding to the first signal light from the signal light generation module 22 through the seventh optical interface 277, and may split the detection light corresponding to the first signal light to obtain third detection light and fourth detection light, send the third detection light to the first photoelectric detection module 273, and send the fourth detection light to the second photoelectric detection module 274. The third detection light is a component of the detection light corresponding to the first signal light in a third polarization direction, and the fourth detection light is a component of the detection light of the first signal light in a fourth polarization direction. In addition, the third polarization direction is a preset polarization direction of the second optical splitting module 272, and the fourth polarization direction is orthogonal to the third polarization direction. It should be additionally noted herein that the first polarization direction and the third polarization direction may be the same or may be different. This is not limited. In some embodiments, optical power of the third detection light and optical power of the fourth detection light are the same. The first photoelectric detection module 273 is configured to: receive the first detection light and the third detection light, detect a beat frequency signal that is in a voltage form and that is formed by the first detection light and the third detection light due to an optical frequency difference (for ease of differentiation, a first beat voltage signal is used instead for description below), and send the first beat voltage signal to the first electrical coupling module 275. A signal amplitude of the first beat voltage signal is a first preset signal amplitude. Similarly, the second photoelectric detection module 274 is configured to: receive the second detection light and the fourth detection light, detect a beat frequency signal that is in a voltage form and that is formed by an optical frequency difference between the second detection light and the fourth detection light (for ease of differentiation, a second beat voltage signal is used instead for description below), and send the second beat voltage signal to the first electrical coupling module 275. A signal amplitude of the second beat voltage signal is also the first preset signal amplitude. The first electrical coupling module 275 is configured to: receive the first beat voltage signal and the second beat voltage signal, perform signal coupling on the first beat voltage signal and the second beat voltage signal to obtain a target beat frequency signal, and then send the target beat frequency signal to the frequency locking module 21 through the second electrical interface 278.

Optionally, when the optical frequency difference detection module 27 uses a waveguide structure, polarization directions of the first detection light and the second detection light are the same, and polarization directions of the third detection light and the fourth detection light are also the same.

Optionally, the optical splitting modules (for example, the first optical splitting module 271 and the second optical splitting module 272) included in the optical frequency difference detection module 27 may be implemented by using a polarization rotator splitter. The photoelectric detection modules (for example, the first photoelectric detection module 273 and the second photoelectric detection module 274) in the optical frequency difference detection module 27 may be implemented by using a photoelectric detector and a trans-impedance amplifier. The electrical coupling module (for example, the first electrical coupling module 275) in the optical frequency difference detection module 27 may be implemented by using an electrical coupler.

Figure 10:
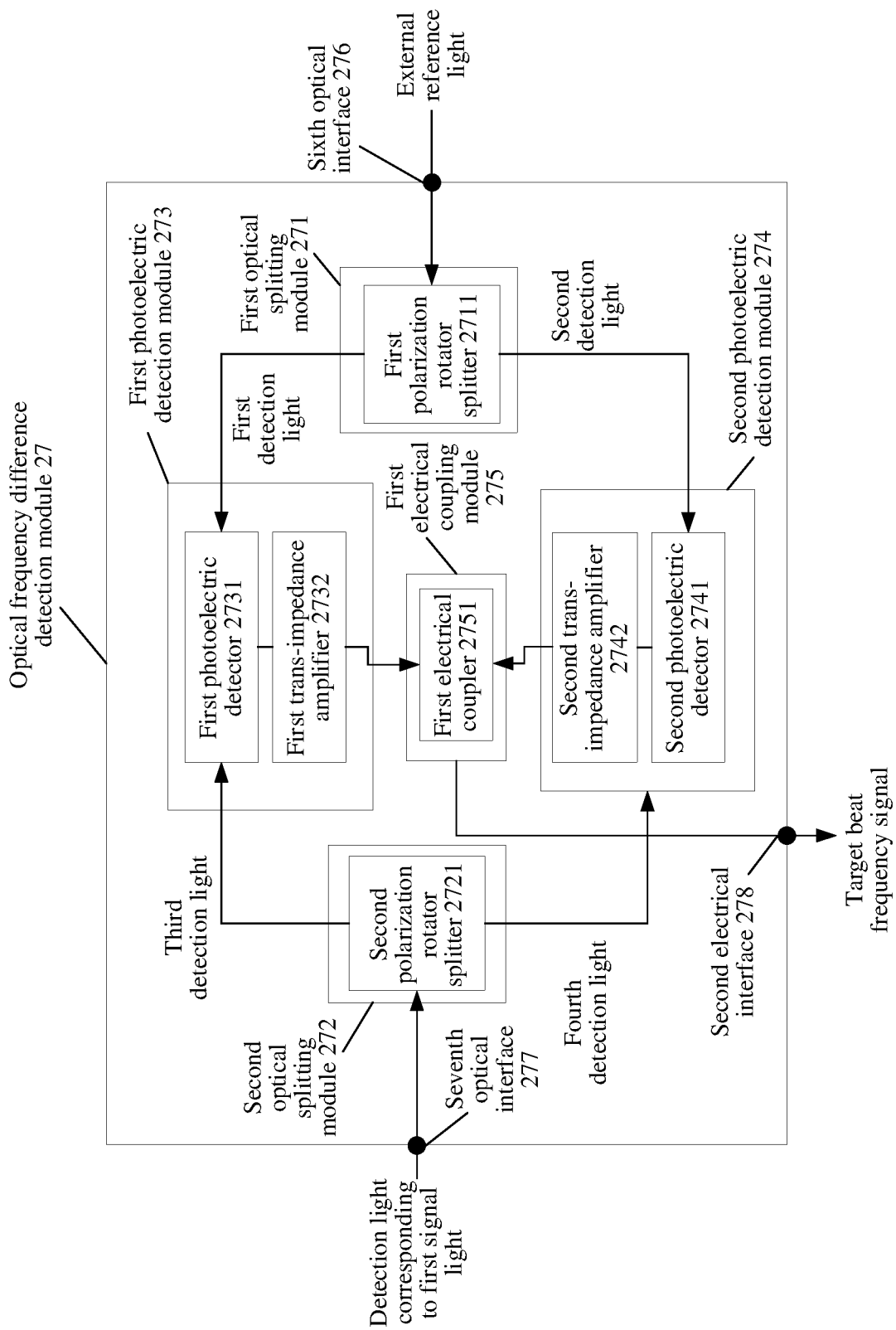
FIG. 10 is a schematic diagram of an implementation of an optical frequency difference detection module according to an embodiment.

For example, FIG. 10 is a schematic diagram of an implementation of an optical frequency difference detection module according to an embodiment. As shown in FIG. 10, the first optical splitting module 271 may be a first polarization rotator splitter 2711. The second optical splitting module 272 may be a second polarization rotator splitter 2721. The first photoelectric detection module 273 may include a first photoelectric detector 2731 and a first trans-impedance amplifier 2732. The second photoelectric detection module 274 may include a second photoelectric detector 2741 and a second trans-impedance amplifier 2742. The first electrical coupling module 275 may be a first electrical coupler 2751. The first polarization rotator splitter 2711 is optically connected to the sixth optical interface 276, the first photoelectric detector 2731, and the second photoelectric detector 2741. The second polarization rotator splitter 2721 is optically connected to the first photoelectric detector 2731, the second photoelectric detector 2741, and the seventh optical interface 277. The first trans-impedance amplifier 2732 is electrically connected to the first photoelectric detector 2731 and the first electrical coupler 2751. The second trans-impedance amplifier 2742 is electrically connected to the second photoelectric detector 2741 and the first electrical coupler 2751, and the first electrical coupler 2751 is further electrically connected to the second electrical interface 278.

During actual operation, the first polarization rotator splitter 2711 may receive external reference light through the sixth optical interface 276, separate a light component that is in the external reference light and that is given a first polarization direction of the first polarization rotator splitter 2711, to obtain first detection light, and send the first detection light to the first photoelectric detector 2731. In addition, the first polarization rotator splitter 2711 may further separate a light component that is in the external reference light and that is in the second polarization direction orthogonal to the first polarization direction, rotate the polarization direction of the light component in the second polarization direction to the first polarization direction to obtain second detection light, and send the second detection light to the second photoelectric detector 2741. The second polarization rotator splitter 2721 may receive, through the seventh optical interface 277, the detection light corresponding to the first signal light, separate a light component that is in the detection light corresponding to the first signal light and that is given a third polarization direction of the second polarization rotator splitter 2721, to obtain third detection light, and send the third detection light to the first photoelectric detector 2731. In addition, the second polarization rotator splitter 2721 may further separate a light component that is in the detection light of the first signal light and that is in the fourth polarization direction perpendicular to the third polarization direction, rotate the polarization direction of the light component in the fourth polarization direction to the third polarization direction to obtain fourth detection light, and send the fourth detection light to the second photoelectric detector 2741. The first photoelectric detector 2731 may detect a beat frequency signal that is in a current form and that is formed by the first detection light and the third detection light due to an optical frequency difference (for ease of differentiation, a first beat current signal is used instead for description below), and send the first beat current signal to the first trans-impedance amplifier 2732. The first trans-impedance amplifier 2732 may convert the first beat current signal into a corresponding voltage signal and adjust a signal amplitude of the voltage signal obtained through conversion to a first preset signal amplitude, to obtain the first beat voltage signal. Next, the first trans-impedance amplifier 2732 may send the first beat voltage signal to the first electrical coupler 2751. The second photoelectric detector 2741 may detect a beat frequency signal that is in a current form and that is formed by the second detection light and the fourth detection light due to an optical frequency difference (for ease of differentiation, a second beat current signal is used instead for description below), and send the second beat current signal to the second trans-impedance amplifier 2742. The second trans-impedance amplifier 2742 may convert the second beat current signal into a corresponding voltage signal and adjust a signal amplitude of the voltage signal to the first preset signal amplitude, to obtain the second beat voltage signal. Next, the second trans-impedance amplifier 2742 may send the second beat voltage signal to the first electrical coupler 2751. The first electrical coupler 2751 may perform electrical signal coupling on the first beat voltage signal and the second beat voltage signal that are received by the first electrical coupler 2751, to obtain the target beat frequency signal (that is, the optical frequency difference indication signal), and then transmit the target beat frequency signal to the frequency locking module 21 through the second electrical interface 278. The optical frequency difference detection module 27 is implemented by using optical splitting modules, photoelectric detection modules, and electrical coupling modules that are common and have low costs, so that costs of the first optical communication apparatus 20 can be reduced. In addition, because device features of the optical splitting modules, the photoelectric detection modules, and the electrical coupling modules are stable, stable performance of the optical frequency difference detection module 27 can be ensured, so that performance of the first optical communication apparatus 20 is stable.

Optionally, during actual application, the first photoelectric detector 2731, the second photoelectric detector 2741, the first polarization rotator splitter 2711, and the second polarization rotator splitter 2721 may be integrated on a same photonic chip (for ease of differentiation, a first photonic chip is used instead for description below). In some embodiments, the first photonic chip may be a silicon photonic chip. The first photoelectric detector, the second photoelectric detector, the first optical splitting module, and the second optical splitting module are integrated on one photonic chip, so that integration and stability of the optical frequency difference detection module can be improved.

An implementation 2 of the optical frequency difference detection module 27 is as follows:

The optical frequency difference detection module 27 includes a microring module 279. If a difference between a resonance frequency of the microring module 279 and the frequency of the external reference light is less than or equal to the first preset difference, it may be considered that the resonance frequency of the microring module 279 is equal to the frequency of the external reference light. The optical frequency difference detection module 27 may obtain a first optical power indication signal used for indicating optical power of fifth detection light and a second optical power indication signal used for indicating optical power of sixth detection light, and send the first optical power indication signal and the second optical power indication signal as optical frequency difference indication signal to the signal light generation module 22. The detection signal light corresponding to the first signal light may be split to obtain the fifth detection light and seventh detection light. Light output by the microring module 279 when the seventh detection light is input may be split to obtain the sixth detection light.

Figure 11:
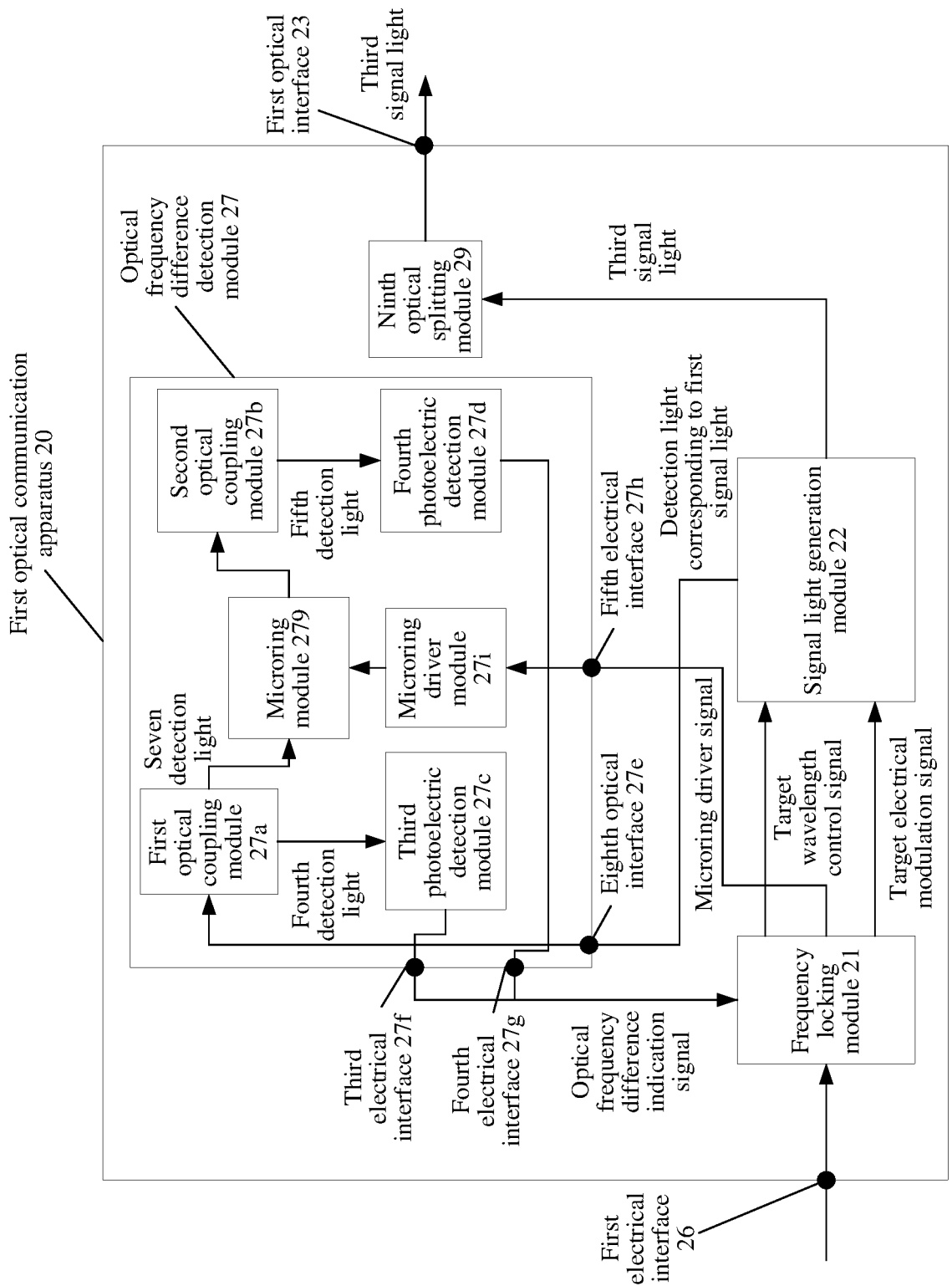
FIG. 11 is another schematic diagram of a structure of a first optical communication apparatus according to an embodiment.

FIG. 11 is another schematic diagram of a structure of a first optical communication apparatus according to an embodiment. As shown in FIG. 11, the optical frequency difference detection module 27 may further include a first optical coupling module 27a, a second optical coupling module 27b, a third photoelectric detection module 27c, a fourth photoelectric detection module 27d, an eighth optical interface 27e, a third electrical interface 27f, a fourth electrical interface 27g, a fifth electrical interface 27h, and a microring driver module 27i. The first optical coupling module 27a is optically connected to the signal light generation module 22 by the eighth optical interface 27e. The first optical coupling module 27a is further optically connected to the microring module 279 and the third photoelectric detection module 27c. The second optical coupling module 27b is optically connected to the microring module 279 and the fourth photoelectric detection module 27d. The third photoelectric detection module 27c is further electrically connected to the frequency locking module 21 by the third electrical interface 27f, and the fourth photoelectric detection module 27d is further optically connected to the frequency locking module 21 by the fourth electrical interface 27g. One side of the microring driver module 27i is electrically connected to the microring module 279, and the other side is electrically connected to the frequency locking module 21 by the fifth electrical interface 27h.

During actual operation, the first optical coupling module 27a receives, through the eighth optical interface 27e, detection light corresponding to the first signal light, splits the detection light corresponding to the first signal light to obtain fifth detection light and seventh detection light, transmits the fifth detection light to the third photoelectric detection module 27c, and transmits the seventh detection light to the microring module 279. The third photoelectric detection module 27c may detect the first optical power indication signal of the fifth detection light and transmit the first optical power indication signal to the frequency locking module 21 by the third electrical interface 27f. The microring module 279 may perform microring filtering on the input seventh detection light, and transmit, to the second optical coupling module 27b, the seventh detection light (that is, light that is output when the seventh detection light is input into the microring module 279) obtained after the microring filtering. The second optical coupling module 27b may split the input seventh detection light obtained by performing the microring filtering to obtain the sixth detection light, and then transmit the sixth detection light to the fourth photoelectric detection module 27d. The fourth photoelectric detection module 27d may detect a second optical power indication signal corresponding to the seventh detection light and transmit the second optical power indication signal to the frequency locking module 21 through the fourth electrical interface 27g. It should be noted herein that, the microring module 279 may absorb an optical component that is included in the input light and whose optical frequency is the same as the resonance frequency of the microring module 279, and an optical component that is in the input light and whose optical frequency is different from the resonance frequency is output from the microring module 279. Therefore, the microring module 279 may filter the input light. Therefore, a difference between the optical power of the input light and the optical power of the output light of the microring module 279 may be used to represent a degree of difference between a frequency of the input light and the resonance frequency of the microring module 279. Therefore, the first optical power indication signal and the second optical power indication signal may be used to indicate a degree of difference between the frequency of the first signal light and the resonance frequency (that is, the frequency of the external reference light) of the microring module 279, and may be used as an optical frequency difference indication signal for further use by the frequency locking module 21. The frequency locking module 21 may further generate a drive signal of the microring module 279 (for ease of differentiation, a microring drive signal is used instead for description below) and send the microring drive signal to the microring driver module 27i through the fifth electrical interface 27h. The microring driver module 27i may superimpose a microring determining signal on a bias voltage of the microring module 279 to obtain a microring drive voltage and transmit the microring drive voltage to the microring module 279, to drive the microring module 279 to work normally. It should be noted herein that there is a correspondence between the microring drive voltage input into the microring module 279 and the resonance frequency of the microring module 279. Therefore, the resonance frequency of the microring module 279 may also be adjusted subsequently by adjusting the microring drive voltage.

Figure 12:
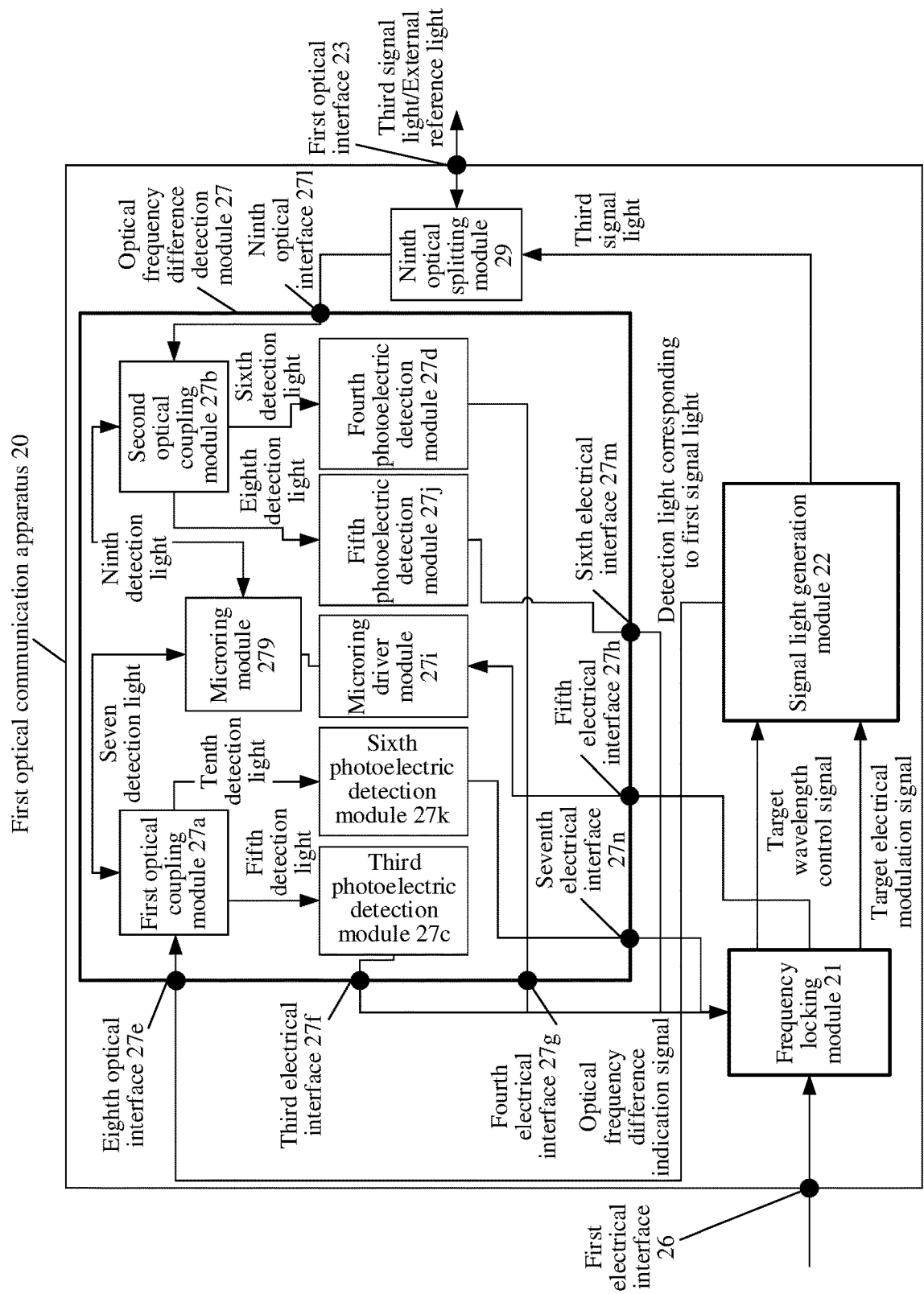
FIG. 12 is another schematic diagram of a structure of a first optical communication apparatus according to an embodiment.

Further, when the difference between the resonance frequency of the microring module 279 and the frequency of the external reference light is not less than or equal to the first preset difference, FIG. 12 is another schematic diagram of a structure of a first optical communication apparatus according to an embodiment. As shown in FIG. 12, the optical frequency difference detection module 27 may further include a fifth photoelectric detection module 27j, a sixth photoelectric detection module 27k, a ninth optical interface 27l, a sixth electrical interface 27m, and a seventh electrical interface 27n.

The second optical coupling module 27b is optically connected to the ninth optical splitting module 29 by the ninth optical interface 27l. The fifth photoelectric detection module 27j is optically connected to the second optical coupling module 27b and is further electrically connected to the frequency locking module 21 by the sixth electrical interface 27m. The sixth photoelectric detection module 27k is optically connected to the first optical coupling module 27a and is further electrically connected to the frequency locking module 21 by the seventh electrical interface 27n.

During actual operation, the second optical coupling module 27b may receive external reference light by the ninth optical interface 27l, split the external reference light to obtain eighth detection light and ninth detection light, transmit the eighth detection light to the fifth photoelectric detection module 27j, and transmit the ninth detection light to the microring module 279. The fifth photoelectric detection module 27j may detect a third optical power indication signal that indicates optical power of the eighth detection light and transmit the third optical power indication signal to the frequency locking module 21 through the sixth electrical interface 27m. The microring module 279 is further configured to: perform microring filtering on the input ninth detection light and transmit the ninth detection light obtained by performing the microring filtering to the first optical coupling module 27a. The first optical coupling module 27a splits the ninth detection light obtained by performing the microring filtering to obtain tenth detection light and sends the tenth detection light to the sixth photoelectric detection module 27k. The sixth photoelectric detection module 27k may detect a fourth optical power indication signal corresponding to the tenth detection light and send the fourth optical power indication signal to the frequency locking module 21 through the seventh electrical interface 27n. Similarly, due to a microring filtering function of the microring module 279, the third optical power indication signal and the fourth optical power indication signal may indicate a degree of difference between the resonance frequency of the microring module 279 and the frequency of the external reference light. Therefore, in a scenario in which the difference between the resonance frequency of the microring module 279 and the frequency of the external reference light s not less than or equal to a first difference, the third optical power indication signal and the fourth optical power indication signal may be used by the frequency locking module 21 to subsequently adjust the resonance frequency of the microring module 279 by adjusting the microring drive signal of the microring module 279, so that the difference between the resonance frequency of the microring module 279 and the frequency of the external reference light is less than or equal to the first preset difference.

Optionally, the third electrical interface 27f, the fourth electrical interface 27g, the sixth electrical interface 27m, and the seventh electrical interface 27n may be implemented by using one electrical interface having a multiple-input single-output function instead. The electrical interface may have at least four input interfaces and one output interface. The four input interfaces are electrically connected to the third photoelectric detection module 27c, the fourth photoelectric detection module 27d, the fifth photoelectric detection module 27j, and the sixth photoelectric detection module 27k respectively. The single output interface of the electrical interface may be electrically connected to the frequency locking module 21.

The optical frequency difference detection module 27 is implemented by using a microring structure, which can expand a detection range of an optical frequency difference and reduce a bandwidth requirement of the entire optical frequency difference detection module 27. This improves stability and effectiveness of detection of the optical frequency difference indication signal.

An implementation of the optical frequency difference detection module 27 is further described below. A structure of the optical frequency difference detection module 27 shown in FIG. 12 is used as an example for description. It should be understood that the implementation of the optical frequency difference detection module 27 described below is also applicable to the structure of the optical frequency difference detection module 27 shown in FIG. 11.

Figure 13:
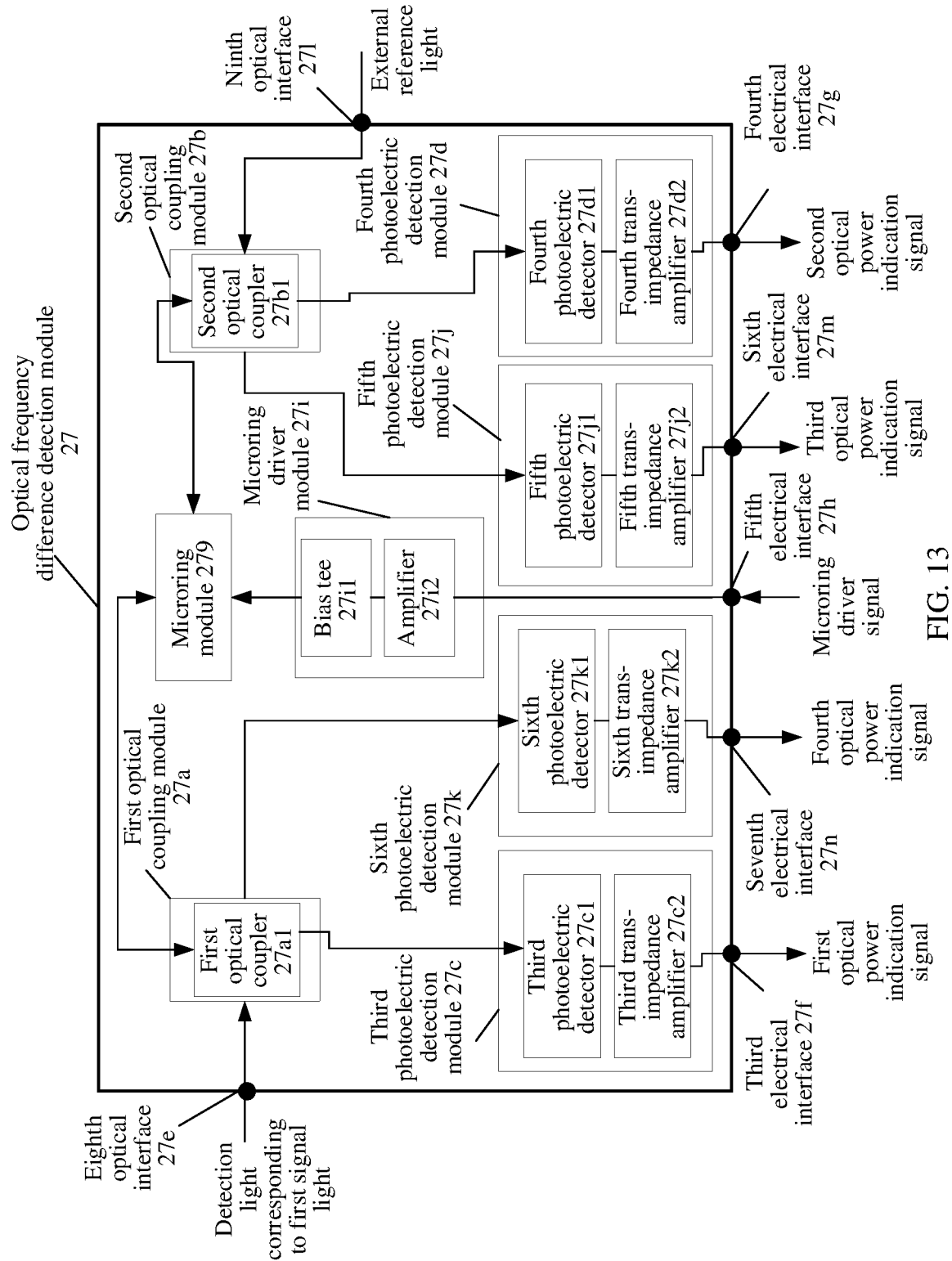
FIG. 13 is another schematic diagram of an implementation of an optical frequency difference detection module according to an embodiment.

FIG. 13 is another schematic diagram of an optical frequency difference detection module according to an embodiment. As shown in FIG. 13, an optical coupling module in the optical frequency difference detection module 27 may be implemented by an optical coupler. For example, the first optical coupling module 27a may be implemented by using a first optical coupler 27a1, and the second optical coupling module 27b may be implemented by using a second optical coupler 27b1. The photoelectric detection modules in the optical frequency difference detection module 27 may be implemented by using a photoelectric detector and a trans-impedance amplifier. For example, the third photoelectric detection module 27c may be implemented by using a third photoelectric detector 27c1 and a third trans-impedance amplifier 27c2. The fourth photoelectric detection module 27d may be implemented by using a fourth photoelectric detector 27d1 and a fourth trans-impedance amplifier 27d2. The fifth photoelectric detection module 27j may be implemented by using a fifth photoelectric detector 27j1 and a fifth trans-impedance amplifier 27j2. The sixth photoelectric detection module 27k may be implemented by using a sixth photoelectric detector 27k1 and a sixth trans-impedance amplifier 27k2. The microring driver module 27i may include a bias device 27i1 and an amplifier 27i2. The amplifier 27i2 is electrically connected to the bias device 27i1 and the fifth electrical interface 27h separately, and the bias device 27i1 is further electrically connected to the microring module 279.

During actual operation, after receiving the detection light corresponding to the first signal light, the first optical coupler 27a1 may obtain fifth detection light and seventh detection light through splitting, transmit the fifth detection light to the third photoelectric detector 27c1, and transmit the seventh detection light to the microring module 279. The third photoelectric detector 27c1 may detect an optical power indication signal that is in a current form and that corresponds to the fifth detection light and send the optical power indication signal in a current form to the third trans-impedance amplifier 27c2. The third trans-impedance amplifier 27c2 may convert the optical power indication signal in a current form into a corresponding voltage signal and adjust a signal amplitude of the voltage signal obtained through conversion to a second preset signal amplitude (that is, amplify the voltage signal), to obtain the first optical power indication signal. The microring module 279 is further configured to: perform microring filtering on the input seventh detection light and transmit the seventh detection light obtained after the microring filtering to the second optical coupler 27b1. The second optical coupler 27b1 then splits the seventh detection light obtained by performing the microring filtering to obtain sixth detection light and sends the sixth detection light to the fourth photoelectric detector 27d1. A principle is the same as those of the third photoelectric detector 27c1 and the third trans-impedance amplifier 27c2, and the fourth photoelectric detector 27d1 and the fourth trans-impedance amplifier 27d2 can also detect and amplify optical power of the sixth detection light, to finally obtain the second optical power indication signal.

Similarly, after receiving the external reference light, the second optical coupler 27b1 may obtain eighth detection light and ninth detection light through splitting. The fifth photoelectric detector 27j1 and the fifth trans-impedance amplifier 27j2 may detect third optical power indication signal of the eighth detection light. The microring module 279 may filter the input ninth detection light and send the filtered ninth detection light to the first optical coupler 27a1. The first optical coupler 27a1 may perform splitting to obtain tenth detection light. The sixth photoelectric detector 27k1 and the sixth trans-impedance amplifier 27k2 may detect fourth optical power indication signal corresponding to the tenth detection light. For the third optical power indication signal and a detection process of the third optical power indication signal, refer to the foregoing detection process of the first optical power indication signal and the second optical power indication signal, and details are not described herein again. It should be noted that, the third trans-impedance amplifier 27c2 and the fourth trans-impedance amplifier 27d2 have a same amplification factor. Amplification factors of the fifth trans-impedance amplifier 27j2 and the sixth trans-impedance amplifier 27k2 are also the same. In addition, the amplifier 27i2 may be configured to amplify a microring drive signal from the fifth electrical interface 27h, to obtain an amplified microring drive signal. The bias device 27i1 is configured to: superimpose the amplified microring drive signal on a preset bias voltage to obtain a microring drive voltage, and then output the microring drive voltage to the microring module 279, to drive the microring module 279 to operate normally.

Optionally, the third photoelectric detector 27c1, the fourth photoelectric detector 27d1, the fifth photoelectric detector 27j1, the sixth photoelectric detector 27k1, the first optical coupler 27a1, the second optical coupler 27b1, and the microring module 279 may be all integrated on a second photonic chip. The second photonic chip and the first photonic chip described above may be a same photonic chip or may be different photonic chips. This is not limited. The third photoelectric detector 27c1, the fourth photoelectric detector 27d1, the fifth photoelectric detector 27j1, the sixth photoelectric detector 27k1, the first optical coupler 27a1, the second optical coupler 27b1, and the microring module 279 are integrated on a same photonic chip, so that integration of the optical frequency difference detection module can be improved.

A plurality of implementations of the microring module 279 provided in embodiments may be separately described below.

Figure 14:
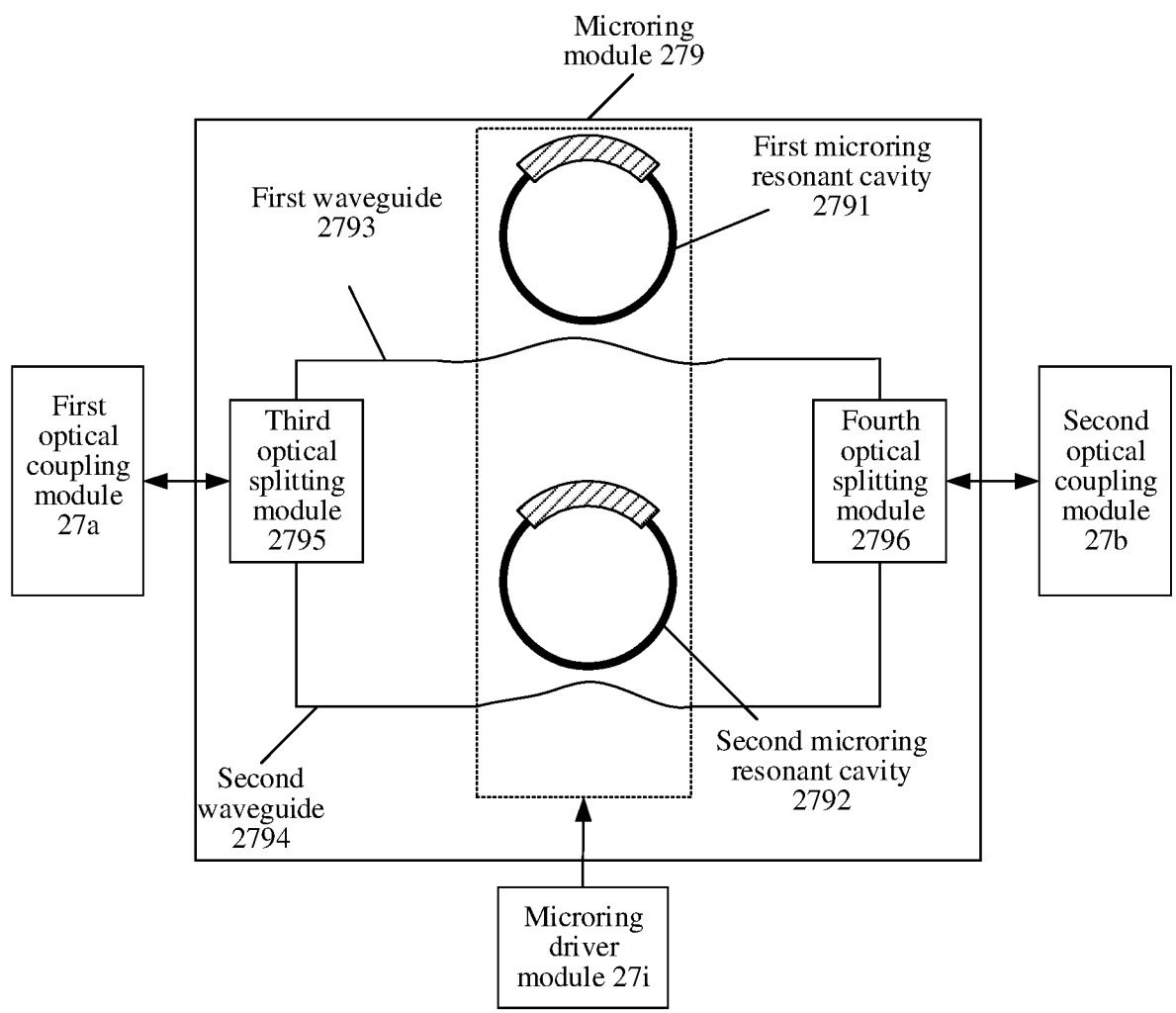
FIG. 14 is a schematic diagram of a structure of a microring module according to an embodiment.

Implementation 1 of the Microring Module 279:

In this implementation, the microring module 279 is implemented based on a single-side coupled microring structure. FIG. 14 is a schematic diagram of a structure of a microring module according to an embodiment. As shown in FIG. 14, the microring module 279 may include a first microring resonant cavity 2791, a second microring resonant cavity 2792, a first waveguide 2793 close to the first microring resonant cavity 2791, a second waveguide 2794 close to the second microring resonant cavity 2792, a third optical splitting module 2795, and a fourth optical splitting module 2796. Two ends of the first waveguide 2793 and the second waveguide 2794 are respectively optically connected to the third optical splitting module 2795 and the fourth optical splitting module 2796. The fourth optical splitting module 2796 is further optically connected to the second optical coupling module 27b. The third optical splitting module 2795 is further optically connected to the first optical coupling module 27a. It should be noted herein that, resonance frequencies of the first microring resonant cavity 2791 and the second microring resonant cavity 2792 are the same and are a resonance frequency of the microring module 279.

During actual operation, the third optical splitting module 2795 may receive the seventh detection light from the first optical coupling module 27a, separate an optical component that is in the seventh detection light and that is given a polarization direction (for ease of differentiation, a fifth polarization direction is used instead for description below) of the third optical splitting module 2795 to form a first path of light, and then input the first path of light into the first waveguide 2793. In addition, the third optical splitting module 2795 further separates an optical component that is in the seventh detection light and that is in a sixth polarization direction, rotates a polarization direction of the separated optical component to the fifth polarization direction to obtain a second path of light, and inputs the second path of light into the second waveguide 2794. The sixth polarization direction is orthogonal to the fifth polarization direction. The first microring resonant cavity 2791 performs microring filtering on the first path of light transmitted in the first waveguide 2793, and the first path of light obtained by performing the microring filtering is transmitted to the fourth optical splitting module 2796. In addition, the second microring resonant cavity 2792 also performs microring filtering on the second path of light transmitted in the second waveguide 2794, and the second path of light obtained by performing the microring filtering is finally transmitted to the fourth optical splitting module 2796. The fourth optical splitting module 2796 multiplexes the first path of light and the second path of light that are obtained by performing the microring filtering, to obtain the seventh detection light that is obtained by performing the microring filtering and transmits the seventh detection light that is obtained by performing the microring filtering to the second optical coupling module 27b.

In addition, the fourth optical splitting module 2796 may further receive the ninth detection light from the second optical coupling module 27b, separate an optical component that is in the ninth detection light and that is given a polarization direction (for ease of differentiation, a seventh polarization direction is used instead for description below) of the fourth optical splitting module 2796 to form a third path of light, and then input the third path of light into the first waveguide 2793. In addition, the fourth optical splitting module 2796 further separates an optical component that is in the sixth detection light and that is in an eighth polarization direction, rotates a polarization direction of the separated optical component to the seventh polarization direction to obtain a fourth path of light, and inputs the fourth path of light into the second waveguide 2794. The seventh polarization direction is orthogonal to the eighth polarization direction. The seventh polarization direction and the fifth polarization direction may be the same or may be different. The first microring resonant cavity 2791 performs microring filtering on the third path of light transmitted in the first waveguide 2793, and the third path of light obtained by performing the microring filtering is transmitted to the third optical splitting module 2795. In addition, the second microring resonant cavity 2792 also performs microring filtering on the fourth path of light transmitted in the second waveguide 2794, and the fourth path of light obtained by performing the microring filtering is finally transmitted to the third optical splitting module 2795. The third optical splitting module 2795 multiplexes the third path of light and the fourth path of light that are obtained by performing the microring filtering, to obtain the ninth detection light that is obtained by performing the microring filtering and transmits the ninth detection light that is obtained by performing the microring filtering to the first optical coupling module 27a.

Figure 15:
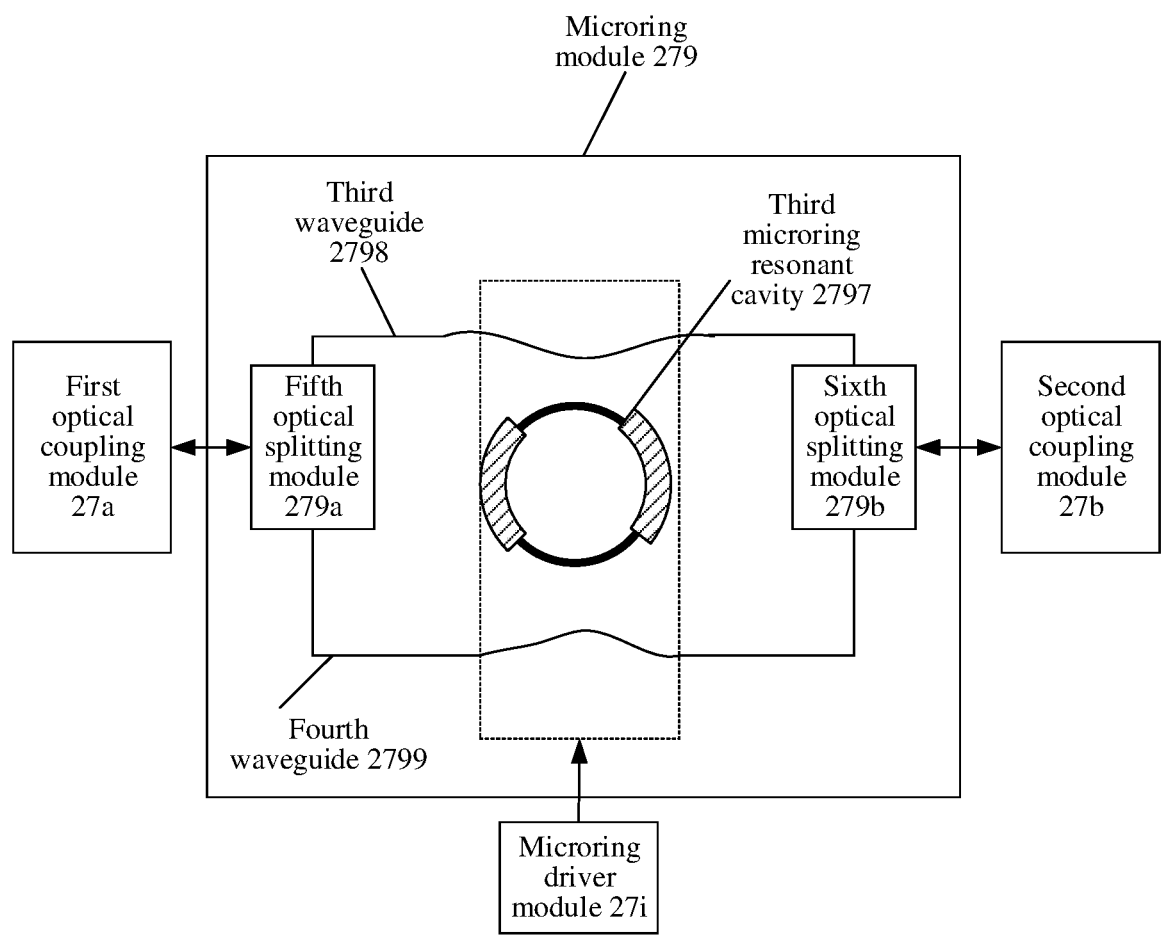
FIG. 15 is another schematic diagram of a structure of a microring module according to an embodiment.

Implementation 2 of the Microring Module 279:

In this implementation, the microring module 279 is implemented based on a double-side coupled microring structure. FIG. 15 is another schematic diagram of a structure of a microring module according to an embodiment. As shown in FIG. 15, the microring module 279 may include a third microring resonant cavity 2797, a third waveguide 2798, a fourth waveguide 2799, a fifth optical splitting module 279a, and a sixth optical splitting module 279b that are coupled on two sides. Two ends of the third waveguide 2798 and the fourth waveguide 2799 are optically connected to the fifth optical splitting module 279a and the sixth optical splitting module 279b respectively. The sixth optical splitting module 279b is further optically connected to the second optical coupling module 27b. The fifth optical splitting module 279a is further optically connected to the first optical coupling module 27a. It should be noted herein that, the resonance frequency of the third microring resonant cavity 2797 is the resonance frequency of the microring module 279.

During actual operation, the fifth optical splitting module 279a has the same function as that of the third optical splitting module 2795, that is, splits the seventh detection light from the first optical coupling module 27a into two paths of light, and then respectively inputs the two paths of light into the third waveguide 2798 and the fourth waveguide 2799. For an optical splitting process, refer to the foregoing description, and details are not described herein again. Next, the third microring resonant cavity 2797 may perform microring filtering on the two paths of light transmitted by the third waveguide 2798 and the fourth waveguide 2799, and the two paths of light obtained by performing the microring filtering are transmitted to the sixth optical splitting module 279b by using the third waveguide 2798 and the fourth waveguide 2799. The sixth optical splitting module 279b has the same function as that of the fourth optical splitting module 2796, that is, the sixth optical splitting module 279b multiplexes the two paths of light obtained by performing the microring filtering to obtain sixth detection light obtained by performing the microring filtering, and then transmits the sixth detection light to the second optical coupling module 27b. Similarly, the sixth optical splitting module 279b may receive the ninth detection light from the second optical coupling module 27b, split the ninth detection light to obtain two paths of light, and then input the two paths of light to the third waveguide 2798 and the fourth waveguide 2799 respectively. The third microring resonant cavity 2797 may perform microring filtering on the two paths of light transmitted by the third waveguide 2798 and the fourth waveguide 2799, and the two paths of light obtained by performing the microring filtering are transmitted to the fifth optical splitting module 279a by using the third waveguide 2798 and the fourth waveguide 2799. The fifth optical splitting module 279a multiplexes the two paths of light obtained by performing the microring filtering to obtain ninth detection light obtained by performing the microring filtering, and then transmits the ninth detection light obtained by performing the microring filtering to the first optical coupling module 27a.

The microring module 279 is implemented by using a double-side coupled microring structure, so that a quantity of microring resonant cavities used by the microring module 279 can be reduced, and integration and reliability of the microring module can be improved.

A structure and a function of the frequency locking module 21 are described below in detail with reference to various implementations described above.

Figure 16:
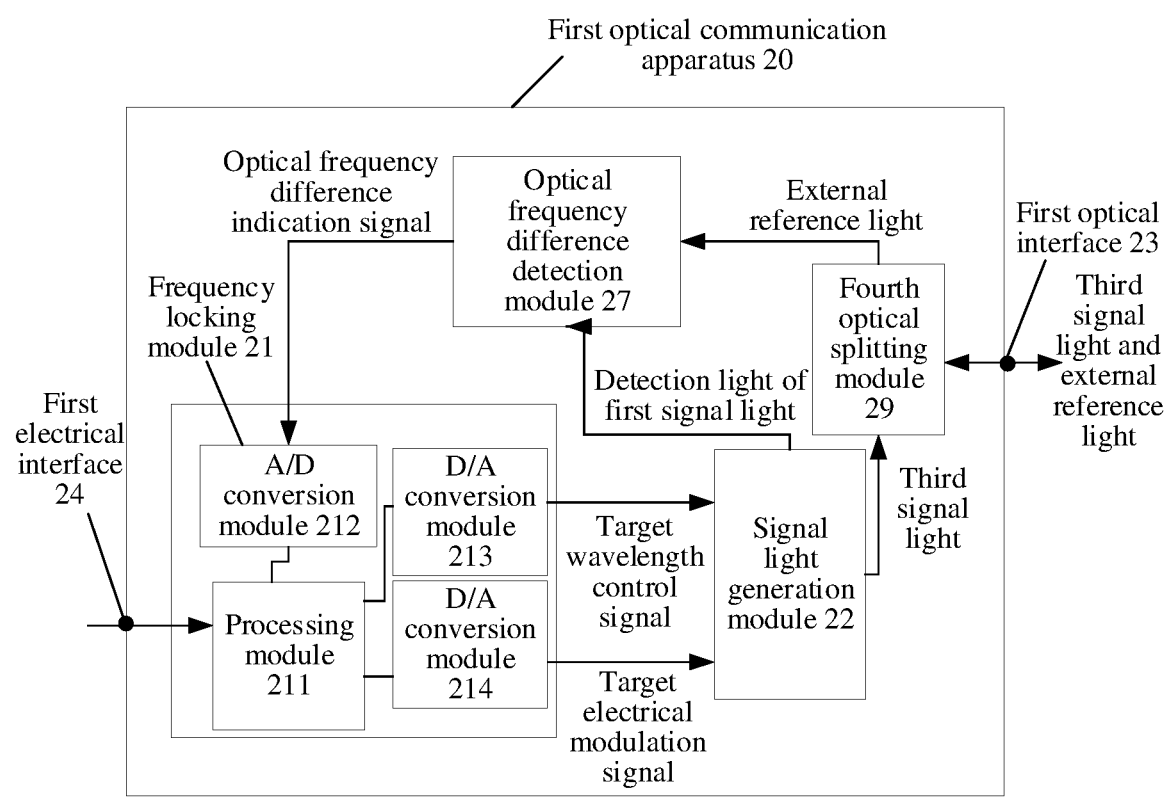
FIG. 16 is another schematic diagram of a structure of a first optical communication apparatus according to an embodiment.

FIG. 16 is another schematic diagram of a structure of a first optical communication apparatus according to an embodiment. It should be noted herein that, the plurality of implementations of the optical frequency difference detection module 27 described above may be also applicable to the optical frequency difference detection module 27 shown in FIG. 16. However, with different implementations of the optical frequency difference detection module 27, a connection relationship between the optical frequency difference detection module 27 and the frequency locking module 21 also changes. Therefore, FIG. 16 is only a schematic description of a connection relationship between the frequency locking module 21 and the optical frequency difference detection module 27 and does not have a limitation function.

As shown in FIG. 16, the frequency locking module 21 may include a processing module 211, an A/D (analog to digital) conversion module 212, a D/A (digital to analog) conversion module 213, and a D/A conversion module 214. The processing module 211 is electrically connected to the A/D conversion module 212, the D/A conversion module 213, the D/A conversion module 214, and the first electrical interface 26. The A/D conversion module 212 is further electrically connected to the optical frequency difference detection module 27. The D/A conversion module 213 and the D/A conversion module 214 are further electrically connected to the signal light generation module 22.

A process in which the frequency locking module 21 generates and sends the target wavelength control signal and the target electrical modulation signal to the signal light generation module 22 is described below in detail with reference to the content described in implementation 1 and implementation 2 of the optical frequency difference detection module 27 described above.

In a scenario in which the optical frequency difference detection module 27 uses the foregoing implementation 1:

In an aspect, the A/D conversion module 212 may receive an optical frequency difference indication signal from the optical frequency difference detection module 27, that is, the target beat frequency signal described above. The A/D conversion module 212 may perform signal sampling on the target beat frequency signal to obtain a sampled target beat frequency signal (for ease of description, a target sampling signal is used instead below), and transmit the target sampling signal to the processing module 211. The processing module 211 may determine the target optical frequency difference based on the target sampling signal. Next, the processing module 211 may extract a preconfigured first preset adjustment coefficient and determine the target wavelength control signal in a digital signal form based on the target optical frequency difference and the first preset adjustment coefficient. Next, the processing module 211 may send the target wavelength control signal in the digital signal form to the D/A conversion module 213. The D/A conversion module 213 converts the target wavelength control signal in the digital signal form into a target wavelength control signal in an analog signal form and transfers the target wavelength control signal in the analog signal form to the signal light generation module 22.

During an implementation, it is assumed that a target sampling signal input into the processing module 211 at the first moment (that is, the sampling moment is the first moment, and it is assumed herein that the sampling moment is n) is $S_n$, and the target sampling signal $S_n$ satisfies the following relational expression (1):

$$S_n = v_\varepsilon \times \sin(\Delta\omega n + \varphi) \qquad (1)$$

$v_\varepsilon$ is a signal amplitude of the target sampling signal. $\Delta\omega$ is an optical frequency difference. $\varphi$ is an initial phase of the target sampling signal. The processing module 211 may process the target sampling signal $S_n$ by using methods such as a cross-correlation algorithm, a gradient descent algorithm, a Kalman filter, and a zero-forcing algorithm to obtain the target wavelength control signal. A process in which the processing module 211 generates the target wavelength control signal based on the target sampling signal $S_n$ (it is assumed below that the target wavelength control signal in the digital form is $V_{n+1}$, and a wavelength control signal at a moment n is $V_n$) is described below by using the gradient reduction algorithm as an example.

The processing module 211 may filter the target sampling signal $S_n$ and a sampling signal corresponding to a beat frequency signal received by the processing module 211 in a preset time period (for ease of differentiation, the first preset time period is used below), to obtain a to-be-converted signal. An end moment of the first preset time period is the first moment n. The sampling signal corresponding to the beat frequency signal received by the processing module 211 in the first preset time period is a sampled beat frequency signal received by the processing module 211 from the A/D conversion module 212 at a plurality of sampling moments before the first moment n. The processing module 211 may filter, by using the preconfigured digital filter, the target sampling signal $S_n$ and the sampling signal that is received by the processing module 211 in the first preset time period, to obtain the to-be-converted signal. Next, the processing module 211 may perform Fourier transform on the to-be-converted signal to obtain spectrum information corresponding to the first preset time period. The processing module 211 may obtain a frequency peak (which is assumed as fn herein) corresponding to the target sampling signal $S_n$ in the spectrum information and determine the spectrum peak as the target optical frequency difference (which is assumed as $\Delta f_g$ herein). Next, the processing module 211 may determine the target wavelength control signal $V_{n+1}$ based on the target optical frequency difference $\Delta f_g$, the first preset adjustment coefficient (which is assumed as $\mu_1$ herein), and the wavelength control signal (that is, the wavelength control signal output at the first moment n, which is assumed as $V_n$ herein) that is last output by the frequency locking module 21 to the signal light generation module 22. For example, the processing module 211 may calculate the target wavelength control signal $V_{n+1}$ by using the following formula (2):

$$V_{n+1} = V_n + \mu_1 \times (\Delta f_0 - \Delta f_g) \qquad (2)$$

$\mu_1$ is the first preset adjustment coefficient. $\Delta f_0$ is a preset optical frequency difference that is preconfigured. $\Delta f_g$ is the target electrical frequency difference.

After obtaining the target wavelength control signal $V_{n+1}$ in the digital form through calculation, the processing module 211 may obtain the target wavelength control signal in a mode signal form through conversion by the D/A conversion module 213 and send the target wavelength control signal in the mode signal form to the signal light generation module 22.

In another aspect, the processing module 211 may obtain the network control signal and the network status signal from the second optical communication apparatus 10 through the first electrical interface 24, extract the target electrical carrier frequency (which is assumed as $f_{c1}$ herein) from the network control signal, and extract the measured electrical carrier frequency (which is assumed as $f_{c2}$ herein) of the second signal light from the network status signal.

Next, the processing module 211 may calculate the target electrical frequency difference (which is assumed as $\Delta f_d$ herein) based on the measured electrical carrier frequency $f_{c2}$ of the second signal light and the target electrical carrier frequency $f_{c1}$. The target electrical frequency difference $\Delta f_d=(f_{c1}-f_{c2})$. Next, the processing module 211 may determine the target carrier frequency (which is assumed as $f_m$ herein) based on the target electrical frequency difference $\Delta f_d$, the target optical frequency difference $\Delta f_g$, and the target electrical carrier frequency $f_{c1}$. For example, the processing module 211 may calculate the target carrier frequency $f_m$ by using the following formula (3):

$$f_m = f_{c1} + \mu_2 \times \Delta f_d + \mu_3 \times \Delta f_g \quad (3)$$

$\mu_2$ and $\mu_3$ are preset weighting factors, and a sum of $\mu_2$ and $\mu_3$ is equal to 1.

Further, the processing module 211 may further generate a target electrical carrier that satisfies the target carrier frequency $f_m$ (that is, a frequency of the target electrical carrier is equal to the target carrier frequency $f_m$). Next, the processing module 211 may obtain the to-be-transmitted bit information through the first electrical interface 24 and perform electrical modulation on the target electrical carrier based on the to-be-transmitted bit information, to obtain a target electrical modulation signal in a digital signal form. Further, the processing module 211 may send the target electrical modulation signal in the digital signal form to the D/A conversion module 214. The D/A conversion module 214 may convert the target electrical modulation signal in the digital signal form into a target electrical modulation signal in the analog signal form and transmit the target electrical modulation signal in the analog signal form to the signal light generation module 22.

In a scenario in which the optical frequency difference detection module 27 uses the foregoing implementation 2:

In an aspect, in this scenario, the processing module 211 may obtain the target wavelength control signal in a plurality of implementations. The plurality of implementations may be separately described below in detail.

Implementation 1:

The A/D conversion module 212 may receive an optical frequency difference indication signal (that is, the first optical power indication signal and the second optical power indication signal described above) from the optical frequency difference detection module 27, and separately perform signal sampling on the first optical power indication signal and the second optical power indication signal to obtain a sampled first optical power indication signal and a sampled second optical power indication signal, and then transmit the sampled first optical power indication signal and second optical power indication signal to the processing module 211. It should be noted herein that, the first optical power indication signal and the second optical power indication signal before sampling may be stable voltage signals. Therefore, the first optical power indication signal and the second optical power indication signal after sampling are essentially two determined voltage values. It is assumed that a voltage value corresponding to the sampled first optical power indication signal is V1, and a voltage value corresponding to the sampled second optical power indication signal is V2. After receiving the sampled first optical power indication signal and the sampled second optical power indication signal, the processing module 211 may calculate a ratio of the second optical power indication signal to the first optical power indication signal (for ease of differentiation, a second measured ratio is used instead for description below). It is assumed that the second measured ratio is $\varphi_n$, and $$\varphi_n = \frac{V2}{V1}.$$

Next, the processing module 211 may extract the preset optical power ratio-optical frequency difference correspondence set preconfigured by the microring module 279. The preset optical power ratio-optical frequency difference correspondence set includes one or more different measured ratios and an optical frequency difference corresponding to each measured ratio. The processing module 211 may find, in the preset optical power ratio-optical frequency difference correspondence set, an optical frequency difference corresponding to the second measured ratio and determine the optical frequency difference corresponding to the second measured ratio as the target optical frequency difference $\Delta f_g$. Next, the processing module 211 may determine the target wavelength control signal $V_{n+1}$ based on the target optical frequency difference $\Delta f_g$, the first preset adjustment coefficient and the wavelength control signal $V_n$ that is last output by the frequency locking module 21 to the signal light generation module 22. For a process, refer to the foregoing description, and details are not described herein again.

Implementation 2:

The A/D conversion module 212 may receive and process the sampled first optical power indication signal and the sampled second optical power indication signal, and then transmit the sampled first optical power indication signal and second optical power indication signal to the processing module 211. For a process, refer to the process described in the implementation 1. Next, the processing module 211 may calculate the second measured ratio $$\varphi_n = \frac{V2}{V1}$$

of the second optical power indication signal to the first optical power indication signal.

For a process, refer to the process described in the implementation 1. Next, if the processing module 211 determines that the difference between the second measured ratio $\varphi_n$ and the preconfigured second preset ratio $\varphi_{y2}$ is greater than or equal to a third preset difference (which is assumed as $\Delta y_3$ herein), the preset voltage signal may be determined as the target wavelength control signal. It should be noted herein that, the preset voltage signal may be used by the signal light generation module 22 to adjust a drive current of the light source to adjust a frequency of signal light or an optical carrier output by the light source, so that a difference between the second preset ratio $\varphi_{y2}$ and the measured ratio (which is assumed as $\varphi_{n+1}$ herein) obtained by the subsequent processing module 211 through reprocessing is less than a difference between the second measured ratio $\varphi_n$ and the second preset ratio $\varphi_{y2}$, that is, $\varphi_{n+1}$ is closer to the second preset ratio $\varphi_{y2}$. Further, optionally, if the processing module 211 determines that the difference between the second measured ratio $\varphi_n$ and the second preset ratio $\varphi_{y2}$ is less than the third preset difference $\Delta y_3$, the processing module 211 may stop generating and sending the target wavelength control signal to the signal light generation module 22. In a scenario in which the difference between the second measured ratio $\varphi_n$ and the second preset ratio $\varphi_{y2}$ is less than the third preset difference $\Delta y_3$, it may be considered that the frequency of the signal light or the optical carrier output by the light source is equal to the resonance frequency of the microring (that is, the frequency of the external reference light).

It should be further noted herein that, an implementation premise of the foregoing implementation 2 and implementation 1 is that a difference between the resonance frequency of the microring module 279 and the frequency of the external reference light is less than or equal to a second preset difference (which is assumed as $\Delta y_2$ herein). Therefore, when the difference between the resonance frequency of the microring module 279 and the frequency of the external reference light is greater than the second preset difference $\Delta y_2$, the frequency locking module 211 may further adjust the resonance frequency of the microring module 279.

The A/D conversion module 212 may further receive the third optical power indication signal and the fourth optical power indication signal from the optical frequency difference detection module 27 and perform signal sampling on the third optical power indication signal and the fourth optical power indication signal to obtain the sampled third optical power indication signal and fourth optical power indication signal. It should be noted herein that, when the third electrical interface 27*f*, the fourth electrical interface 27*g*, the fifth electrical interface 27*h*, and the sixth electrical interface 27*m* are implemented by using one multiple-input single-output electrical interface, the frequency locking module 21 may receive the third optical power indication signal and the fourth optical power indication signal by using the A/D conversion module 212. In a scenario in which the third optical power indication signal and the fourth optical power indication signal are input into the frequency locking module 21 through another electrical port, the frequency locking module 21 may further include another A/D conversion module other than the A/D conversion module 212 to receive the third optical power indication signal and the fourth optical power indication signal. In addition, similar to the first optical power indication signal and the second optical power indication signal, the third optical power indication signal and the fourth optical power indication signal before sampling may be relatively stable voltage signals. Therefore, the third optical power indication signal and the third optical power indication signal after sampling are essentially two determined voltage values. It is assumed that a voltage value corresponding to the sampled third optical power indication signal is V3, and a voltage value corresponding to the sampled fourth optical power indication signal is V4.

Next, the processing module 211 may calculate a measured ratio of the fourth optical power indication signal to the third optical power indication signal (for ease of differentiation, the first measured ratio is used instead below for description)

$$\gamma_n = \frac{V4}{V3}.$$

Next, if the processing module 211 determines that the difference between the first measured ratio $\gamma_n$ and the preconfigured first preset ratio $\varphi_{y1}$ is greater than or equal to the second preset difference (which is assumed as $\Delta y_2$ herein), the processing module 211 may generate a resonance frequency regulation signal, and send the resonance frequency regulation signal to the optical frequency difference detection module 27. The resonance frequency regulation signal may be actually a stable voltage signal with a small amplitude, and may be used by the optical frequency difference detection module 27 to adjust the resonance frequency of the microring module 279, so that a new first measured ratio (which is assumed as $\gamma_{n+1}$ herein) subsequently obtained by the processing module 211 based on the third optical power indication signal and the fourth optical power indication signal that are newly detected by the optical frequency difference detection module 27 can be closer to the first preset ratio $\varphi_{y1}$, that is, the new first measured ratio $\Delta_{n+1}$ is less than the first preset ratio $\varphi_{y1}$. Further, optionally, if the processing module 211 determines that the difference between the first measured ratio $\gamma_n$ and the preconfigured first preset ratio $\varphi_{y1}$ is less than the second preset difference $\Delta y_2$, it may be considered that the resonance frequency of the microring module 279 is equal to the frequency of the external reference light, and the processing module 211 stops generating and sending the resonance frequency regulation signal to the optical frequency difference detection module 27.

In an implementation process of adjusting the resonance frequency of the microring module 279, the processing module 211 transfers the resonance frequency regulation signal generated by the processing module 211 to the microring driver module 27*i*. Next, the amplifier 27*i*2 in the microring driver module 27*i* transmits the amplified resonance frequency regulation signal to the bias device 27*i*1. The bias device 27*i*1 superimposes the amplified resonance frequency regulation signal and a received bias voltage to obtain a new microring drive voltage. Next, the bias device 27*i*1 transmits the new microring drive voltage to the microring module 279. Because the resonance frequency of the microring module 279 changes with the drive voltage of the microring module 279, the new drive voltage may change the resonance frequency of the microring module 279 and change a new third optical power indication signal and a new fourth optical power indication signal that are detected by the optical frequency difference detection module 27. This change is obtained by the processing module 211 again, and whether a new round of resonance frequency adjustment needs to be performed is further determined. Because a process of each resonance frequency adjustment is the same, details are not described herein again.

In another aspect, in this scenario, the processing module 211 may obtain the network control signal and the network status signal from the second optical communication apparatus 10 through the first electrical interface 24, extract the target electrical carrier frequency $f_{c1}$ from the network control signal, and extract the measured electrical carrier frequency $f_{c2}$ of the second signal light from the network status signal. Next, the processing module 211 may calculate the target electrical frequency difference $\Delta f_d$ based on the measured electrical carrier frequency $f_{c2}$ of the second signal light and the target electrical carrier frequency $f_{c1}$. The target electrical frequency difference $\Delta f_d = (f_{c1} - f_{c2})$. Next, the processing module 211 may determine the target carrier frequency $f_m$, based on the target electrical frequency difference $\Delta f_d$, the target optical frequency difference $\Delta f_g$ obtained in the manner described in the implementation 1, and the target electrical carrier frequency $f_{c1}$. A process in which the processing module 211 determines the target carrier frequency $f_m$, refer to the process of determining the target carrier frequency $f_m$ based on the target electrical frequency difference $\Delta f_d$, the target optical frequency difference $\Delta f_g$, and the target electrical carrier frequency $f_{c1}$ described above. Details are not described herein again. Next, the processing module 211 may further generate a target electrical carrier that satisfies the target carrier frequency $f_m$, and then perform electrical modulation based on the target electrical carrier that is obtained by using the first electrical interface 24 and that is about the to-be-transmitted bit information, to obtain a target electrical modulation signal in a digital signal form. Next, the processing module 211 may transmit the target electrical modulation signal in the digital signal form to the signal light generation module 22 by using the D/A conversion module 214. For a process, refer to the process described above, and details are not described herein again.

It should be noted herein that in the foregoing implementations, the processing module 211 in the frequency locking module 21 determines an electrical carrier frequency of the target electrical modulation signal based on the target optical frequency difference, the target electrical frequency difference, and the target electrical carrier frequency. In this way, frequency drift of the electrical carrier caused by a working environment or a frequency offset of an optical carrier of signal light can be reduced. In this way, the electrical carrier frequency of the subsequently generated third signal light is closer to or even equal to the target electrical carrier frequency configured by the second optical communication apparatus 10, to implement an operation of locking the electrical carrier frequency of the signal light to the target electrical carrier frequency.

In some implementations, the signal light generation module 22 may be configured to: generate third signal light based on the target wavelength control signal and the target electrical modulation signal and send the third signal light to the second optical communication apparatus 10. A plurality of implementations of the signal light generation module 22 provided in embodiments may be separately described below.

Figure 17:
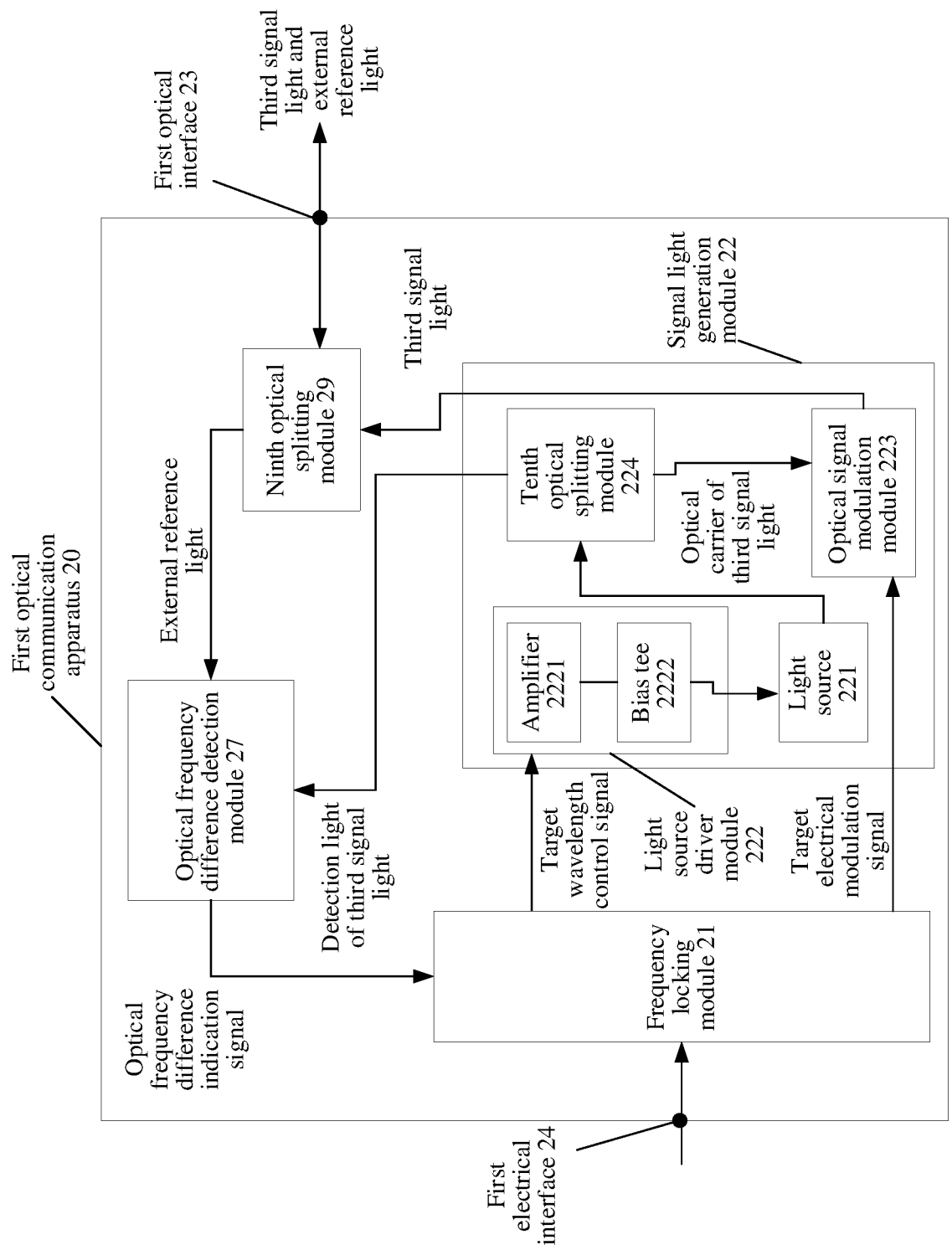
FIG. 17 is another schematic diagram of a structure of a first optical communication apparatus according to an embodiment.

Implementation 1 of the Signal Light Generation Module 22:

In this implementation, the signal light generation module 22 uses an implementation of external modulation. FIG. 17 is another schematic diagram of a structure of a first optical communication apparatus according to an embodiment. As shown in FIG. 17, the signal light generation module 22 may include a light source 221, a light source driver module 222, an optical signal modulation module 223, and a tenth optical splitting module 224. The light source driver module 222 may further include an amplifier 2221 and a bias device 2222. The amplifier 2221 is electrically connected to the frequency locking module 21 and the bias device 2222, and the bias device 2222 is further connected to the light source 221. The light source 221 is optically connected to the optical signal modulation module 223, the optical signal modulation module 223 is electrically connected to the frequency locking module 21, and the optical signal modulation module 223 is further optically connected to the tenth optical splitting module 224. The tenth optical splitting module 224 is further optically connected to the optical frequency difference detection module 27 and the ninth optical splitting module 29. Optionally, the bias device 2222 may be a T-shaped bias tee.

During actual operation, the light source driver module 222 may receive the target wavelength control signal, generate a first target drive signal based on the target wavelength control signal, and send the first target drive signal to the light source 221. After receiving the target wavelength control signal, the amplifier 2221 in the light source driver module 222 may amplify the target wavelength control signal to obtain an amplified target wavelength control signal, and then send the amplified target wavelength control signal to the bias device 2222. The bias device 2222 may superimpose the amplified target wavelength control signal on a bias signal (which may be a bias current) preset by the light source 221, to obtain the first target drive signal. Next, the bias device 2222 may transmit the first target drive signal to the light source 221. After receiving the first target drive signal, the light source 221 may generate, based on the first target drive signal, an initial optical carrier corresponding to the third signal light. The light source 221 may transmit the initial optical carrier corresponding to the third signal light to the tenth optical splitting module 224. After receiving the initial optical carrier of the third signal light, the tenth optical splitting module 224 may split the initial optical carrier of the third signal light to obtain detection light of the third signal light and an optical carrier of the third signal light. Next, the tenth optical splitting module 224 may transmit the detection light of the third signal light to the optical frequency difference detection module 27, so that the optical frequency difference detection module 27 can detect and obtain an optical frequency difference indication signal corresponding to the third signal light. In addition, the tenth optical splitting module 224 may further transmit the optical carrier of the third signal light to the optical signal modulation module 224. After receiving the optical carrier of the third signal light and the target electrical modulation signal, the optical signal modulation module 224 may load the target electrical modulation signal onto the optical carrier of the third signal light (for example, perform optical modulation on the optical carrier of the third signal light based on the target electrical modulation signal) to obtain the third signal light. Next, the optical signal modulation module 223 may send the third signal light to the ninth optical splitting module 29, and finally enable the third signal light to be transmitted to the second optical communication apparatus 10 through the first optical interface 23. It may be understood that, when the signal light generation module 22 generates and outputs the first signal light, the tenth optical splitting module 224 splits the initial optical carrier of the first signal light output by the light source 221 to obtain the detection light of the first signal light and an optical carrier of the first signal light, and then transmits the detection light and the optical carrier to the optical frequency difference detection module 27 and the second optical communication apparatus 10, so that the optical frequency difference detection module 27 can detect the optical frequency difference indication signal, so that the second optical communication apparatus 10 can detect the target electrical frequency difference.

Optionally, the optical signal modulation module 223 may be an electro-absorption modulator (EAM), a Mach-Zehnder modulator (MZM), a microring modulator, or the like that is implemented by using various materials or structures. It should be specially noted herein that, when the optical signal modulation module 223 is a microring modulator, the optical signal modulation module 223 and the microring module 279 may be a same functional module. In this case, the microring module 279 may exist in the optical frequency difference detection module 27 or may exist in the signal light generation module 22 or may be a module independent of the optical frequency difference detection module 27 and the signal light generation module 22, which is not limited herein. It can be understood herein that, with different locations of the microring module 279, a connection manner between the microring module 279 and various modules in the optical frequency difference detection module 27 and the signal light generation module 22 also changes correspondingly. Details are not described herein.

Figure 18:
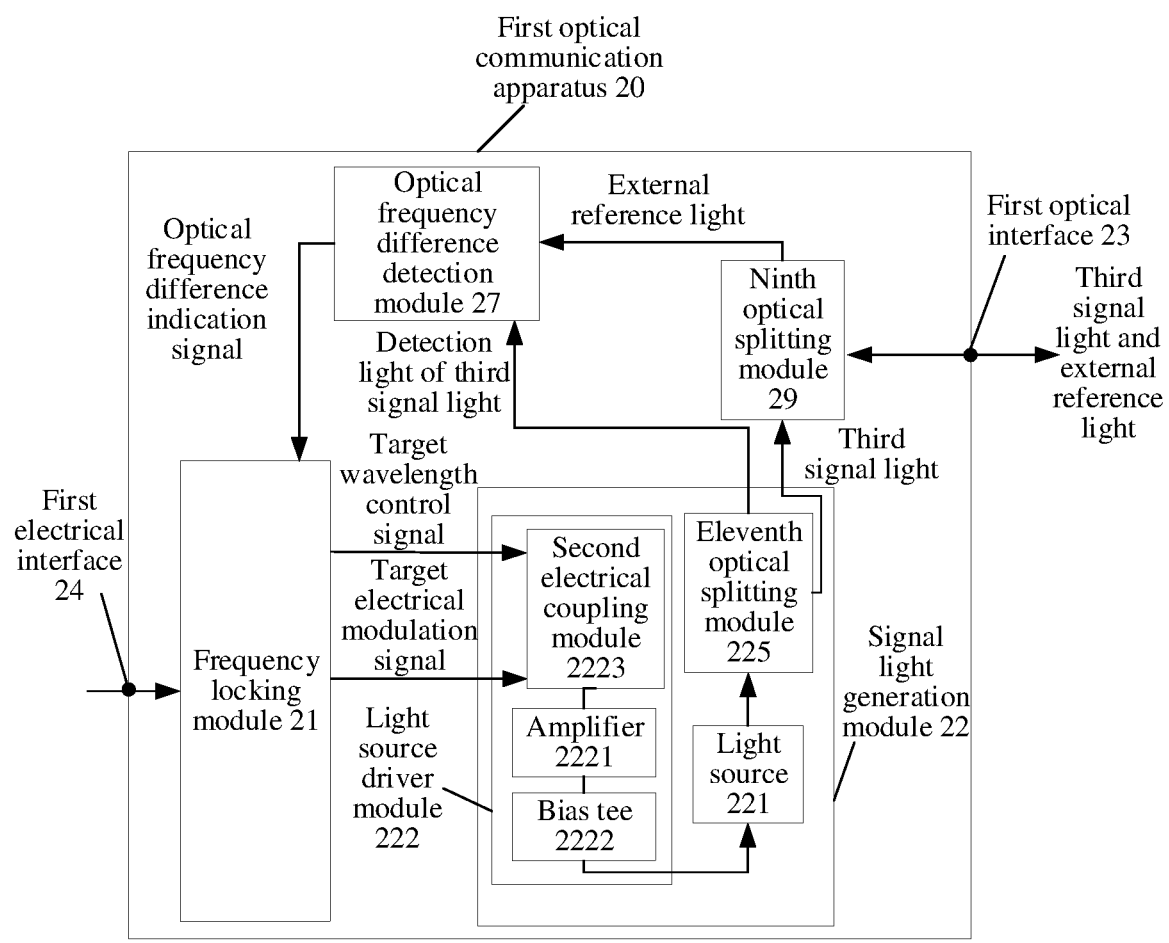
FIG. 18 is another schematic diagram of a structure of a first optical communication apparatus according to an embodiment.

Implementation 2 of the Signal Light Generation Module 22:

In this implementation, the signal light generation module 22 uses an implementation of internal modulation (also referred to as direct modulation). FIG. 18 is another schematic diagram of a structure of a first optical communication apparatus according to an embodiment. As shown in FIG. 18, the signal light generation module 22 may include a light source 221, a light source driver module 222, and an eleventh optical splitting module 225. The light source driver module 222 may include an amplifier 2221, a bias device 2222, and a second electrical coupling module 2223. The second electrical coupling module 2223 is electrically connected to the frequency locking module 21 and the amplifier 2221, the amplifier 2221 is further electrically connected to the bias device 2222, and the bias device 2222 is further connected to the light source 221. The light source 221 is optically connected to the eleventh optical splitting module 225. The eleventh optical splitting module 225 is further optically connected to the optical frequency difference detection module 27 and the ninth optical splitting module 29. Optionally, the second electrical coupling module 2223 may be an electrical coupler in various forms or structures.

During actual operation, the light source driver module 222 may be configured to: receive the target wavelength control signal and the target electrical modulation signal, then generate a second target drive signal based on the target wavelength control signal and the target electrical modulation signal, and transmit the second target drive signal to the light source 221. The second electrical coupling module 2223 in the light source driver module 222 may be configured to: receive the target wavelength control signal and the target electrical modulation signal, perform electrical signal coupling on the target wavelength control signal and the target electrical modulation signal to obtain a first coupled signal, and then send the first coupled signal to the amplifier 2221. The amplifier 2221 amplifies the first coupled signal to obtain an amplified first coupled signal and sends the amplified first coupled signal to the bias device 2222. The bias device 2222 may superimpose the amplified first coupled signal on a bias signal (which may be a bias current) preset by the light source 221, to obtain a second target drive signal, and then send the second target drive signal to the light source 221. After receiving the second target drive signal, the light source 221 may generate, based on the second target drive signal, initial signal light corresponding to the third signal light. Next, the light source 221 may transmit the initial signal light corresponding to the third signal light to the eleventh optical splitting module 225, and the eleventh optical splitting module 225 may split the initial signal light of the third signal light to obtain the detection light of the third signal light and the third signal light. Next, the eleventh optical splitting module 225 may send the detection light of the third signal light to the optical frequency difference detection module 27, so that the optical frequency difference detection module 27 can detect and obtain an optical frequency difference corresponding to the third signal light. Next, the eleventh optical splitting module 225 may further send the third signal light to the ninth optical splitting module 29, and finally enable the third signal light to be transmitted to the second optical communication apparatus 10 through the first optical interface 23. It may be understood herein that, when the signal light generation module 22 generates and outputs the first signal light, the light source 221 generates initial signal light of the first signal light, and then the initial signal light of the first signal light is split by the eleventh optical splitting module 225 to obtain the detection light of the first signal light and the first signal light, which are then transmitted to the optical frequency difference detection module 27 and the second optical communication apparatus 10, so that the optical frequency difference detection module 27 can detect the optical frequency difference indication signal, so that the second optical communication apparatus 10 can detect the target electrical frequency difference.

Optionally, during implementation, the tenth optical splitting module 224 or the eleventh optical splitting module 225 may be a directional coupler with a special waveguide, a discrete optical splitter, a spatial optics-based optical splitting assembly, or the like.

It should be noted herein that, regardless of the foregoing implementation 1 or implementation 2, the signal light generation module 22 adjusts the drive signal of the light source 221 based on the target wavelength control signal, so that the frequency of the initial optical carrier or the initial signal light output by the light source 221 can be closer to the frequency of the external reference light compared with the frequency of the optical carrier or the initial signal light of the first signal light (or the second signal light). In this way, the frequency of the subsequently obtained third signal light can be closer to the frequency of the external reference light, so that an operation of locking the frequency of the signal light to the frequency of the external reference light is implemented.

Figure 19:
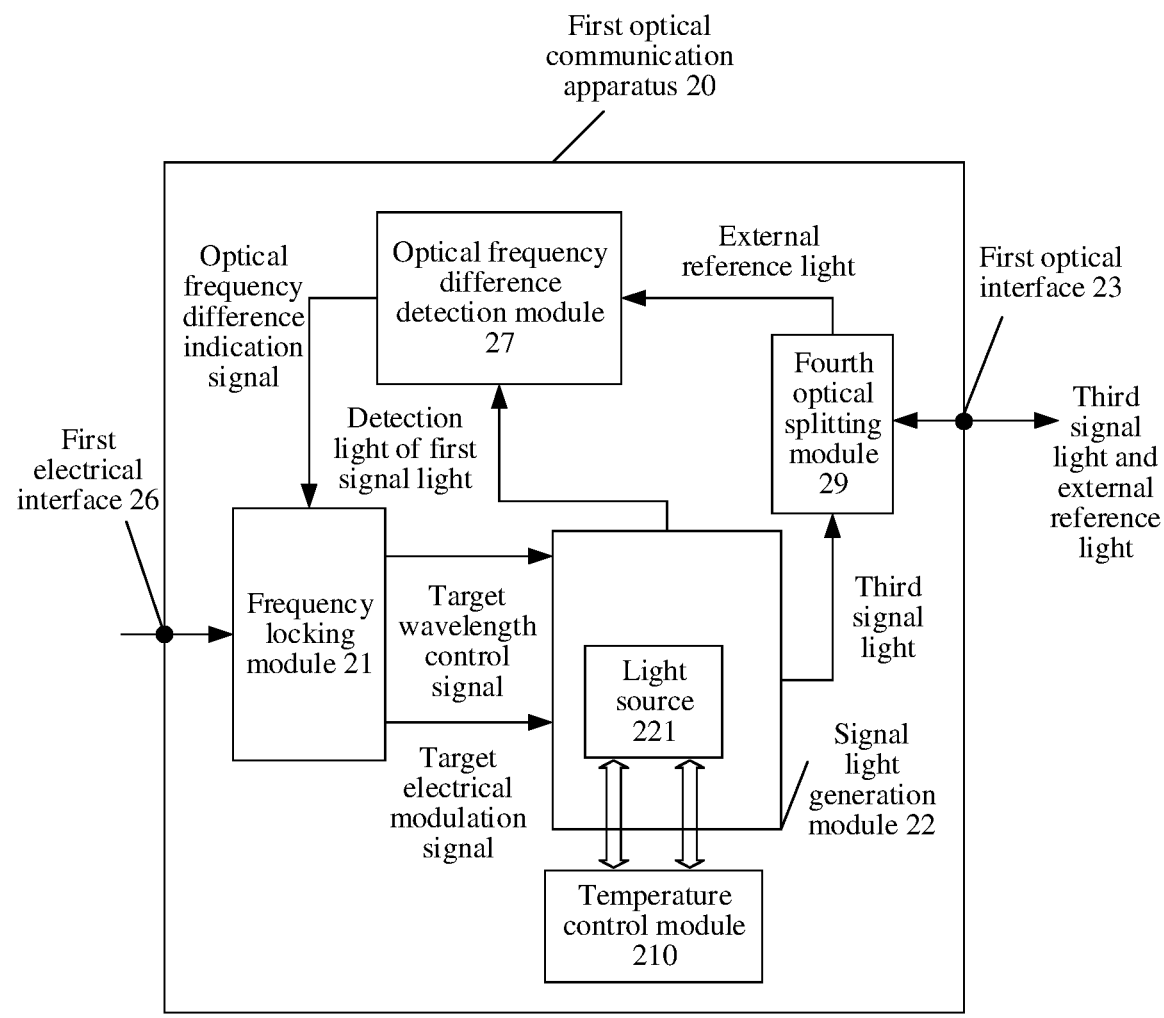
FIG. 19 is another schematic diagram of a structure of a first optical communication apparatus according to an embodiment.

In some implementations, FIG. 19 is still another schematic diagram of a structure of a first optical communication apparatus according to an embodiment. As shown in FIG. 19, the first optical communication apparatus 20 may further include a temperature control module 210. During actual operation, the temperature control module 210 may be configured to obtain temperature information of the light source 221, and then control a temperature of the light source 221 based on the temperature information, so that the temperature of the light source 221 can be locked to a preset temperature. The foregoing preset temperature is determined by using the frequency of the external reference light, that is, the foregoing preset temperature is a temperature corresponding to an inherent temperature-output optical wavelength characteristic of the external reference light frequency of the light source 221. Therefore, if the temperature of the light source 221 is stabilized at the preset temperature, the frequency of the optical carrier or the signal light output by the light source 221 can be locked to the frequency of the external reference light, so that the optical carrier frequency of the signal light output by the signal light generation module 22 can be locked to the frequency of the external reference light, and precision of locking of an optical carrier frequency can be further improved.

Several implementations of the temperature control module 210 provided in embodiments may be separately described below in detail.

Figure 20:
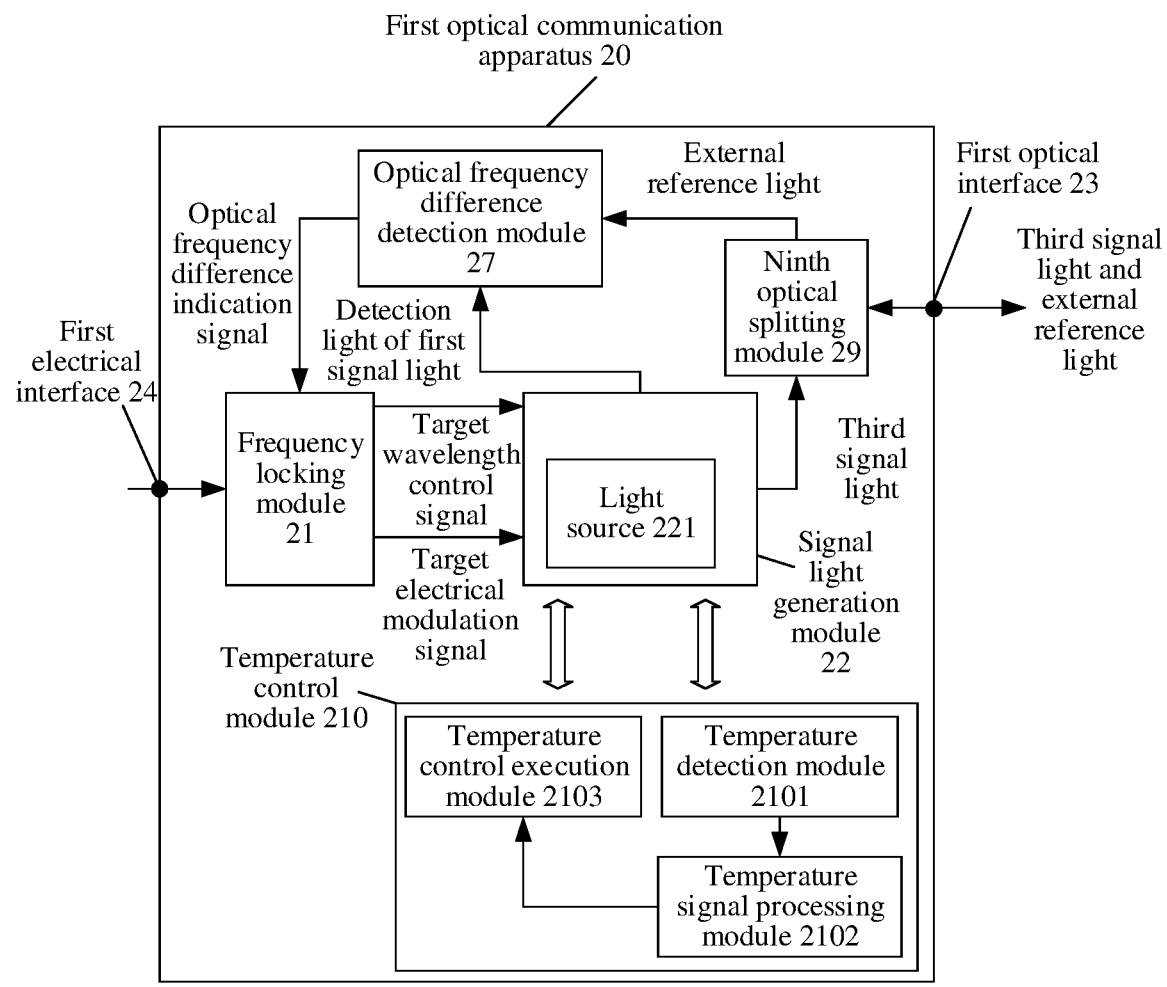
FIG. 20 is another schematic diagram of a structure of a first optical communication apparatus according to an embodiment.

Implementation 1 of the Temperature Control Module 210:

FIG. 20 is another schematic diagram of a structure of a first optical communication apparatus according to an embodiment. As shown in FIG. 20, the temperature control module 210 may include a temperature detection module 2101, a temperature signal processing module 2102, and a temperature control execution module 2103. The temperature signal processing module 2102 is electrically connected to the temperature detection module 2101 and the temperature control execution module 2103.

During actual operation, the temperature detection module 2101 may obtain, through direct or indirect heat conduction, a temperature indication signal used to represent a current housing temperature of the light source 221 and send the temperature indication signal to the temperature signal processing module 2102. Next, the temperature signal processing module 2102 may generate a temperature control signal based on the temperature indication signal and the preset temperature (for ease of differentiation, a fourth temperature control signal is used instead for description below), and send the fourth temperature control signal to the temperature control execution module 2103. The temperature signal processing module 2102 may first generate an initial temperature control signal corresponding to the preset temperature, and then process the initial temperature control signal and the temperature indication signal by using a preset signal processing algorithm (including, but not limited to, a gradient descent algorithm, a Kalman filter, and the like), to obtain the fourth temperature control signal. After receiving the fourth temperature control signal, the temperature control execution module 2103 may increase or decrease the temperature of the light source 221 based on the fourth temperature control signal, so that a difference between the housing temperature of the light source 221 and the preset temperature can be less than or equal to a fourth preset difference, and the frequency of the signal light or the optical carrier output by the light source 221 can be locked to the frequency of the external reference light.

Optionally, during actual implementation, the temperature detection module 2101 may be a thermistor, a thermoelectric coupler, a temperature sensor, or the like of various materials or structures. The temperature detection module 2101 may obtain the temperature indication signal through detection in a direct or indirect heat conduction manner.

Optionally, during actual implementation, the temperature control execution module 2103 may be a semiconductor cooler (TEC), a heater, a fan, or the like of various materials or structures.

Figure 21:
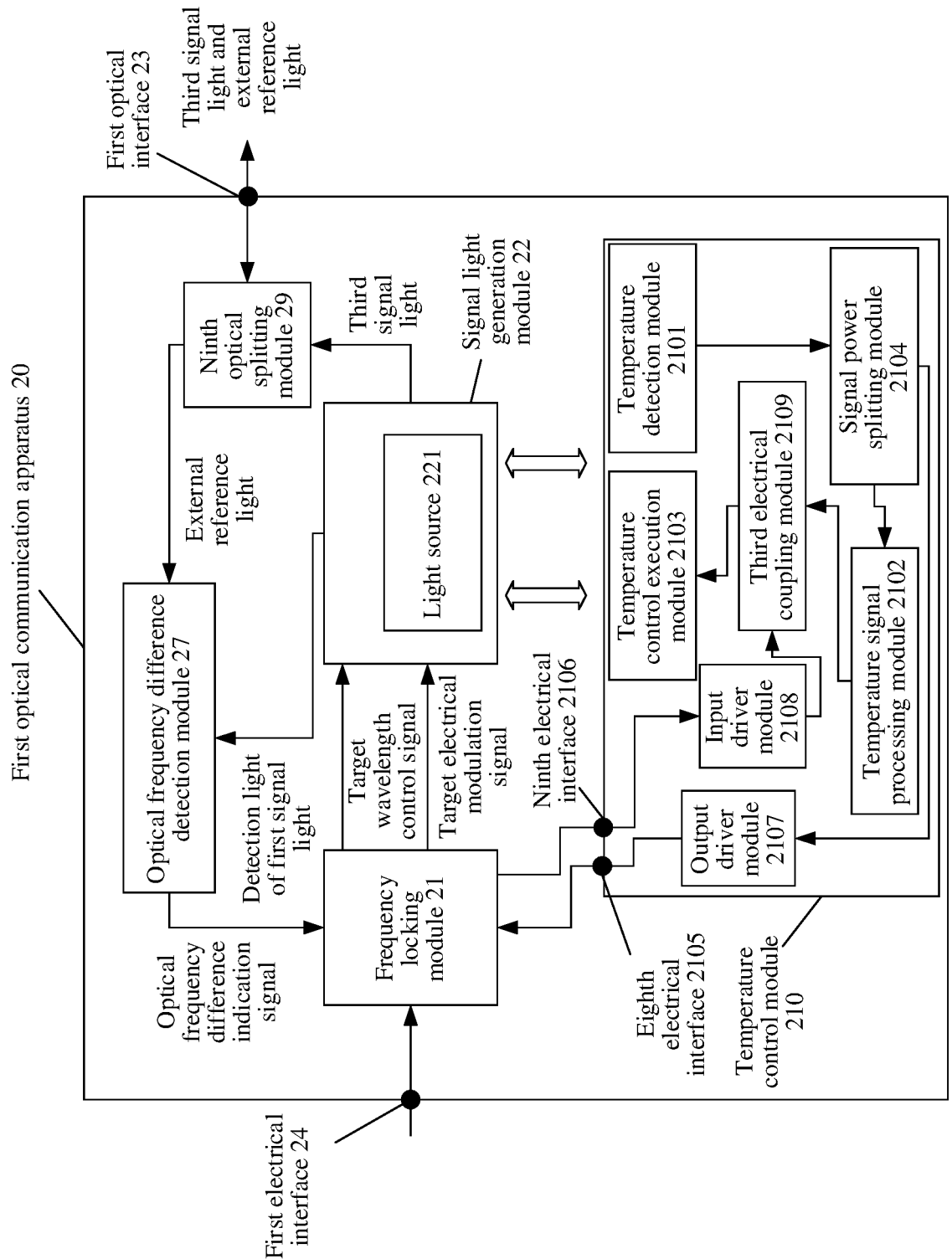
FIG. 21 is another schematic diagram of a structure of a first optical communication apparatus according to an embodiment.

Implementation 2 of the Temperature Control Module 210:

FIG. 21 is another schematic diagram of a structure of a first optical communication apparatus according to an embodiment. As shown in FIG. 21, based on the temperature detection module 2101, the temperature signal processing module 2102, and the temperature control execution module 2103 shown in the foregoing implementation 1, the temperature control module 210 may further include a signal power splitting module 2104, an eighth electrical interface 2105, a ninth electrical interface 2106, an output driver module 2107, an input driver module 2108, and a third electrical coupling module 2109. The signal power splitting module 2104 is electrically connected to the temperature detection module 2101, the temperature signal processing module 2102, and the output driver module 2107. The third electrical coupling module 2109 is electrically connected to the temperature control execution module 2103, the temperature signal processing module 2102, and the input driver module 2108. The output driver module 2107 is further electrically connected to the frequency locking module 21 by the eighth electrical interface, and the input driver module 2108 is further electrically connected to the frequency locking module 21 by the ninth electrical interface 2106.

During actual operation, the temperature detection module 2101 may obtain a temperature indication signal used to represent a current housing temperature of the light source 221 and send the temperature indication signal to the signal power splitting module 2104. The signal power splitting module 2104 may perform power splitting on the temperature indication signal to obtain a first temperature indication signal component and a second temperature indication signal component. Signal waveforms of the first temperature indication signal component and the second temperature indication signal component are the same, and signal powers of the first temperature indication signal component and the second temperature indication signal component may be the same or may be different. Next, the signal power splitting module 2104 may transmit the first temperature indication signal component to the output driver module 2107 and transmit the second temperature indication signal component to the temperature signal processing module 2102. After receiving the second temperature indication signal component, the temperature signal processing module 2102 may generate a temperature control signal based on the second temperature indication signal component and the preset temperature (for ease of differentiation, a first temperature control signal is used instead for description below) and send the first temperature control signal to the third electrical coupling module 2109. For a process in which the temperature signal processing module 2102 generates the first temperature control signal, refer to the process in which the temperature signal processing module 2102 generates the fourth temperature control signal described in the foregoing implementation 1, and details are not described herein again. After receiving the first temperature indication signal component, the output driver module 2107 may amplify the first temperature indication signal component to obtain an amplified first temperature indication signal component, and then transmit the amplified first temperature indication signal component to the frequency locking module 21 through the eighth electrical interface 2105. After receiving the amplified first temperature indication signal component, the frequency locking module 21 may process the amplified first temperature indication signal component and the preset temperature by using a preset processing algorithm (the processing algorithm used by the frequency locking module 21 may be more advanced than the processing algorithm used by the temperature signal processing module 2102) inside the frequency locking module 21, to obtain a temperature control feedback signal, and then send the temperature control feedback signal to the input driver module 2108 through the ninth electrical interface 2106. The input driver module 2108 then amplifies the temperature control feedback signal and sends an amplified temperature control feedback signal to the third electrical coupling module 2109. After receiving the first temperature control signal and the amplified temperature control feedback signal, the third electrical coupling module 2109 may couple the first temperature control signal and the amplified temperature control feedback signal to obtain a second temperature control signal, and then transmit the second temperature control signal to the temperature control execution module 2103. After receiving the first temperature control signal, the temperature control execution module 2103 may increase or decrease the temperature of the light source 221 based on the first temperature control signal, so that a difference between the housing temperature of the light source 221 and the preset temperature can be less than or equal to a fourth preset difference, and the frequency of the signal light or the optical carrier output by the light source 221 can be locked to the frequency of the external reference light.

It may be understood that, in this implementation, the frequency locking module 21 may further include an additional electrical interface, an A/D module, and a D/A module, to implement receiving of the first temperature indication signal component and sending of the temperature control feedback signal. A process may be similar to the foregoing process of receiving the optical frequency difference indication signal and sending the target wavelength control signal, and details are not described herein again.

In this implementation, an external control signal (that is, the temperature control feedback signal) generated by the frequency locking module 21 and the first temperature control signal generated by the temperature signal processing module 2102 are jointly used for temperature control, so that precision and stability of temperature control can be improved, and precision of locking of an optical carrier frequency can be further improved.

Figure 22:
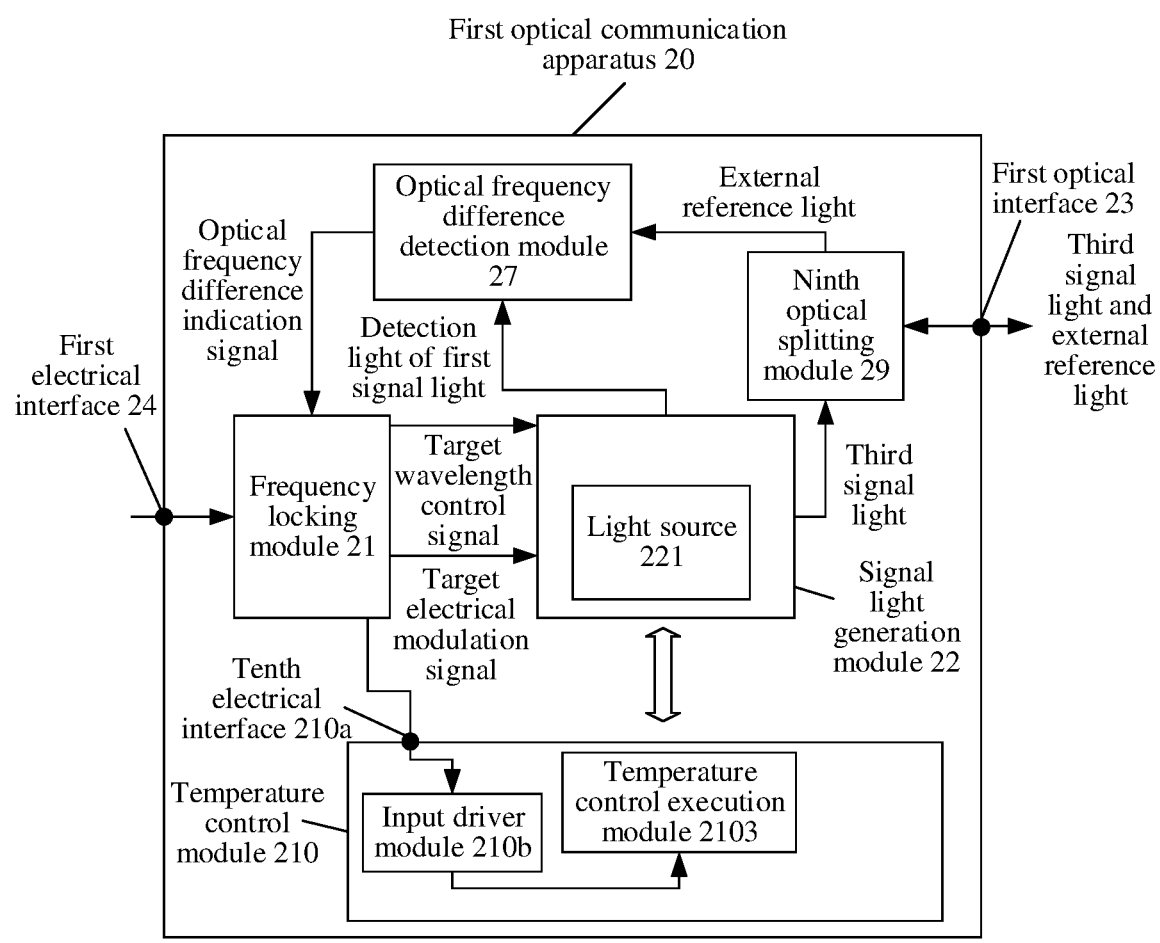
FIG. 22 is another schematic diagram of a structure of a first optical communication apparatus according to an embodiment.

Implementation 3 of the Temperature Control Module 210:

FIG. 22 is another schematic diagram of a structure of a first optical communication apparatus according to an embodiment. As shown in FIG. 22, based on the temperature detection module 2101, the temperature signal processing module 2102, and the temperature control execution module 2103 shown in the foregoing implementation 1, the temperature detection module 2101 and the temperature signal processing module 2102 are removed, and a tenth electrical interface 210a and an input driver module 210b are added. The input driver module 210b is electrically connected to the temperature control execution module 2103 and the tenth electrical interface 210a, and the tenth electrical interface 210a is further electrically connected to the frequency locking module 21.

During actual operation, after obtaining the target optical frequency difference $\Delta f_g$, the frequency locking module 21 may determine, based on the target optical frequency difference $\Delta f_g$ and the preset temperature-wavelength correspondence set corresponding to the light source 221, the target temperature difference corresponding to the target optical frequency difference $\Delta f_g$. The preset temperature-wavelength correspondence set is an intrinsic characteristic of the light source 221 and indicates a wavelength (which may also be converted into a frequency) of light stably output by the light source 221 at different housing temperatures. The target temperature difference is a difference between a temperature of the light source 221 at a moment when the signal light generation module 22 outputs the first signal light and the preset temperature. After obtaining the target optical frequency $\Delta f_g$, the frequency locking module 21 may determine the frequency of the first signal light based on the frequency of the external reference light and the target optical frequency $\Delta f_g$, and then find the temperature corresponding to the frequency of the first signal light from the preset temperature-wavelength correspondence set. The temperature is a housing temperature of the light source 221 at the moment when the signal light generation module 22 outputs the first signal light. Next, the frequency locking module 21 may determine the target temperature difference based on the preset temperature that is determined based on the temperature corresponding to the frequency of the first signal light and the frequency of the external reference light. Further, the frequency locking module 21 may process the target temperature difference according to a temperature control algorithm preset in the frequency locking module 21, to obtain a third temperature control signal, and send the third temperature control signal to the input driver module 210b through the tenth electrical interface 210a. The input driver module 210b then amplifies the third temperature control signal and sends an amplified third temperature control signal to the temperature control execution module 2103. After receiving the third temperature control signal, the temperature control execution module 2103 may increase or decrease the temperature of the light source 221 based on the third temperature control signal, so that a difference between the housing temperature of the light source 221 and the preset temperature can be less than or equal to a fourth preset difference, and the frequency of the signal light or the optical carrier output by the light source 221 can be locked to the frequency of the external reference light. The frequency locking module 21 directly generates the third temperature control signal based on the target optical frequency difference, and the temperature control execution module 2103 further controls the temperature of the light source 221 based on the third temperature control signal. This simplifies a structure of a temperature control module 210 and can reduce costs and structural complexity of the first optical communication apparatus.

The foregoing implementations are described in a background of the multipoint-to-point PON system architecture shown in FIG. 1. In this case, the first optical communication apparatus may be any ONU shown in FIG. 1 or a TOSA included in the ONU, and the second optical communication apparatus may be the OLT shown in FIG. 1.

Figure 23:
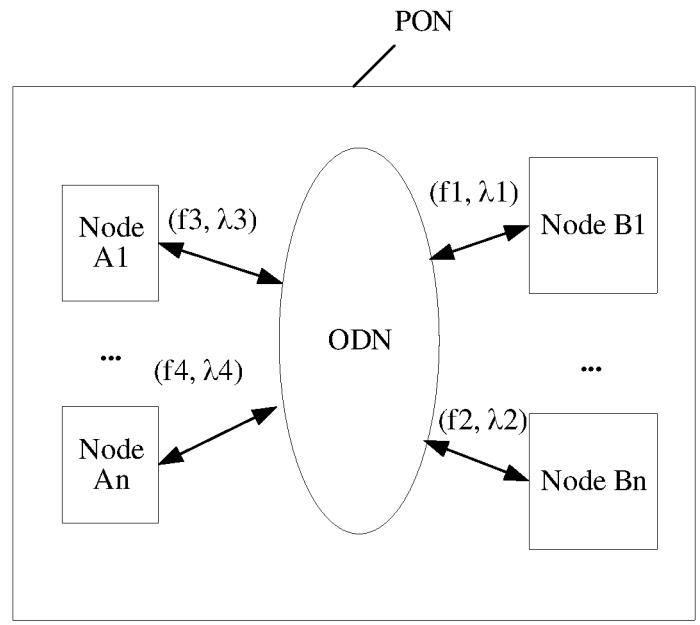
FIG. 23 is a schematic diagram of a structure of another PON system according to an embodiment.

In still another optional implementation, FIG. 23 is a schematic diagram of a structure of another PON system according to an embodiment. The PON system uses a multipoint-to-multipoint network architecture, that is, a plurality of type-A nodes (for example, a node A1 and a node An in FIG. 23) and a plurality of type-B nodes (for example, a node B1 and a node BN in FIG. 23) transmit optical signals by using an ODN. The type-A node and the type-B node refer to various optical communication nodes in the entire PON system, which may be OLTs or ONUs. Therefore, in this scenario, the node is uniformly used instead for description. In the PON system architecture, a plurality of type-B nodes may send information to a type-A node through a multi-subcarrier transmission manner, and a plurality of type-A nodes may also send information to a type-B node in a multi-subcarrier transmission manner. The first optical communication apparatus 20 and the second optical communication apparatus 10 provided in embodiments may also be applicable to a PON network architecture shown in FIG. 23. During actual application, the first optical communication apparatus 20 may be any type-A node shown in FIG. 23 or a TOSA included in the any type-A node, and the second optical communication apparatus may be any type-B node shown in FIG. 23. Alternatively, the first optical communication apparatus may be any type-B node shown in FIG. 23 or a TOSA included in the any type-B node, and the second optical communication apparatus 10 may be any type-A node shown in FIG. 23. It should be particularly noted that, in the PON network architecture shown in FIG. 23, because the first optical communication apparatus 20 and the second optical communication apparatus 10 transmit optical signals in a multi-subcarrier transmission manner, the first optical communication apparatus 20 also needs to provide corresponding external reference light to the second optical communication apparatus 10, so that the second optical communication apparatus 10 can send signal light to the first optical communication apparatus 20 by using an appropriate optical carrier. Therefore, the first optical communication apparatus 20 may also include a reference light source like the second optical communication apparatus and provide external reference light to the second optical communication apparatus 10 by using the reference light source. In the PON system architecture shown in FIG. 23, structures included in the first optical communication apparatus 20 and the second optical communication apparatus 10 and functions that can be implemented are the same as those in the PON system architecture shown in FIG. 1. Therefore, functional implementation of the first optical communication apparatus 20 and the second optical communication apparatus 10 in the PON system architecture shown in FIG. 23 is not described herein again.

It can be further understood herein that the network architecture of the PON system shown in FIG. 1 or FIG. 23 is merely an example for description. The optical communication apparatus may be further applicable to another optical network that performs communication in a multi-subcarrier transmission manner. Details are not described herein again.

It may be further understood that the foregoing process of generating the target wavelength control signal, the target electrical modulation signal, and the subsequent third signal light is merely an example for description. During actual implementation, the foregoing operations may be repeatedly performed between the first optical communication apparatus 20 and the second optical communication apparatus 10, and details are not described herein again.

It should further be additionally noted that, the first optical communication apparatus 20 may further adjust the drive signal of the optical signal modulation module 223 or the light source 221 in the signal light generation module 22, to dynamically adjust the optical power of the signal light output by the signal light generation module 22, to equalize transmit powers of a plurality of optical transmitting ends.

A communication structure between the first optical communication apparatus 20 and the second optical communication apparatus 10 is further described below with reference to the content described above.

When the first optical communication apparatus 20 is an ONU or a functional module (for example, a TOSA) in a node, and the second optical communication apparatus 10 is an OLT or a node, FIG. 24A and FIG. 24B are a schematic diagram of a structure of an optical communication system according to an embodiment. As shown in FIG. 24A and FIG. 24B, the second optical communication apparatus 10 may include a motherboard 1. Components such as a media access control (MAC) chip 1, an optical signal processing chip 1, a main control central processing unit (CPU) 1, a TOSA 1, a ROSA 1, a clock 1, a downlink reference light source 1 (that is, an implementation of the reference light source module 12 described above), and a tenth optical splitting module 1 (that is, the tenth optical splitting module 15 described above) are installed on the motherboard 1, to implement a function of an OLT. The TOSA 1 includes but, is not limited to, a laser, a driver, and the like. The ROSA 1 includes, but is not limited to, a photoelectric detector, a trans-impedance amplifier, and the like. The clock 1 may be configured to provide a corresponding clock signal to a component that needs a clock signal in the second optical communication apparatus 10. In addition, the ONU or node in which the first optical communication apparatus 20 is located (for ease of description, a target ONU is used as instead below) may include a motherboard 2. Components such as the first optical communication apparatus 20, a media access control (MAC) chip 2, an optical signal processing chip 2, a main control central processing unit (CPU) 2, a ROSA 2, a clock 2, a tenth optical interface 2, and an eleventh optical splitting module 2 are installed on the motherboard 2, to implement functions of the OLT. The ROSA 2 includes but, is not limited to, a photoelectric detector, a trans-impedance amplifier, and the like. The clock 2 may be configured to provide a corresponding clock signal to a component that needs a clock signal in the first optical communication apparatus 20.

During actual operation, an optical connection is established between the second optical interface 13 on the second optical communication apparatus 10 and the tenth optical interface 2 of the target ONU by a target fiber. External reference light output by the downlink reference light source 1 is transmitted to the second optical interface 13 by using the tenth optical splitting module 1, and then is transmitted to the tenth optical interface 2 of the target ONU through the target fiber. Next, the tenth optical interface 2 transmits the external reference light to the first optical interface 23 of the first optical communication apparatus 20 by using the eleventh optical splitting module 2, to complete transmission of the external reference light from the second optical communication apparatus 10 to the first optical communication apparatus 20. In addition, the uplink signal light (such as the first signal light, the second signal light, or the third signal light) generated by the first optical communication apparatus 20 may also be transmitted to the tenth optical interface 2 of the target ONU through the first optical interface 23 and the eleventh optical splitting module 2. Next, the tenth optical interface 2 transmits the first signal light, the second signal light, or the third signal light to the second optical interface of the second optical communication apparatus 10 through the target fiber, to implement transmission of the uplink signal light from the first optical communication apparatus 20 to the second optical communication apparatus 10. The downlink signal light (for example, the fourth signal light or the fifth signal light described above) generated by the TOSA 1 in the second optical communication apparatus 10 may be transmitted through other optical channels between the second optical communication apparatus 10 and the first optical communication apparatus 20. The uplink signal light and the external reference light are transmitted through a same target fiber, so that a quantity of optical fibers between the second optical communication apparatus 10 and the first optical communication apparatus 20 can be reduced, and communication costs of the second optical communication apparatus 10 and the first optical communication apparatus 20 can be reduced.

When the first optical communication apparatus 20 is an ONU or a node, a difference between the target ONU in which the first optical communication apparatus 20 is located and the structure shown in FIG. 24A and FIG. 24B lies in that the first optical communication apparatus 20 does not have the tenth optical interface 2 and the eleventh optical splitting module 2, but the first optical interface 23 of the first optical communication apparatus 20 directly establishes an optical connection with the second optical interface 13 of the second optical communication apparatus through the target fiber. Next, the first optical communication apparatus 20 and the second optical communication apparatus 10 may transmit the external reference light and the uplink signal light through the target fiber.

Another optical transmission structure may also be used between the second optical communication apparatus 10 and the first optical communication apparatus 20 or the target ONU in which the first optical communication apparatus 20 is located. For example, all uplink signal light, downlink signal light, and reference light between the second optical communication apparatus 10 and the target ONU are separately transmitted through an independent optical fiber, or all uplink signal light, downlink signal light, and reference light are transmitted through a same optical fiber; or, downlink signal light and reference light are transmitted through a same optical fiber, and uplink signal light may be transmitted through an independent optical fiber.

In addition, it should be additionally noted that the electrical connection in embodiments may be a connection established by routing a printed circuit board (PCB), or may be a connection established by using metal wire punching between different chips or integrated modules, or may be a connection established by using cabling inside a packaged chip. This is not limited herein. An optical connection in the embodiments is a connection established by using optical fibers and optical waveguides of various specifications. The optical interface in the embodiments may be fiber to fiber couplers of various specifications, fiber to waveguide coupling structures of various specifications, or the like. This is not limited herein. The modules may be a set of devices installed on a same substrate medium or may be a combination of discrete devices. This is not limited herein.

In the embodiments, in a multi-subcarrier transmission scenario, the first optical communication apparatus 20 may accurately control an optical carrier frequency and an electrical carrier frequency of signal light generated by the first optical communication apparatus, so that an optical carrier frequency of the signal light output by the first optical communication apparatus can be locked to a frequency of external reference light provided by the second optical communication apparatus, and the electrical carrier frequency of the signal light output by the first optical communication apparatus can be locked to a preconfigured target electrical carrier frequency. In this way, a problem that beat frequency interference that exists when a plurality of optical signals may be multiplexed and that is caused by a frequency offset of signal light in a multi-subcarrier transmission process can be effectively resolved, so that quality of optical signal transmission of two optical communication apparatuses can be improved.

Embodiment 2

Figure 25:
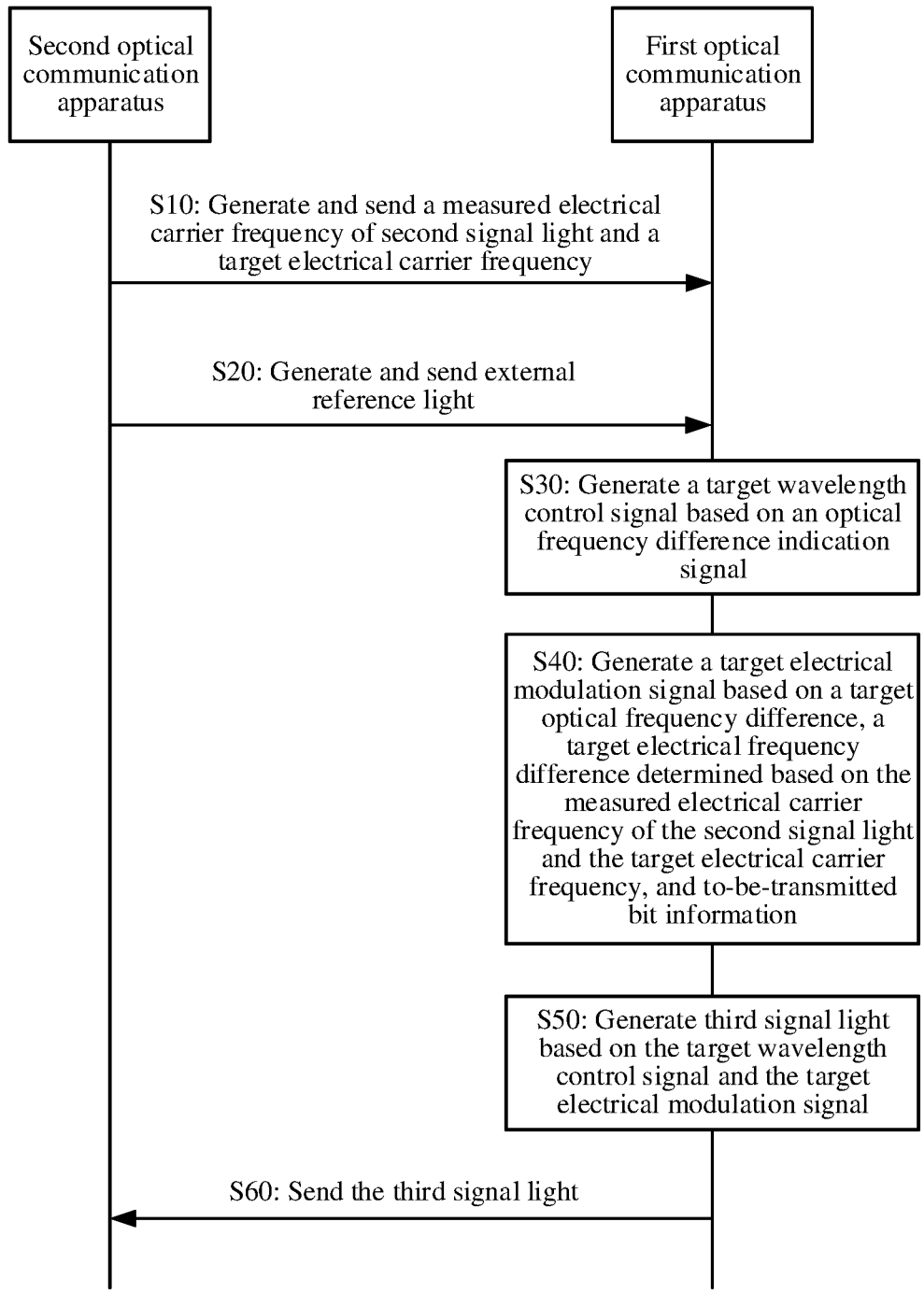
FIG. 25 is a schematic flowchart of an optical communication method according to an embodiment.

FIG. 25 is a schematic flowchart of an optical communication method according to an embodiment. The optical communication method is applicable to the first optical communication apparatus 20 and the second optical communication apparatus 10 in various network architectures (for example, a multipoint-to-point or multipoint-to-multipoint network structure) described in Embodiment 1. With reference to structures of the first optical communication apparatus 20 and the second optical communication apparatus 10 described in Embodiment 1, an execution process of the optical communication method is described below. As shown in FIG. 25, the method includes the following steps.

S10: A second optical communication apparatus generates and sends a measured electrical carrier frequency of second signal light and a target electrical carrier frequency to a first optical communication apparatus.

In some implementations, the second optical communication apparatus 10 may receive, by using the first signal light processing module 11, the second signal light from the first optical communication apparatus 20 and determine the measured electrical carrier frequency of the second signal light. The second optical communication apparatus may further determine, by using the first signal light processing module 11, the target electrical carrier frequency corresponding to the first optical communication apparatus 20. For a process in which the second optical communication apparatus 10 determines the measured electrical carrier frequency of the second signal light and the target electrical carrier frequency based on the first signal light processing module 11, refer to the description in Embodiment 1. Details are not described herein again. Next, the second optical communication apparatus 10 may further send the measured electrical carrier frequency of the second signal light and the target electrical carrier frequency to the first optical communication apparatus 20. For example, the second optical communication apparatus 10 may send the measured electrical carrier frequency of the second signal light and the target electrical carrier frequency to the first optical communication apparatus 20 by using a network control signal and a network status signal. For a process, refer to the process described in Embodiment 1, and details are not described herein again.

S20: The second optical communication apparatus generates and sends external reference light to the first optical communication apparatus.

In some implementations, the second optical communication apparatus 10 may further drive, by using the first signal light processing module 11, the reference light source module 12 to generate external reference light with a preset wavelength, and then send the external reference light to the first optical communication apparatus 20. For a process, refer to the process of generating and sending external reference light to the first optical communication apparatus 20 described in Embodiment 1, and details are not described herein again.

S30: The first optical communication apparatus generates a target wavelength control signal based on an optical frequency difference indication signal.

In some implementations, the first optical communication apparatus 20 may obtain an optical frequency difference indication signal and generate a target wavelength control signal based on the optical frequency difference indication signal.

During an implementation, the first optical communication apparatus 20 may first obtain the optical frequency difference indication signal through detection by the optical frequency difference detection module 27.

In a first optional implementation, the first optical communication apparatus 20 may obtain, by using the optical frequency difference detection module 27, the optical frequency difference indication signal formed by the external reference light and the detection light of the first signal light. For example, the first optical communication apparatus 20 may split the external reference light into first detection light and second detection light. The first detection light is a component of the external reference light in a first polarization direction, the second detection light is a component of the external reference light in a second polarization direction, and the second polarization direction is orthogonal to the first polarization direction. The first optical communication apparatus 20 may split the detection light corresponding to the first signal light into third detection light and fourth detection light. The third detection light is a component of the detection light corresponding to the first signal light in a third polarization direction, the fourth detection light is a component of the detection light corresponding to the first signal light in a fourth polarization direction, the third polarization direction is a preset polarization direction of the second optical splitting module, and the fourth polarization direction is orthogonal to the third polarization direction. Next, the first optical communication apparatus 20 may obtain a first beat voltage signal formed by the first detection light and the third detection light and a second beat voltage signal formed by the second detection light and the fourth detection light and couple the first beat voltage signal and the second beat voltage signal to obtain the optical frequency difference indication signal. For a process of obtaining a target beat frequency signal by the first optical communication apparatus 20 by using the optical frequency difference detection module 27, refer to the process described in Embodiment 1, and details are not described herein again.

Further, optionally, the first polarization direction is the same as the third polarization direction, the first detection light and the second detection light have a same polarization direction, and the third detection light and the fourth detection light have a same polarization direction. In addition, optical power of the third detection light may also be the same as optical power of the fourth detection light.

In a second optional implementation, the first optical communication apparatus 20 may detect fifth detection light and sixth detection light by using the optical frequency difference detection module 27, to obtain an optical frequency difference indication signal. The optical frequency difference indication signal is a first optical power indication signal of the fifth detection light and a second optical power indication signal of the sixth detection light. If a difference between a resonance frequency of the microring module 279 in the optical frequency difference detection module 27 and the frequency of the external reference light is less than or equal to the first preset difference, it may be considered that the resonance frequency of the microring module 279 is equal to the frequency of the external reference light. The detection light corresponding to the first signal light is split to obtain the fifth detection light and seventh detection light. The sixth detection light is obtained by splitting the seventh detection light by performing microring filtering. The detection light corresponding to the first signal light is obtained by splitting an optical carrier or signal light generated by the light source of the first optical communication apparatus 20 when the first optical communication apparatus 20 outputs the first signal light.

For example, the first optical communication apparatus 20 may split, by using the optical frequency difference detection module 27, the detection light corresponding to the first signal light to obtain the fifth detection light and the seventh detection light and obtain the first optical power indication signal of the fifth detection light. Next, the optical frequency difference detection module 27 performs microring filtering on the seventh detection light, splits the seventh detection light obtained by performing the microring filtering to obtain the sixth detection light, and then obtains a second optical power indication signal corresponding to the sixth detection light. For a process in which the first optical communication apparatus 20 obtains the first optical power indication signal and the second optical power indication signal by using the optical frequency difference detection module 27, refer to the corresponding process described in Embodiment 1, and details are not described herein again.

Further, when the difference between the resonance frequency of the microring module 279 and the frequency of the external reference light is not less than or equal to the first preset difference, the first optical communication apparatus 20 may further split the external reference light by using the optical frequency difference detection module 27 to obtain eighth detection light and ninth detection light, and obtain a third optical power indication signal of the eighth detection light. Next, the first optical communication apparatus 20 may perform microring filtering on the ninth detection light by using the optical frequency difference detection module 27 to obtain filtered ninth signal light, then split the ninth detection light obtained by performing the microring filtering to obtain tenth detection light and obtain a fourth optical power indication signal corresponding to the tenth detection light. For a process in which the first optical communication apparatus 20 obtains the third optical power indication signal and the fourth optical power indication signal by using the optical frequency difference detection module 27, refer to the corresponding process described in Embodiment 1, and details are not described herein again.

Next, the first optical communication apparatus 20 may calculate a first measured ratio of the fourth optical power indication signal to the third optical power indication signal by using the frequency locking module 21. If it is determined, by using the frequency locking module 21, that a difference between the first measured ratio and a first preset ratio is greater than or equal to the second preset difference, or it is determined that the first measured ratio is not equal to the first preset ratio, the first optical communication apparatus 20 adjusts the resonance frequency of the microring module 279 in the first optical communication apparatus by using the frequency locking module 21, so that the resonance frequency of the microring module 279 is close to or equal to the frequency of the external reference light. Further, if it is determined, by using the frequency locking module 21, that the difference between the first measured ratio and the first preset ratio is less than the first preset difference, or it is determined that the first measured ratio is equal to the first preset ratio, the first optical communication apparatus 20 may stop adjusting the resonance frequency of the microring module 279. For a process in which the first optical communication apparatus 20 performs resonance frequency adjustment on the microring module 279 based on the fourth optical power indication signal and the third optical power indication signal, refer to the corresponding process described in Embodiment 1. Details are not described herein again.

Further, after the first optical communication apparatus 20 obtains the optical frequency difference indication signal through the optical frequency difference detection module 27, the first optical communication apparatus 20 may process the optical frequency difference indication signal by using the frequency locking module 21 to obtain the target wavelength control signal.

In a first optional implementation, the first optical communication apparatus 20 may first process the optical frequency difference indication signal by using the frequency locking module 21 to obtain a target optical frequency difference.

When the optical frequency difference indication signal is the target beat frequency signal, the first optical communication apparatus 20 may first determine the target optical frequency difference based on the target beat frequency signal by using the frequency locking module 21. For example, the first optical communication apparatus may sample the target beat frequency signal at a first moment by using the frequency locking module 21, to obtain a target sampling signal corresponding to the target beat frequency signal. Next, the first optical communication apparatus filters, by using the frequency locking module, the target sampling signal and a sampling signal corresponding to a beat frequency signal received by the frequency locking module 21 within a first preset time period, to obtain a to-be-converted signal, Next, the first optical communication apparatus performs, by using the frequency locking module 21, a digital Fourier transform on the to-be-converted signal to obtain spectrum information corresponding to the first preset time period. Next, the first optical communication apparatus 20 obtains, by using the frequency locking module, a frequency peak corresponding to the target sampling signal in the spectrum information and determines the frequency peak as the target optical frequency difference. For a process in which the frequency locking module 21 determines the target optical frequency difference based on the target beat frequency signal, refer to the corresponding process described in Embodiment 1, and details are not described herein again.

When the optical frequency difference indication signal is the first optical power indication signal and the second optical power indication signal, the first optical communication apparatus 20 may determine the target optical frequency difference based on the first optical power indication signal and the second optical power indication signal. For example, the first optical communication apparatus 20 may calculate a second measured ratio of the second optical power indication signal to the first optical power indication signal by using the frequency locking module 21. Next, the first optical communication apparatus determines, by using the frequency locking module 21 from a preset optical power ratio-optical frequency difference correspondence set of the microring module 279 based on the second measured ratio, an optical frequency difference corresponding to the second measured ratio and determine the optical frequency difference corresponding to the second measured ratio as the target optical frequency difference. The preset optical power ratio-optical frequency difference correspondence set includes one or more different measured ratios and an optical frequency difference corresponding to each measured ratio. For a process in which the frequency locking module 21 determines the target optical frequency difference based on the second measured ratio, refer to the corresponding process described in Embodiment 1, and details are not described herein again.

After the first optical communication apparatus 20 obtains the target optical frequency difference by using the frequency locking module 21, the first optical communication apparatus 20 may determine, by using the frequency locking module 21, the target wavelength control signal based on the target optical frequency difference, the first preset adjustment coefficient, and the wavelength control signal that is last generated by the first optical communication apparatus 20 by using the frequency locking module 21. For a process, refer to the process in which the frequency locking module 21 generates the target wavelength control signal based on the target optical frequency difference, the first preset adjustment coefficient, and the wavelength control signal that is last generated by the frequency locking module 21 described in Embodiment 1, and details are not described herein again.

In a second optional implementation, the first optical communication apparatus 20 may calculate a second measured ratio of the second optical power indication signal to the first optical power indication signal by using the frequency locking module 21. If it is determined, by using the frequency locking module 21, that a difference between the second measured ratio and a second preset ratio is greater than or equal to a third preset difference, or it is determined that the second measured ratio is not equal to the second preset ratio, the first optical communication apparatus 20 may determine a preset voltage signal as the target wavelength control signal. Further, if it is determined, by using the frequency locking module 21, that the difference between the second measured ratio and the second preset ratio is less than the third preset difference, or it is determined that the second measured ratio is equal to the second preset ratio, the first optical communication apparatus may stop generating and sending the target wavelength control signal. For a process, refer to the process in which the frequency locking module 21 directly generates the target wavelength control signal based on the second optical power indication signal and the first optical power indication signal described in Embodiment 1, and details are not described herein again.

S40: The first optical communication apparatus generates a target electrical modulation signal based on a target optical frequency difference, a target electrical frequency difference determined based on the measured electrical carrier frequency of the second signal light and the target electrical carrier frequency, and to-be-transmitted bit information.

In some implementations, after obtaining the target optical frequency difference, the first optical communication apparatus 20 may further obtain, by using the frequency locking module 21, the measured electrical carrier frequency of the second signal light and the target electrical carrier frequency that are from the second optical communication apparatus 10. Next, the first optical communication apparatus 20 processes, by using the frequency locking module, the target optical frequency difference, the target electrical frequency difference determined based on the measured electrical carrier frequency of the second signal light and the target electrical carrier frequency, and the to-be-transmitted bit information, to obtain the target electrical modulation signal. The difference between the electrical carrier frequency used by the target electrical modulation signal and the target electrical carrier frequency is less than the difference between the electrical carrier frequency used by the first signal light and the target electrical carrier frequency.

During an implementation, the first optical communication apparatus 20 may first obtain the measured electrical carrier frequency of the second signal light and the target electrical carrier frequency by using the frequency locking module 21. For example, the frequency locking module 21 in the first optical communication apparatus 20 may receive the network control signal and the network status signal from the second optical communication apparatus 10 through the first electrical interface 24, then extract the target electrical carrier frequency from the network control signal, and extract the measured electrical carrier frequency of the second signal light from the network status signal. For an obtaining process, refer to the process in which the frequency locking module 21 obtains the target electrical carrier frequency and the measured electrical carrier frequency of the second signal light described in Embodiment 1, and details are not described herein again. Next, the first optical communication apparatus 20 may determine, by using the frequency locking module 21, the target carrier frequency based on the target electrical carrier frequency, the target electrical frequency difference, and the target optical frequency difference. For example, the frequency locking module 21 may determine the target carrier frequency by using the following formula: The target carrier frequency satisfies the following formula:

$$f_m = f_c + \alpha \times \Delta f_d + \beta \times \Delta f_g, \text{ where}$$

$f_m$ is the target carrier frequency. $f_c$ is the target electrical carrier frequency. $\alpha$ is a second preset adjustment coefficient. $\beta$ is a third preset adjustment coefficient. $\alpha$ is greater than or equal to 0. $\beta$ is greater than or equal to 0. $\Delta f_d$ is the target electrical frequency difference. $\Delta f_g$ is the target optical frequency difference.

Next, the first optical communication apparatus 20 may generate a target electrical carrier by using the frequency locking module 21 and load the obtained to-be-transmitted bit information onto the target electrical carrier to obtain the target electrical modulation signal. A frequency of the target electrical carrier is equal to the target carrier frequency. For a process in which the first optical communication apparatus generates the target electrical modulation signal by using the frequency locking module 21, refer to the corresponding process described in Embodiment 1, and details are not described herein again.

In some implementations, the first optical communication apparatus 20 may further synchronously control a temperature of the light source 221 by using the temperature control module 210, so that the temperature of the light source 221 can be locked to a preset temperature. The foregoing preset temperature is determined by using the frequency of the external reference light, that is, the foregoing preset temperature is a temperature corresponding to an inherent temperature-output optical wavelength characteristic of the external reference light frequency of the light source 221. Therefore, if the temperature of the light source 221 is stabilized at the preset temperature, the frequency of the optical carrier or the signal light output by the light source 221 can be locked to the frequency of the external reference light, so that the optical carrier frequency of the signal light output by the signal light generation module 22 can be locked to the frequency of the external reference light, and precision of locking of an optical carrier frequency can be further improved.

For example, the first optical communication apparatus 20 may obtain a temperature indication signal of the light source 221 by using the temperature control module 210, and then generate a first temperature control signal and a temperature control feedback signal based on the temperature indication signal and the preset temperature. Next, the first optical communication apparatus may couple the first temperature control signal and the temperature control feedback signal by using the temperature control module 210, to obtain a second temperature control signal. Next, the temperature control module 210 may perform temperature control on the light source 221 based on the second temperature control signal, so that a difference between a temperature of the light source 221 and the preset temperature is less than or equal to a fourth preset difference. For processes of the foregoing steps, refer to the corresponding processes described in Embodiment 1, and details are not described herein.

In another example, the first optical communication apparatus may further determine, based on the target optical frequency difference by using the frequency locking module 21, the target temperature difference corresponding to the target optical frequency difference from the preset temperature-wavelength correspondence set corresponding to the light source. The target temperature difference is a difference between a temperature of the light source 221 at a moment when the signal light generation module 22 outputs the first signal light and the preset temperature. The preset temperature is determined by using the frequency of the external reference light. Next, the first optical communication apparatus 20 may generate, by using the frequency locking module 21, a third temperature control signal based on the target temperature difference, and perform, by using the temperature control module 210, temperature control on the light source 221 based on the third temperature control signal, so that a difference between the temperature of the light source 221 and a preset temperature is less than or equal to a fourth preset difference. For processes of the foregoing steps, refer to the corresponding processes described in Embodiment 1, and details are not described herein.

S50: The first optical communication apparatus generates third signal light based on the target wavelength control signal and the target electrical modulation signal.

In some implementations, the first optical communication apparatus 20 may generate, by using the signal light generation module 22, the third signal light based on the target wavelength control signal and the target electrical modulation signal.

For example, the first optical communication apparatus 20 may generate, by using the signal light generation module 22, a first target drive signal based on the target wavelength control signal, and then generate, based on the first target drive signal, an initial optical carrier corresponding to the third signal light. Next, the first optical communication apparatus 20 may split, by using the signal light generation module 22, the initial optical carrier corresponding to the third signal light to obtain an optical carrier of the third signal light and detection light corresponding to the third signal light; and Finally, the first optical communication apparatus 20 may generate and output, by using the signal light generation module 22, the third signal light based on the target electrical modulation signal and the optical carrier of the third signal light. For processes of the foregoing steps, refer to the corresponding processes described in Embodiment 1, and details are not described herein.

In another example, the first optical communication apparatus 20 may generate, by using the signal light generation module 22, a second target drive signal based on the target wavelength control signal and the target electrical modulation signal. Next, the signal light generation module 22 generates, based on the second target drive signal, initial signal light corresponding to the third signal light. Finally, the first optical communication apparatus 20 may split, by using the signal light generation module 22, the initial signal light corresponding to the third signal light, to obtain the third signal light. For processes of the foregoing steps, refer to the corresponding processes described in Embodiment 1, and details are not described herein.

S60: The first optical communication apparatus sends the third signal light to the second optical communication apparatus.

In some implementations, after generating the third signal light by using the signal light generation module 22, the first optical communication apparatus 20 may send the third signal light to the second optical communication apparatus 10 by using the signal light generation module 22. For example, the first optical communication apparatus 20 may send the third signal light to the second optical communication apparatus 10 through a target fiber. It should be noted herein that, the first optical communication apparatus 20 also receives the external reference light from the second optical communication apparatus 10 by using the target fiber.

In the embodiments, in a multi-subcarrier transmission scenario, the first optical communication apparatus 20 may accurately control an optical carrier frequency and an electrical carrier frequency of signal light generated by the first optical communication apparatus, so that an optical carrier frequency of the signal light output by the first optical communication apparatus can be locked to a frequency of external reference light provided by the second optical communication apparatus, and the electrical carrier frequency of the signal light output by the first optical communication apparatus can be locked to a preconfigured target electrical carrier frequency. In this way, a problem that beat frequency interference that exists when a plurality of optical signals may be multiplexed and that is caused by a frequency offset of signal light in a multi-subcarrier transmission process can be effectively resolved, so that quality of optical signal transmission of two optical communication apparatuses can be improved.

The objectives, solutions, and benefits are further described in detail in the foregoing embodiments. It should be understood that the foregoing descriptions are merely embodiments, but are not intended as limiting. Any modification or improvement shall fall within the scope of the embodiments.

What is claimed is:

1. A first optical communication apparatus comprising a signal light generator; and:
a frequency locker device configured to
generate a target wavelength control signal based on an optical frequency difference indication signal,
generate a target electrical modulation signal based on a target optical frequency difference, a target electrical frequency difference, and to-be-transmitted bit information, and
send the target electrical modulation signal to the signal light generator, wherein the target optical frequency difference is determined by using the optical frequency difference indication signal, the target optical frequency difference is a difference between the frequency of the external reference light and the optical carrier frequency of the first signal light, and the target electrical frequency difference is a difference between a measured electrical carrier frequency of second signal light sent by the signal light generator to the second optical communication apparatus and a target electrical carrier frequency, wherein
the signal light generator is configured to:
generate third signal light based on the target wavelength control signal and the target electrical modulation signal, and
send the third signal light to the second optical communication apparatus; and
the first signal light, the second signal light, and the third signal light are signal light output by the first optical communication apparatus at different moments.

2. The first optical communication apparatus according to claim 1, further comprising:
an optical frequency difference detector
configured to:
obtain an optical frequency difference indication signal formed by the external reference light and detection light corresponding to the first signal light, and
send the optical frequency difference indication signal to the frequency locker device, wherein the optical frequency difference indication signal is a target beat frequency signal formed by the external reference light and the detection light corresponding to the first signal light, and the detection light corresponding to the first signal light is obtained by splitting an optical carrier or signal light generated by a light source in the signal light generator when the signal light generator outputs the first signal light.

3. The first optical communication apparatus according to claim 2, wherein the optical frequency difference detector further comprises:
a first electrical coupler configured to:
couple the first beat voltage signal and the second beat voltage signal to obtain the optical frequency difference indication signal and
send the optical frequency difference indication signal to the frequency locker device;
a first photoelectric detector configured to:
obtain a first beat voltage signal formed by the first detection light and the third detection light, and
send the first beat voltage signal to the first electrical coupler;
a second photoelectric detector configured to:
obtain a second beat voltage signal formed by the second detection light and the fourth detection light, and
send the second beat voltage signal to the first electrical coupler;
a first optical splitter configured to: split the external reference light into first detection light and second detection light, send the first detection light to the first photoelectric detector, and send the second detection light to the second photoelectric detector, wherein the first detection light is a component of the external reference light in a first polarization direction, the second detection light is a component of the external reference light in a second polarization direction, the first polarization direction is a preset polarization direction of the first optical splitter, and the second polarization direction is orthogonal to the first polarization direction;
a second optical splitter configured to split the detection light corresponding to the first signal light into third detection light and fourth detection light, send the third detection light to the first photoelectric detector, and send the fourth detection light to the second photoelectric detector, wherein the third detection light is a component of the detection light corresponding to the first signal light in a third polarization direction, the fourth detection light is a component of the detection light corresponding to the first signal light in a fourth polarization direction, the third polarization direction is a preset polarization direction of the second optical splitter, and the fourth polarization direction is orthogonal to the third polarization direction;
a first electrical coupler.

4. The first optical communication apparatus according to claim 3, wherein the first optical splitter and the second optical splitter are polarization rotator splitters, the first polarization direction is the same as the third polarization direction, the first detection light and the second detection light have a same polarization direction, and the third detection light and the fourth detection light have a same polarization direction.

5. The first optical communication apparatus according to claim 1, further comprising:
an optical frequency difference detector comprising a microring, wherein a difference between a resonance frequency of the microring and a frequency of the external reference light is less than or equal to a first preset difference; and
the optical frequency difference detector is configured to:
obtain an optical frequency difference indication signal based on fifth detection light and sixth detection light, and
send the optical frequency difference indication signal to the frequency locker device, wherein the optical frequency difference indication signal is a first optical power indication signal of the fifth detection light and a second optical power indication signal of the sixth detection light, detection light corresponding to the first signal light is split to obtain the fifth detection light and seventh detection light, the sixth detection light is obtained by splitting light that is output when the microring inputs the seventh detection light, and the detection light corresponding to the first signal light is obtained by splitting an optical carrier or signal light generated by a light source in the signal light generator when the signal light generator outputs the first signal light.

6. The first optical communication apparatus according to claim 5, further comprising:
a third photoelectric detector configured to:
obtain the first optical power indication signal of the fifth detection light, and
transmit the first optical power indication signal to the frequency locker device;
a fourth photoelectric detector configured to:
obtain the second optical power indication signal corresponding to the sixth detection light, and
transmit the second optical power indication signal to the frequency locker device;
a first optical coupler configured to:
split the detection light corresponding to the first signal light to obtain the fifth detection light and the seventh detection light,
transmit the fifth detection light to the third photoelectric detector, and
transmit the seventh detection light to the microring; and
a second optical coupler configured to:
split the seventh detection light obtained by performing the microring filtering to obtain the sixth detection light, and
transmit the sixth detection light to the fourth photoelectric detector,
wherein
the microring is configured to:
perform microring filtering on the seventh detection light, and
transmit the seventh detection light obtained by performing the microring filtering to the second optical coupler, device.

7. The first optical communication apparatus according to claim 6, wherein the optical frequency difference detector further comprises:
a fifth photoelectric detector configured to:
obtain a third optical power indication signal corresponding to the eighth detection light, and
transmit the third optical power indication signal to the frequency locker device; and
a sixth photoelectric detector configured to:
obtain a fourth optical power indication signal corresponding to the tenth detection light, and
send the fourth optical power indication signal to the frequency locker device, wherein
the second optical coupler is further configured to:
split the external reference light to obtain eighth detection light and ninth detection light,
transmit the ninth detection light to the microring, and
transmit the eighth detection light to the fifth photoelectric detector, wherein the microring is further configured to:
perform microring filtering on the ninth detection light, and
transmit the ninth detection light obtained by performing the microring filtering to the first optical coupler, and the first optical coupler is configured to:
split the ninth detection light obtained by performing the microring filtering to obtain tenth detection light, and
send the tenth detection light to the sixth photoelectric detector.

8. The first optical communication apparatus according to claim 7, wherein the third photoelectric detector further comprises:
a third photoelectric detector,
the fourth photoelectric further detector comprises:
a fourth photoelectric detector, the fifth photoelectric detector further comprises:
a fifth photoelectric detector, the sixth photoelectric detector further comprises:
a sixth photoelectric detector, and the third photoelectric detector, the fourth photoelectric detector, the fifth photoelectric detector, the sixth photoelectric detector, the first optical coupler, the second optical coupler, and the microring are integrated on a second photonic chip.

9. The first optical communication apparatus according to claim 7, wherein the frequency locker device is further configured to:
calculate a first measured ratio of the fourth optical power indication signal to the third optical power indication signal; and
after it is determined that a difference between the first measured ratio and a first preset ratio is greater than or equal to a second preset difference, or it is determined that the first measured ratio is not equal to the first preset ratio, adjust a drive signal of the microring, and send the adjusted drive signal to the microring, wherein the adjusted drive signal is used by the microring to adjust the resonance frequency.

10. The first optical communication apparatus according to claim 9, wherein the frequency locker device is further configured to:
after it is determined that the difference between the first measured ratio and the first preset ratio is less than the first preset difference, or it is determined that the first measured ratio is equal to the first preset ratio, stop adjusting the drive signal of the microring.

11. The first optical communication apparatus according to claim 5, wherein the microring further comprises:
a first microring resonant cavity,
a second microring resonant cavity,
a first waveguide,
a second waveguide,
a third optical splitter, and
a fourth optical splitter, wherein
the resonance frequency of the microring is equal to a resonance frequency of the first microring resonant cavity and a resonance frequency of the second microring resonant cavity, the first microring resonant cavity and the second microring resonant cavity are single-side coupled microring resonant cavities, the third optical splitter and the fourth optical splitter are optically connected by the first waveguide and the second waveguide, the first waveguide is close to the first microring resonant cavity, the second waveguide is close to the second microring resonant cavity, the third optical splitter is further optically connected to the first optical coupler, and the fourth optical splitter is further optically connected to the second optical coupler.

12. The first optical communication apparatus according to claim 5, wherein the microring further comprises:
a third microring resonant cavity,
a third waveguide,
a fourth waveguide,
a fifth optical splitter, and
a sixth optical splitter, wherein
the resonance frequency of the microring is equal to a resonance frequency of the third microring resonant cavity, the third microring resonant cavity is a double-side coupled microring resonant cavity, the fifth optical splitter and the sixth optical splitter are optically connected by the third waveguide and the fourth waveguide, the third waveguide and the fourth waveguide each are close to one side of the third microring resonant cavity, the fifth optical splitter is further optically connected to the first optical coupler, and the sixth optical splitter is further optically connected to the second optical coupler.

13. The first optical communication apparatus according to claim 2, wherein the frequency locker device is further configured to:
determine the target optical frequency difference based on the target beat frequency signal; and
determine the target wavelength control signal based on the target optical frequency difference, a first preset adjustment coefficient, and a wavelength control signal that is last output by the frequency locker device to the signal light generator.

14. The first optical communication apparatus according to claim 13, wherein the frequency locker device is further configured to:
sample the target beat frequency signal at a first moment to obtain a target sampling signal corresponding to the target beat frequency signal;
filter the target sampling signal and a sampling signal corresponding to a beat frequency signal received by the frequency locker device within a first preset time period, to obtain a to-be-converted signal, wherein an end moment of the first preset time period is the first moment;
perform digital Fourier transform on the to-be-converted signal to obtain spectrum information corresponding to the first preset time period; and
obtain a frequency peak corresponding to the target sampling signal in the spectrum information, and determine the frequency peak as the target optical frequency difference.

15. The first optical communication apparatus according to claim 5, wherein the frequency locker device is further configured to:
determine the target optical frequency difference based on the first optical power indication signal and the second optical power indication signal; and
determine the target wavelength control signal based on the target optical frequency difference, a first preset adjustment coefficient, and a wavelength control signal that is last output by the frequency locker to the signal light generator.

16. The first optical communication apparatus according to claim 15, wherein the frequency locker device is further configured to:
calculate a second measured ratio of the second optical power indication signal to the first optical power indication signal; and
determine, from a preset optical power ratio-optical frequency difference correspondence set of the microring based on the second measured ratio, an optical frequency difference corresponding to the second measured ratio, and determine the optical frequency difference corresponding to the second measured ratio as the target optical frequency difference, wherein the preset optical power ratio-optical frequency difference correspondence set comprises one or more different measured ratios and an optical frequency difference corresponding to each measured ratio.

17. The first optical communication apparatus according to claim 5, wherein the frequency locker device is further configured to:
calculate a second measured ratio of the second optical power indication signal to the first optical power indication signal; and
after it is determined that a difference between the second measured ratio and a second preset ratio is greater than or equal to a third preset difference, or it is determined that the second measured ratio is not equal to the second preset ratio, determine a preset voltage signal as the target wavelength control signal.

18. A second optical communication apparatus comprising:
a reference light source configured to:
generate external reference light based on the reference optical drive signal, and
send the external reference light to the first optical communication apparatus, wherein the measured electrical carrier frequency of the second signal light, the target electrical carrier frequency, and the external reference light are used by the first optical communication apparatus to generate third signal light and send the third signal light to the second optical communication apparatus; and
a signal light processor configured to:
receive second signal light from a first optical communication apparatus,
determine a measured electrical carrier frequency of the second signal light,
send the measured electrical carrier frequency of the second signal light and a target electrical carrier frequency to the first optical communication apparatus,
generate a reference optical drive signal, and
send the reference optical drive signal to the reference light source.

19. The second optical communication apparatus according to claim 18, further comprising:
a second optical interface; and
a tenth optical splitter, wherein
the second optical interface is optically connected to the signal light processor and the reference light source by the tenth optical splitter, and the second optical interface is configured to:
receive, through the tenth optical splitter, the external reference light output by the reference light source, and
send the external reference light to the first optical communication apparatus, and the second optical interface is further configured to:
receive the second signal light or the third signal light, and
transmit the second signal light or the third signal light to the signal light processor through a sixth optical splitter.

20. An optical communication method applied to a first optical communication apparatus, comprising:
generating a target wavelength control signal based on an optical frequency difference indication signal, wherein the optical frequency difference indication signal indicates a degree of difference between an optical carrier frequency of external reference light and an optical carrier frequency of first signal light sent by the first optical communication apparatus to a second optical communication apparatus;

generating a target electrical modulation signal based on a target optical frequency difference, a target electrical frequency difference, and to-be-transmitted bit information, wherein the target optical frequency difference is determined by using the optical frequency difference indication signal, the target optical frequency difference is a difference between the frequency of the external reference light and the optical carrier frequency of the first signal light, and the target electrical frequency difference is a difference between a target electrical carrier frequency and a measured electrical carrier frequency of second signal light sent by the first optical communication apparatus to the second optical communication apparatus; and generating third signal light based on the target wavelength control signal and the target electrical modulation signal, and sending the third signal light to the second optical communication apparatus, wherein the first signal light, the second signal light, and the third signal light are signal light output by the first optical communication apparatus at different moments.

* * * * *